(12) United States Patent
Popovic et al.

(10) Patent No.: US 7,853,108 B2
(45) Date of Patent: Dec. 14, 2010

(54) FABRICATION-TOLERANT WAVEGUIDES AND RESONATORS

(75) Inventors: Milos Popovic, Somerville, MA (US); Tymon Barwicz, Yorktown Heights, NY (US)

(73) Assignee: Massachusetts Institute of Technology, Cambridge, MA (US)

( * ) Notice: Subject to any disclaimer, the term of this patent is extended or adjusted under 35 U.S.C. 154(b) by 37 days.

(21) Appl. No.: 11/966,402

(22) Filed: Dec. 28, 2007

(65) Prior Publication Data

US 2008/0166095 A1   Jul. 10, 2008

Related U.S. Application Data

(60) Provisional application No. 60/878,013, filed on Dec. 29, 2006.

(51) Int. Cl.
*G02B 6/036* (2006.01)
*G02B 6/02* (2006.01)
*G02B 6/10* (2006.01)

(52) U.S. Cl. .................. 385/126; 385/129; 385/131; 385/132

(58) Field of Classification Search ................. 385/126, 385/129–132
See application file for complete search history.

(56) References Cited

U.S. PATENT DOCUMENTS

| | | | |
|---|---|---|---|
| 3,558,213 A | 1/1971 | Marcatili | |
| 4,142,775 A | 3/1979 | Ramaswamy et al. | |
| 4,679,893 A | 7/1987 | Ramer | |
| 4,852,117 A | 7/1989 | Po | |
| 5,371,817 A | 12/1994 | Revelli, Jr. et al. | |
| 5,625,403 A | 4/1997 | Hazman et al. | |
| 5,900,637 A | 5/1999 | Smith | |
| 6,025,943 A | 2/2000 | Meekers et al. | |
| 6,052,495 A | 4/2000 | Little et al. | |
| 6,157,765 A * | 12/2000 | Bruce et al. ................. 385/129 |
| 6,289,151 B1 | 9/2001 | Kazarinov et al. | |
| 6,442,311 B1 | 8/2002 | Barbarossa et al. | |
| 6,529,277 B1 | 3/2003 | Weitekamp | |
| 6,636,669 B1 | 10/2003 | Chin et al. | |
| 6,668,111 B2 | 12/2003 | Tapalian et al. | |
| 6,690,871 B2 * | 2/2004 | Lee et al. ..................... 385/129 |
| 6,711,200 B1 | 3/2004 | Scherer et al. | |
| 6,839,482 B2 | 1/2005 | Margalit et al. | |
| 6,847,750 B1 | 1/2005 | Baumann et al. | |

(Continued)

FOREIGN PATENT DOCUMENTS

EP    0646832    4/1995

(Continued)

OTHER PUBLICATIONS

Bogaerts et al., "Low-loss, low-cross-talk crossings for silicon-on-insulator nanophotonic waveguides," 32 Optics Letters 19, pp. 2801-2803 (1995).

(Continued)

*Primary Examiner*—Daniel Petkovsek
(74) *Attorney, Agent, or Firm*—Goodwin Procter LLP

(57) ABSTRACT

An optical waveguide having a core region with a substantially rectangular cross-section with a selected aspect ratio of width to height. Embodiments include devices incorporating the optical waveguide and methods for using the optical waveguide.

20 Claims, 27 Drawing Sheets

U.S. PATENT DOCUMENTS

| | | | |
|---|---|---|---|
| 6,947,632 B2 | 9/2005 | Fischer et al. | |
| 7,102,469 B2 | 9/2006 | Kim et al. | |
| 7,123,800 B2 | 10/2006 | Kaplan | |
| 7,145,660 B2 | 12/2006 | Margalit et al. | |
| 7,164,838 B2 * | 1/2007 | Blauvelt et al. | 385/131 |
| 7,215,848 B2 | 5/2007 | Tan et al. | |
| 7,292,751 B2 | 11/2007 | Popovic | |
| 7,339,724 B2 | 3/2008 | Hochberg et al. | |
| 7,539,375 B2 | 5/2009 | Popovic | |
| 7,583,874 B2 | 9/2009 | Rakich et al. | |
| 2001/0040681 A1 | 11/2001 | Paiam et al. | |
| 2001/0046344 A1 | 11/2001 | Hayashi et al. | |
| 2002/0076188 A1 | 6/2002 | Kimerling et al. | |
| 2002/0122648 A1 | 9/2002 | Mule' et al. | |
| 2002/0136481 A1 | 9/2002 | Mule' et al. | |
| 2002/0172466 A1 | 11/2002 | Baumann et al. | |
| 2002/0181829 A1 * | 12/2002 | Margalit et al. | 385/14 |
| 2003/0015770 A1 | 1/2003 | Talin et al. | |
| 2003/0128922 A1 | 7/2003 | Kolodziejski et al. | |
| 2003/0156780 A1 | 8/2003 | Margalit et al. | |
| 2003/0210860 A1 | 11/2003 | Margalit | |
| 2003/0219052 A1 | 11/2003 | Goodhue et al. | |
| 2004/0008942 A1 | 1/2004 | Scheuer et al. | |
| 2004/0013355 A1 | 1/2004 | Margalit | |
| 2004/0056243 A1 | 3/2004 | Atanackovic et al. | |
| 2004/0114899 A1 | 6/2004 | Mattsson | |
| 2004/0161188 A1 | 8/2004 | Su et al. | |
| 2004/0264905 A1 * | 12/2004 | Blauvelt et al. | 385/131 |
| 2005/0036737 A1 | 2/2005 | Stuart | |
| 2005/0068602 A1 | 3/2005 | Tormen et al. | |
| 2005/0077526 A1 | 4/2005 | Shin et al. | |
| 2005/0147348 A1 | 7/2005 | Grunnet-Jepsen et al. | |
| 2005/0163418 A1 | 7/2005 | Wong et al. | |
| 2005/0259937 A1 | 11/2005 | Whaley et al. | |
| 2005/0275921 A1 | 12/2005 | Haus et al. | |
| 2006/0029325 A1 | 2/2006 | Fardi et al. | |
| 2006/0083456 A1 | 4/2006 | Burns et al. | |
| 2006/0134535 A1 | 6/2006 | Porque | |
| 2006/0239614 A1 | 10/2006 | Montgomery et al. | |
| 2006/0274995 A1 | 12/2006 | Lee et al. | |
| 2006/0291791 A1 | 12/2006 | Hochberg et al. | |
| 2007/0035800 A1 | 2/2007 | Hochberg et al. | |
| 2007/0133934 A1 * | 6/2007 | Blauvelt et al. | 385/129 |
| 2007/0211992 A1 | 9/2007 | chu et al. | |
| 2007/0253663 A1 | 11/2007 | Keyser et al. | |
| 2008/0002992 A1 | 1/2008 | Hochberg et al. | |
| 2008/0014534 A1 | 1/2008 | Barwicz et al. | |
| 2008/0044184 A1 | 2/2008 | Popovic | |
| 2009/0022445 A1 | 1/2009 | Hochberg et al. | |
| 2009/0142019 A1 | 6/2009 | Popovic | |
| 2009/0220228 A1 | 9/2009 | Popovic | |
| 2009/0290835 A1 | 11/2009 | Popovic | |
| 2010/0002994 A1 | 1/2010 | Baehr-Jones et al. | |

FOREIGN PATENT DOCUMENTS

| | | |
|---|---|---|
| EP | 0909963 | 4/1999 |
| EP | 1024378 A2 | 8/2000 |
| EP | 1241497 | 9/2002 |
| EP | 1717616 A1 | 11/2006 |
| EP | 1785771 | 5/2007 |
| JP | 2001-194160 A | 7/2001 |
| WO | WO-85/01123 | 3/1985 |
| WO | WO-0050938 A1 | 8/2000 |
| WO | WO-0123955 A2 | 4/2001 |
| WO | WO-0155814 A2 | 8/2001 |
| WO | WO-01/88580 | 11/2001 |
| WO | WO-02/17004 | 2/2002 |
| WO | WO-02/063389 | 8/2002 |
| WO | WO-02/101421 A2 | 12/2002 |
| WO | WO-03/036841 | 5/2003 |
| WO | WO-03/043247 A2 | 5/2003 |
| WO | WO-2005/010618 | 2/2005 |
| WO | WO-2005/104147 | 11/2005 |
| WO | WO-2006/025760 | 3/2006 |
| WO | WO-2006/076585 A2 | 7/2006 |

OTHER PUBLICATIONS

Chen et al., "Low-loss multimode-interference-based crossings for Silicon Wire Waveguides," 18 IEEE Photonics Letters 21, pp. 2260-2262 (2006).

International Search Report & Written Opinion for PCT/US2008/082054, dated Mar. 18, 2009.

International Search Report and Written Opinion for PCT/US2007/026513, dated Dec. 28, 2007 (13 pages).

International Search Report and Written Opinion for PCT/US2008/080749, dated May 25, 2009 (16 pages).

Liu et al., "Low-loss waveguide crossing using a multimode interference structure," 241 Optics Communications 1-3, pp. 99-104 (2004).

Partial International Search Report for PCT/US2008/080749, dated Mar. 24, 2009.

Popovic, "Theory and Design of High-Index-Contrast Microphotonic Circuits," Ph.D. Thesis, Massachusetts Institute of Technology, Dept. of Electrical Engineering & Computer Science, Feb. 2008.

Povinelli et al., "Enhancement mechanisms for optical forces in integrated optics," 6326 Proc. of SPIE Optical Trapping & Optical Manip. III 15 (2006).

Rakich et al., "Trapping, corraling and spectral bonding of optical resonances through optically induced potentials," 1 Nature Photonics 11, pp. 658-665 (2007).

Tang et al., "Highly efficient optical phase modulator in SOI waveguides," 31 Electronics Letters 6, pp. 451-452 (1995).

Xu et al., "Micrometre-scale silicon electro-optic modulator," Nature, vol. 435, pp. 325-327 (2005).

International Preliminary Report on Patentability for PCT/US2007/026513 dated Jul. 9, 2009.

Baehr-Jones et al., "High-Q Ring Resonators in Thin Silicon-on-Insulator," 85 Appl. Phys. Lett. 16 (Oct. 2004) pp. 3346-3347.

Barbarossa et al., "Novel Double-Ring Optical-Guided-Wave Vernier Resonator," 144 IEE Proc.-Optoelectron. 4, pp. 203-208 (Aug. 1997).

Barbarossa et al., "Theoretical Analysis of Triple-Coupler Ring-Based Optical Guided-Wave Resonator," 13 J. Lightwave Tech. 2, pp. 148-157 (Feb. 1995).

Barbarossa et al., "Triple-Coupler Ring-Based Optical Guided-Wave Resonator," 30 IEEE Electronics Lett. 2, pp. 131-133 (Jan. 20, 1994).

Barwicz et al., "Polarization-transparent microphotonic devices in the Strong Confinement Limit," Nature Photonics 1, pp. 57-60 (Jan. 2007).

Batten et al., "Building Manycore Processor-to-DRAM Networks with Monolithic CMOS Si Photonics," IEEE Micro, p. 8-21 (Jul. 2009).

Bethe, "Theory of Diffraction by Small Holes," 66 Phys. Rev. 7-8, pp. 163-182 (Oct. 1944).

Campbell et al., "GaAs Electro-Optic Directional-coupler switch," 27 Applied Physics Lett. 4, pp. 202-205 (Aug. 1975).

Chremmos et al., "Properties of Regular Polygons of Coupled Microring Resonators," 46 Applied Optics Optical Society of America 31, pp. 7730-7738 (Nov. 1, 2007).

Darmawan et al., "Nested Ring Mach-Zender Interferometer," 15 Optics Express Opt. Soc. America 2, pp. 437-448 (Jan. 2001).

Doerr et al., "Wavelength Add-Drop Node Using Silica Waveguide Integration," 22 J. Lightwave Tech. 12, pp. 2755-2762 (Dec. 2004).

Domash et al., "Tunable and Switchable Multiple-Cavity Thin Film Filters," 22 J. Lightwave Tech. 1, pp. 126-135 (Jan. 2004).

Espinola et al., "Fast and Low-Power Thermooptic Switch on Thin Silicon-on-Insulator," 15 IEEE Photon. Tech. Lett. 10, pp. 1366-1368 (2003).

Fan et al., "Theoretical Analysis of Channel Drop Tunneling Processes," 59 Phys. Rev. B 2, pp. 15882-15892 (Jun. 15, 1999).

Findakly et al., "On the Crosstalk of Reversed-Δβ Directional Coupler Switches," 6 J. of Lightwave Tech. 1, pp. 36-40 (Jan. 1988).

Geuzebroek et al., "Thermally Tuneable, Wide FSR Switch based on Micro-ring Resonators," Proc. Symp. IEEE/LEOS Benelux Chapter, pp. 155-158 (2002).
Gheorma et al., IEEE Photon. Tech. Lett. 14, 795 (2002).
Goebuchi et al., "Fast and Stable Wavelength-Selective Switch Using Double-Series Coupled Dielectric Microring Resonator," 18 IEEE Photonics Tech. Lett. 3, pp. 538-540 (Feb. 1, 2006).
Green et al., "Ultra-Compact, low RF Power, 10 Gb/s silicon Mach-Zehnder modulator," Optics Express 15(25), pp. 17106-17113 (2007).
Green et al., "Optical Modulation using anti-crossing between paired amplitude and phase resonators," Optics Express 15(25), pp. 17264-17272 (2007).
Gunn, "CMOS Photonics for High-Speed Interconnects," IEEE Micro 26 (2), pp. 58-66 (Mar./Apr. 2006).
Gupta et al., Conf. on Lasers and Electro-Optics (CLEO), p. paper CTuNN5 (2008).
Haus et al., "Broadband Hitless Bypass Switch for Integrated Photonic Circuits," 18 IEEE Photonics Tech. Lett. 10, pp. 1137-1139 (May 15, 2006).
Haus et al., "Elimination of Cross Talk in Optical Directional Couplers," 46 Applied Physics Lett. 1, pp. 1-3 (Jan. 1, 1985).
Kelly et al., "Monolithic Suspended Optical Waveguides for InP MEMS," 16 IEEE Photonics Tech. Letters 5, pp. 1298-1300 (2004).
Khan et al., "Mode-Coupling Analysis of Multipole Symmetric Resonant Add/Drop Filters," 35 IEEE J. of Quantum Elec. 10, pp. 1451-1460 (Oct. 1999).
Khurgin et al., "Expanding the Bandwidth of Slow-Light Photonic Devices Based on Coupled Resonators," 30 Optics Lett. 5, pp. 513-515 (Mar. 1, 2005).
Lee et al., "MEMS-Actuated Microdisk Resonators with Variable Power Coupling Ratios," 17 IEEE Photonics Tech. Lett. 5, pp. 1034-1036 (May 2005).
Lee et al., "Tunable Coupling Regimes of Silicon Microdisk Resonators using MEMS Actuators," 14 Optics Express 11, pp. 4703-4712 (May 29, 2006).
Li et al., "Coupled-ring-resonator-based silicon modulator for enhanced performance," Optics Express 16(17), pp. 13342-13348 (2008).
Little et al., "Filter Synthesis for Periodically Coupled Microring Resonators," 25 Optics Lett. 5, pp. 344-346 (Mar. 1, 2000).
Little et al., "Microring Resonator Channel Dropping Filters," J. Lightwave Tech. 15, pp. 998-1005 (1997).
Little et al., "Wavelength Switching and Routing using Absorption and Resonance," 10 IEEE Photonics Tech. Lett. 6, pp. 816-818 (Jun. 1998).
Madsen et al., "Hitless Reconfigurable Add/Drop Multiplexers using Bragg Gratings in Planar Waveguides," OSA TOPS, v. 29, WDM Components, pp. 54-60, (1999).
Madsen, "Efficient Architectures for Exactly Realizing Optical Filters with Optimum Bandpass Designs," 10 IEEE Photonics Tech. Lett. 8, pp. 1136-1138 (Aug. 1998).
Manolatou et al., "Coupling of Modes Analysis of Resonant Channel Add-Drop Filters," 35 IEEE J. of Quantum Elec. 9, pp. 1322-1331 (Sep. 1999).
Manolatou et al., "High-Density Integrated Optics," 17 J. Lightwave Tech. 9, pp. 1682-1692 (Sep. 1999).
McDonald, "Electric and Magnetic Coupling through Small Apertures in Shield Walls of any Thickness," MTT-20 IEEE Trans. on Microwave Theory & Techniques 10, pp. 689-695 (Oct. 1972).
Melloni et al., "Synthesis of Direct-Coupled-Resonators Bandpass Filters for WDM Systems Lightwave Technology," 20 J. Lightwave Tech. 2, pp. 296-303 (2002).
Melloni et al., Integr. Photon. Research and Applications/Nanophotonics (IPNRA), p. paper IMC1 (2006).
Papuchon et al., "Electrically switched Optical Directional Coupler: Cobra," 27 Applied Physics Lett. 5, pp. 289-291 (Sep. 1, 1975).
Poon et al., "Wavelength-selective reflector based on a circular array of coupled microring resonators," 16 IEEE Photonics Technology Letters 5, pp. 1331-1333 (May 2004).
Popovic et al., "Coupling-induced resonance frequency shifts in coupled dielectric multi-cavity filters," Optics Express 14(3), pp. 1208-1222 (2006).

Popovic, "Optimally efficient resonance-tuned optical modulators," in CLEO 2009, paper CTuV6 (2 pages) (May 2009).
Popovic, Resonant optical modulators beyond conventional energy-efficiency and modulation frequency limitations, (2010).
Rabiei et al., "Polymer Micro-Ring Filters and Modulators," J. Lightwave Tech. 20, 1968 (2002).
Rezzonico et al., "Electro-optic Charon polymeric microring modulators," Optics Express 16(2), pp. 613-627 (2008).
Rhodes, "A Low-Pass Filter Prototype Network for Microwave Linear Phase Filters," MTT-18 IEEE Trans. Microwave Theory Tech. 6, pp. 290-301 (Jun. 1970).
Sacher et al., "Dynamics of microring resonator modulators," Optics Express 16(20), pp. 15741-15753 (2008).
Sugimoto et al., "Waveguide polarization-independent Optical Circulator," 11 IEEE Photon. Tech. Lett. 3, pp. 355-357 (Mar. 1999).
Suh et al., "Temporal Coupled-Mode Theory and the Presence of Non-Orthogonal Modes in Lossless Multimode Cavities," 40 IEEE J. of Quantum Elec. 10, pp. 1511-1518 (Oct. 2004).
Takahashi et al., "Tunable Chromatic Dispersion Compensator Utilizing Silica Waveguide Ring Resonator having Mach-Zehnder Interferometric Variable Coupler Eliminating Crossing Point of Waveguides," 15th Annual Meeting of IEEE Lasers and Electro-Optics Society, v.2, pp. 665-666 (Nov. 10-14, 2002).
Watts et al., "Maximally Confined Silicon Microphotonic Modulators and Switches," IEEE Proc. of the LEOS Ann. Meet., p paper WF1, pp. 457-458 (2008).
Weber et al., "Crosstalk and Switching Characteristics in Directional Couplers," 24 IEEE J. of Quantum Elect. 3, pp. 537-548 (Mar. 1988).
Wei et al., "Compound Ring Resonator with Double Couplers," 186 Optics Communications 4-6, pp. 283-290 (Dec. 15, 2000).
Williamson, "Sensitivity-bandwidth product for electro-optic modulators," Optics Letters 26, 1362 (2001).
Xu et al., "Experimental Realization of an on-Chip All-Optical Analogue to Electromagnetically Induced Transparency," Phys. Rev. Lett. 96, pp. 1-4 (2006).
Yanik et al., "Stopping Light All Optically," 92 Phy. Rev. Lett. 8, pp. 1-4 (Feb. 27, 2004).
Yariv et al., "Coupled-Resonator Optical Waveguide: a Proposal and Analysis," 24 Optics Lett. 11, pp. 711-713 (Jun. 1, 1999).
Altug et al., "Ultrafast Photonic Crystal Nanocavity Laser," Nature Physics 2 (2006) pp. 484-488.
Badolato et al., "Deterministic Coupling of Single Quantum Dots to Single Nanocavity Modes," Science 308 (2005) pp. 1158-1161.
Bozhevolnyi et al., "Channel Plasmon Subwavelength Waveguide Components Including Interferometers and Ring Resonators," Nature 440 (2006) pp. 508-511.
Bustillo et al., "Surface Micromachining for Microelectromechanical Systems," Proc. of the IEEE 86 (1998) pp. 1552-1574.
Chuang, S.L., Physics of Optoelectronic Devices, (Wiley, NY, 1995).
Eichenfield et al., "Actuation of Micro-optomechanical Systems via Cavity-enhanced Optical Dipole Forces," http://arXiv:physics/0702231, Jul. 2, 2007.
Examination Report in European Patent Application No. 04786154.7, mailed Jul. 16, 2008.
Gritsenko et al., "Short-range order in non-stoichiometric amorphous silicon oxynitride and silicon-rich nitride," 297 J. Non-Crystalline Solids 1, pp. 96-101 (Jan. 2002).
Haus, H.A. Waves and Fields in Optoelectronics, (Prentice-Hall, Englewood Cliffs, NJ, 1984).
In et al., "Origami Fabrication of Nanostructured, Three-dimensional Devices: Electrochemical Capacitors with Carbon Electrodes," Appl. Phys. Lett. 88 (2006) 83104.
International Search Report & Written Opinion for PCT/US2005/043762, mailed Jun. 19, 2008, 8 pages.
International Search Report & Written Opinion for PCT/US2007/015740, dated Feb. 18, 2006 (10 pages).
International Preliminary Report on Patentability and Written Opinion for PCT/US06/028848, mailed Feb. 7, 2008.
International Search Report for PCT/US06/28848, mailed Feb. 16, 2007.
Jackson, J.D., Classical Electrodynamics (Wiley, NY, 1999).

Kippenberg et al., "Analysis of Radiation-pressure Induced Mechanical Oscillation of an Optical Microcavity," Phys. Rev. Lett. 95 (2005) 033901.

Kogelnik et al., "Switched Directional Couplers with Alternating $\Delta\beta$," 12 IEEE J. Quantum Elec. 7, pp. 396-401 (1976).

Korotky, "Three-Space Representation of Phase-Mismatch Switching in Coupled Two-State Optical System," 22 IEEE J. Quantum Elec. 6, pp. 952-958 (1986).

Maboudian et al., "Critical Review: Adhesion in Surface Micromechanical Structures," J. Vac. Sci. Tech. B, 15 (1997).

Madsen et al., "A Multi-Port Add/Drop Router using UV-induced Gratings in Planar Waveguides," Lucent Technologies, pp. 104-106, (1999).

Madsen et al., Optical Filter Design and Analysis: A Signal Processing Approach, (Wiley, NY, 1999).

Mizrahi et al., "Mirror Manipulation by Attractive and Repulsive Forces of Guided Waves," Opt. Express 13 (2005) pp. 9804-9811.

Mizrahi et al., "Two Slab Optical Spring," Optics Lett. 32 (2007) pp. 692-694.

Nichol et al., "Thin Membrane Self-alignment using Nanomagnets for Three-dimensional Nanomanufacturing," J. Vac. Sci. Tech B (Microelectronics & Nanometer Structures) 24 (2006) pp. 3128-3132.

Nichols et al., "A Preliminary Communication on the Pressure of Heat and Light Radiation," Phys. Rev. 13 (1901) pp. 307-320.

Nielson et al., "Integrated Wavelength-selective Optical MEMS Switching using Ring Resonator Filters," IEEE Photonics Tech. Lett. 17 (2005) pp. 1190-1192.

Nielson, G.N., "Micro-opto-mechanical Switching and Tuning for Integrated Optical Systems," Ph.D. Thesis, Massachusetts Institute of Technology (2004).

Notomi et al., "Optomechanical Wavelength and Energy Conversion in High-Q Double-layer Cavities of Photonic Crystal Slabs," Phys. Rev. Lett. 97 (2006) 023903.

Oda et al., "A Wide-FSR Waveguide Double-Ring Resonator for Optical FDM Transmission Systems," 9 J. Lightwave Tech. 6, pp. 728-736 (1991).

Okamoto, K., Fundamentals of Optical Waveguides, (Elsevier Academic Press, MA, 2006).

Philipp et al., "Amorphous Silicon Rich Silicon Nitride Optical Waveguides for High Density Integrated Optics," 40 IEEE Electronics Letters 7, pp. 419-420 (Apr. 2004).

Popovic et al., "General Approach to Hitless Switching and FSR Extension Resonators in Integrated Photonic Circuits," (2006) Paper OW166.

Popovic, M., "Complex-frequency Leaky Mode Computations using PML Boundary Layers for Dielectric Resonant Structures," Proc. of Integ. Photonics Res. (Jun. 2003).

Povinelli et al., "Evanescent-wave Bonding Between Optical Waveguides," Optical Lett. 30 (2005) pp. 3042-3044.

Povinelli et al., "High-Q Enhancement of Attractive and Repulsive Optical Forces between Coupled Whispering-gallery-mode Resonators," Opt. Express 13 (2005) pp. 8286-8295.

Qi et al., "A Three-dimensional Optical Photonic Crystal with Designed Point Defects," Nature 429 (2004) pp. 538-542.

Rakich et al., "Achieving Centimeter-scale supercollimation in a Large-area Two-dimensional Photonic Crystal," Nature Materials 5 (2006) pp. 93-96.

Rakich et al., "Cavity-Trapping via Optical-forces in Integrated Photonics," Massachusetts Institute of Technology, (2006).

Rakich et al., "Ultrawide Tuning of Photonic Microcavities via Evanescent Field Perturbation," Optics Lett. 31 (2006) pp. 1241-1243.

Sarid, D., Scanning Force Microscopy with Applications to Electric, Magnetic, and Atomi Forces, (Oxford University Press, NY, 1994).

Scotti et al., "A Hitless Reconfigureable Add-Drop Multiplexer of WDM Networks Utilizing Planar Waveguides, Thermo-Optic Switches and UV-Induced Gratings," OFC Tech. Dig., pp. 142-143 (1998).

Song et al., "Ultra-high-Q Photonic Double-heterostructure Nanocavity," Nature Materials 4 (2005) pp. 207-210.

Srinivasan et al., "Alkyltrichlorosilane-based Self-assembled Monolayer Films for Stiction Reduction in Silicon Micromachines," J. of Microelectromechanical Sys. 7 (1998) pp. 252-260.

Tormen, "Passive Optical Integrated Components for Telecommunication," Universite De Nice-Sophia Antipolis (2003) 196 pages.

Van Spengen et al., "A Physical Model to Predict Stiction in MEMS," J. of Micromechanics & Microengineering 12 (2002) pp. 702-713.

Yanagase et al., "Box-Like Filter Response and Expansion of FSR by a Vertically Triple Coupled Microring Resonator Filter," 20 J. Lightwave Tech. 8, pp. 1525-1529 (2002).

Popovic et al., "Multistage High-Order Microring-Resonator add-drop Filters," 31 Optics Lett. 17 (Sep. 2006) pp. 2571-2573.

Popovic et al., "High-index-contrast, Wide-FSR Microring-Resonator Filter Design and Realization with Frequency-shift Compensation," in Optical Fiber Communication Conf., Tech. Dig. (2005) Paper OFK1, vol. 5, pp. 213-215.

Baehr-Jones et al., "High-Q ring Resonators in Thin Silicon-on-Insulator," Appl. Phys. Lett., vol. 85, No. 16 (Oct. 18, 2004) pp. 3346-3347.

Barwicz, "3D analysis of scattering losses due to sidewall roughness in microphotonic waveguides: high index-contrast," Conf. on Lasers and Electro-Optics (CLEO), (May 22, 2005) vol. 2, pp. 1333-1335.

Becker et al., "Optical properties of semiconductors. III. infra-red transmission of silicon," Physical Review USA, vol. 76 (Nov. 15, 1949) pp. 1531-1532.

Chan et al., "Single-mode and polarization-independent silicon-on-insulator waveguides with small cross section," Journal of Lightwave Technology, vol. 23, No. 6 (Jun. 2005) pp. 2103-2111.

Daldosso et al., "Comparison Among Various $Si_3N_4$ Waveguide Geometries Grown Within a CMOS Fabrication Pilot Line," Journal of Lightwave Technology, vol. 22, No. 7 (Jul. 2004) pp. 1734-1740.

Daldosso et al., "Fabrication and optical characterization of thin two-dimensional $Si_3N_4$ waveguides," Materials Science in Semiconductor Processing, 7 (2004) pp. 453-458.

Dumon et al., "Low-loss photonic wires and compact ring resonators in silicon-on-insulator," Proceedings of the SPIEE, vol. 5450, No. 1 (2004) pp. 360-368.

Guo et al., "Characterization of $Si_3N_4/SiO_2$ planar lightwave circuits and ring resonators," Proceedings of SPIE, vol. 5350 (2004) pp. 13-22.

Guo et al., "High-Q microring resonator for biochemical sensors," Proc. of SPIE, (2005) vol. 5728, pp. 83-92.

International Search Report and Written Opinion for PCT/US2007/026513, mailed Jun. 19, 2008.

Johnson et al., "Perturbation theory for Maxwell's equations with shifting boundaries," Phys. Rev. E 65, 066611 (2002).

Little, Very high-order microring resonator filters for WDM applications,: IEEE Photonics Technology Letters, vol. 16, No. 10 (Oct. 2004) pp. 2263-2265.

Melchiorri et al., "Propogation losses of silicon nitrade waveguides in the near infrared range," Appl. Phys. Lett. 86, 121111 (2005).

Popovic et al., "High-index-contrast, wide-FSR microring-resonator filter design and realization with frequency-shift compensation," Optical Fiber Communication Conference (OFC/NFOEC) Technical Digest (Optical Society of America, Washington, D.C., Mar. 6-11, 2005), paper OFK1, vol. 5, pp. 213-215.

Popovic et al., "Multistage high-order microring-resonator add-drop filters," Optics Letters, vol. 31, No. 17 (Sep. 1, 2006) pp. 2571-2573.

Popovic, "Air trenches for dense silica integrated optics," M.S. Thesis, MIT, Dept. of Electrical Engineering and Computer Science (Feb. 2002) p. 53.

Saynatjoki, Arpiainen, Ahopelto, & Lipsanen, "High-index-contrast Optical Waveguides on Silicon," 2 pages, (2004).

Spector et al., "Hybrid multi-mode/single-mode waveguides for low loss," Massachusetts Institute of Technology, 3 pages, (2004).

* cited by examiner

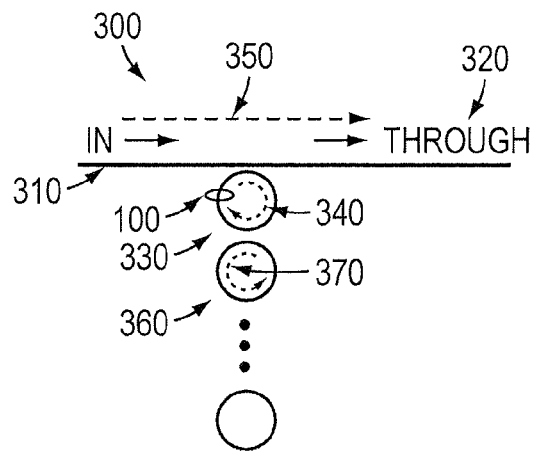
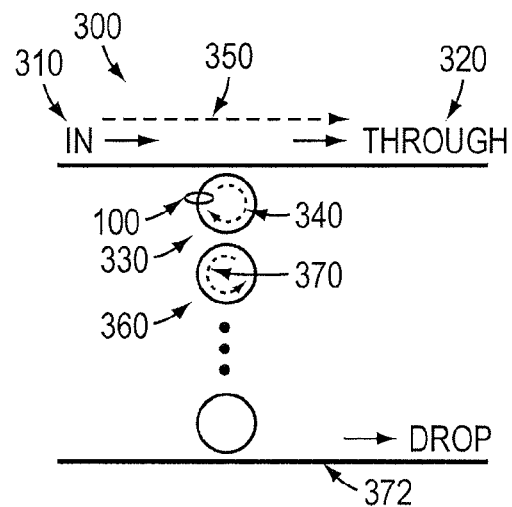
FIG. 3A
FIG. 3B
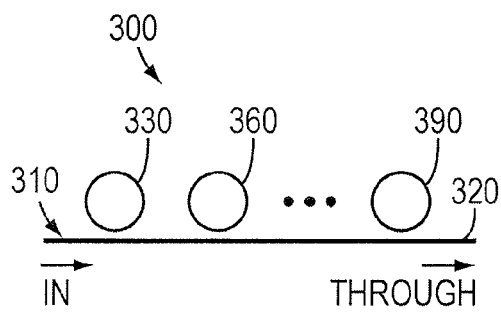
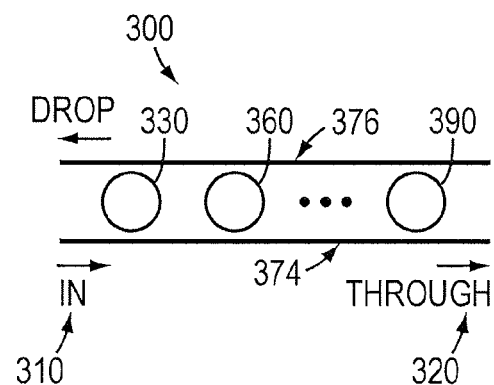
FIG. 3C
FIG. 3D

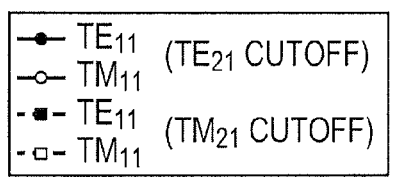
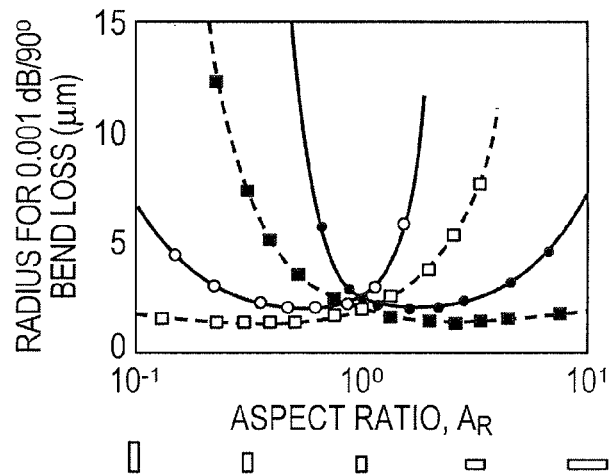
FIG. 8A
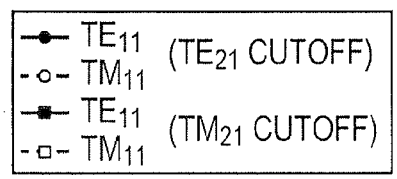
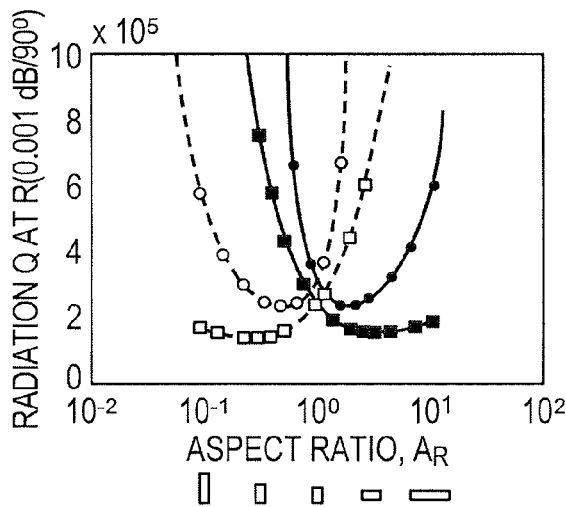
FIG. 8B
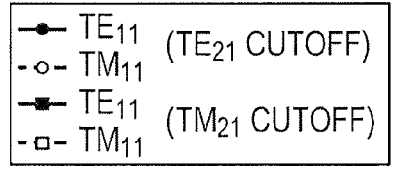
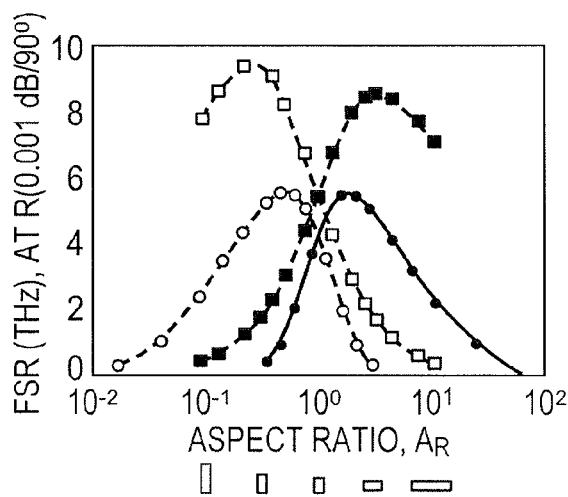
FIG. 8C

| PARAMETER | CONDITION | FROM FIG: | WAVEGUIDE ASPECT RATIO CONSTRAINTS ||||||
|---|---|---|---|---|---|---|---|---|
| | | | TE-TE ||| TM-TM |||
| EFFECTIVE INDEX | NO CROSSING | 7A, 7B | | a != | 3 | | a != | 3 |
| FSR | > 2 THz | 9B | 0.5 | < a < | 15 | | a < | 3.2 |
| FREQUENCY vs. WIDTH | < 40 GHz/nm | 10A | 6 | < a | | 1.8 | < a | |
| THERMAL TUNABILITY | 2 THz WITH ΔT = 300K | 12 | 0.5 | < a < | 20 | | < a < | 3.5 |
| Si SUBSTRATE LOSS | 2 μm BELOW, Q ≥ 250k | 14A, 14B | | a < | 20 | | < a < | 5 |
| | < 0.1 dB/cm | 13A, 13B | | a < | 20 | | < a < | 5 |
| METAL (Cr) HEATER LOSS | 100 nm THICK, 1 μm ABOVE, Q ≥ 250k | 4B, 4C | | a < | 7 | | a < | 2.5 |
| COUPLING GAP HO. COMPAT. | 40 GHz BW, 2 THz FSR | 16B | ANY ||| ANY (X2 OF TE GAPS) |||
| GAP SENSITIVITY TO WG WIDTH | < 0.5%/nm | 17A | 1.5 | < a | | ANY ||| 
| GAP SENSITIVITY TO WG HEIGHT | (HT KNOWN/UNIFORM TO < 5 nm, NO COND) | 17B | CHALLENGING ||| CHALLENGING |||

FIG. 18

| | STANDARD TE → | NEW TE DESIGN TE → | TM | NEW TM DESIGN TM ↑ | TE |
|---|---|---|---|---|---|
| SCATTERING LOSS (dB/cm) | 3.5 | 1 | | 1 | |
| SCATTERING LOSS Q | 200k | 500k | 6M | 500k | 300k |
| BEND LOSS Q (FSR = 2 THz) | | ~$10^8$ | ~10 (DEAD) | ~$10^8$ | ~$10^{14}$ |

FABRICATION-TOLERANT WAVEGUIDES AND RESONATORS

RELATED APPLICATION

This application claims the benefit of and priority to U.S. Provisional Application Ser. No. 60/878,013 filed Dec. 29, 2006, the disclosure of which is hereby incorporated by reference in its entirety.

TECHNICAL FIELD

The invention relates generally to the field of integrated optics, and in particular to high-index-contrast, strongly confined waveguides with fabrication-tolerant and optically optimized designs that enable the realization of efficient integrated optical waveguide structures. Such structures include resonant filters and interferometers suitable for optical channel add-drop filters, dispersion-compensating all-pass filters, slow-wave resonator-based structures for channelized modulators, amplifiers, wavelength converters, and, generally, structures employing optical waveguides, and preferably employing a plurality of optical resonators or interferometric optical paths.

BACKGROUND

Integrated optics enables large-scale integration of optical components on a chip, and enables complex optical processing to be achieved, including enabling functionality that is not practicably achievable with bulk components. High-index-contrast (HIC) optical waveguides and resonators, having a large difference between the core and cladding refractive indices, allow components only a few wavelengths in size that have substantially low radiation losses. For example HIC, strongly-confined microring resonators support small bending radii (on the order of a few micrometers) with low radiation losses, thus permitting large free-spectral-range (FSR>20 nanometers (nm)) and high quality factor (Q>100,000) resonances that are important for frequency selective filters for multiple applications, including optical channel add-drop filters for wavelength-division-multiplexed (WDM) networks. Multiple frequency-aligned resonators may be combined into higher-order filters to provide more complex and selective filter response function shapes.

Wavelength-division-multiplexed (WDM) optical transmission systems carry multiple wavelength channels simultaneously on a single guiding optical line. Their large information capacity is useful in telecommunication applications, but also for intra-chip and inter-chip photonic networks for advanced high-performance microprocessors and systems for supercomputers; and for various high-bandwidth applications where electronic-photonic hybrid integrated circuits may offer significant advantages, such as high-resolution, high-sampling-rate analog-to-digital converters, voice and image data processing, and biological data processing that are well suited to data parallelism.

To offer the possibility of WDM signal processing, such as switching and routing, all in the optical domain on a chip, integrated optical circuits comprising various functional optical components need to employ waveguiding structures that can couple light efficiently to and from optical fibers.

Optical channel add-drop filters (CADFs) are one important class of functional optical components employed in integrated optical circuits. CADFs typically have an input port, at least a drop or add port, a through port, and preferably a further port which, in combination with the drop or add port, forms a pair of add and drop ports. CADFs support narrow passbands covering typically a single wavelength channel. They enable transmission of a signal in the selected wavelength channel within the passband from the input port to the drop port with low loss (preferably less than 3 dB), while suppressing crosstalk from signals in other wavelength channels in the operating wavelength range (OWR) of the filter (preferably by at least 30 dB). All channels outside the filter passband and in the OWR of the filter are transmitted from the input port to the through (or express) port, preferably with much less than 3 dB insertion loss. The selected wavelength channel within the filter passband is typically fully removed from the input spectrum with preferably over 30-40 dB extinction of the signal remaining in the through port. This high extinction helps prevent crosstalk with a new signal, incident at the add port, which is inserted into the through port at the selected channel wavelength. Wavelength channel passbands are typically 10-100 GHz wide and are typically spaced by 25-200 GHz as, for example, specified by the International Telecommunications Union (ITU) wavelength grid standards.

The OWR of a CADF is preferably a wide optical band, e.g., the C-band communication window of 1530-1570 nm.

Integrated optical filters with a single passband over a wide operating wavelength range can be made using optical resonators, for example microring resonators, with a large FSR equal to or larger than the OWR, such that only one resonance lies within the range. Large FSR resonators can be made by making the resonator small in size so that, in traveling-wave resonators like rings, the path length is short and spaces longitudinal resonances further apart spectrally. Small ring resonators have tight bend radii and optical radiation confined and propagating in such a ring tends to experience bending radiation loss, giving rise to a low quality factor, Q. Radiation loss can be reduced to an acceptable level by designing waveguides using high refractive index contrast (HIC) between the waveguide core and cladding, such as SiN (n~2.2 near 1550 nm wavelength) or Si (n~3.5) core, and silica (n~1.45) or air (n~1) cladding. In turn, HIC resonators are small and require fine lithography, can have significant propagation losses due to surface roughness, and their resonant frequency may be sensitive to small dimensional errors resulting in fabrication.

At the same time that HIC waveguides, resonators and interferometers provide important enabling features for CADFs and other integrated optical devices, they pose significant challenges. On the one hand, HIC provides strong optical confinement, thereby enabling small optical resonators with low radiation losses and thus high loss Q's. Small resonators lead to both high integration density, and large FSR. On the other hand, HIC waveguides provide significant fabrication challenges. One challenge is the requirement of finer lithographic resolution to realize the smaller features of HIC devices. More important is the challenge to combat the sensitivity of HIC structures to dimensional and index variations. For example, to make a microring resonator with a polarization-independent resonance frequency would require atomic-scale dimensional control.

Preferably, during the dynamic reconfiguration of optical components such as reconfigurable optical add-drop multiplexers (R-OADMs), i.e., of their add-drop filters, that operate on a subset of the WDM spectrum, the data flow on other express wavelength channels in the through port is not interrupted or deteriorated (e.g., by insertion loss or dispersion) during the reconfiguration operation. This is referred to as hitless switching or hitless reconfiguration of the optical component. Some waveguide designs for hitless switchable integrated-optical filters require use of a combination of resonators and interferometers. In such cases the sensitivity of interferometer components is equally critical.

In general, resonance frequency sensitivity in multiple-resonator filters is important when it is desired to have the filter frequency aligned without post-fabrication trimming or tuning. It is possible, in principle, to apply tuning elements to individual resonators, such as one heater per resonator where thermo-optic index tuning is employed. However, it is still important to align the resonance frequencies prior to actuation of tuning elements. This is because the tuning range of the device may be reduced if a part of the tuning range of various tuning elements is used to first compensate for resonance misalignment between resonant cavities due to fabrication sensitivities and errors.

A further important concern in HIC is the sensitivity of the propagating mode to surface roughness on the waveguide core and any other layers seen by the optical mode. HIC generally enhances sensitivity because a high index perturbation more strongly scatters light than a low index perturbation. As a result, propagation loss may result from sidewall and top/bottom-wall roughness in HIC waveguides. Sidewall roughness is typically determined by lithography and etching processes, and tends to be much larger than the top/bottom-wall roughness of an HIC waveguide, made by a typical planar fabrication process based on lithography. There are several other possible sources of loss in the HIC core material (or in the cladding material, which is relevant only in the spatial region where the optical mode has substantial intensity). These sources may include material absorption, and bulk scattering such as scattering from spatial index non-uniformities (that may be due to density variation) or Rayleigh scattering from a crystal lattice. Crystalline core or cladding materials typically have negligible intrinsic absorption for wavelengths with a photon energy below the bandgap energy of the material. For silicon, an important core material, the intrinsic absorption is negligible in the 1500-1600 nm wavelength region used for telecom applications, as well as generally at wavelengths longer than the bandgap wavelength around 1100 nm. Non-ideal crystalline structure or dangling bonds have been found to cause absorption. Methods have been published in integrated optics literature to permit passivation that substantially reduces absorption centers. On the other hand, loss due to Rayleigh scattering from the lattice of an ideal crystalline material is small in comparison to the sidewall and top/bottom-wall roughness loss. Therefore it is expected that the waveguide propagation loss will ultimately be limited by sidewall and top/bottom-wall roughness.

Generally, the prior art describes waveguides with square and near-square (up to about 2:1 aspect ratio) core-region cross-sections. This is because it is generally recognized in the art of designing waveguides as desirable to aim as a design goal for the maximum possible strength of optical confinement (i.e., maximum effective index of the guided mode), and in many cases for polarization independent operation. Strong confinement in waveguides permits small bending radius while guaranteeing substantially low bending radiation loss, which in turn enables the design of small bends, and ring resonators with large FSR and low loss, i.e., high loss Q (e.g., >10,000 to 100,000). Strongest confinement is generally known to be provided in square or near square waveguides (up to about 2:1 aspect ratio in index contrasts approximately up to 2.5:1), since, given the constraint of maintaining e.g., single TE mode operation, the majority of the optical field is contained in the core in such cross-sections, thus giving maximal effective index (and thus maximal confinement). A further constraint in high-index contrast waveguide design has been the available thicknesses of core materials. Silicon-on-insulator (Si core index 3.5) wafers are typically available with a 200 nm Si layer so nearly all Si waveguide designs are about 200 nm to 250 nm thick.

Stoichiometric silicon nitride ($Si_3N_4$ index 2.0) is a second material used for waveguides with moderate index contrast. It is well known in current literature that the core layer thicknesses of $Si_3N_4$ that can be grown are limited by stress build-up to about 300 nm, as thicker layers may crack due to stress. This is the reason why most $Si_3N_4$ waveguides are typically no more than 200-300 nm thick. See, e.g., N. Daldosso, et al., "Fabrication and optical characterization of thin two-dimensional $Si_3N_4$ waveguides," *Materials Science in Semiconductor Processing* 7 (2004) pp. 453-458; N. Daldosso et al., "Comparison Among Various $Si_3N_4$ Waveguide Geometries Grown Within a CMOS Fabrication Pilot Line," *Journal of Lightwave Technology*, Vol. 22, No. 7 (July 2004) pp. 1734-1740; and M. Melchiorri, et al., "Propagation losses of silicon nitride waveguides in the near infrared range," *Appl. Phys. Lett.* 86, 121111 (2005), all of which are incorporated by reference herein. Silicon-rich SiN (with about 2.2 index) has also been used as a core material. Since it can be grown in thick layers (400 nm and higher), the aspect ratios used in this system are about 2:1 or smaller. See Popovic, M. et al., "Multistage high-order microring-resonator add-drop filters, " *Optics Letters*, Vol. 31, No. 17 (Sep. 1, 2006) pp. 2571-2573; M. A. Popovic, M. R. Watts, T. Barwicz, P. T. Rakich, L. Socci, E. P. Ippen, F. X. Kartner and H. I. Smith, "High-index-contrast, wide-FSR microring-resonator filter design and realization with frequency-shift compensation," in *Optical Fiber Communication Conference* (OFC/NFOEC) Technical Digest (Optical Society of America, Washington, D.C., Mar. 6-11, 2005), paper OFK1, vol. 5, pp. 213-215, both of which are incorporated by reference herein. Particularly in doped-silica and semiconductor ridge waveguides, attempts to provide polarization independent operation, i.e., identical effective indices for the fundamental TE and TM modes, also lead one to consider square or near-square waveguides. See B. E. Little, et al., "Very high-order microring resonator filters for WDM applications," *IEEE Photonics Technology Letters*, Vol. 16, No. 10 (October 2004) pp. 2263-2265; and Chan, S. P. et al., "Single-mode and polarization-independent silicon-on-insulator waveguides with small cross section," *Journal of Lightwave Technology*, Vol. 23, No. 6 (June 2005) pp. 2103-2111, both of which are incropated by reference herein.

Previous literature also considers waveguides with aspect ratios larger than 2:1. See, e.g., Baehr-Jones, T., et al., "High-Q ring Resonators in Thin Silicon-on-Insulator," *Applied Physics Letters*, Vol. 85, No. 16 (18 Oct. 2004) pp. 3346-3347; And Guo, J., et al., "Characterization of $Si_3N_4$/$SiO_2$ planar lightwave circuits and ring resonators," *Proceedings of SPIE*, Vol. 5350 (2004) pp. 13-22, both of which are incorporated by reference herein. In high index contrast (2.5:1), waveguides with about 4:1 aspect ratio in Si were made in order to reduce confinement of the optical mode in the core and force more of the mode field out into the cladding, so that it may see less absorption in the core, where the core material may have absorption. In lower index contrast (about 1:4), waveguides with 6:1 aspect ratio in $Si_3N_4$ were made in order to increase confinement, while maintaining single-mode operation, because the thickness could not be increased due to the material-stress-caused maximum thickness constraint. The motivation for increasing width relative to height in these cases is to increase the optical confinement by increasing area, under a core thickness constraint, or to expel the field from the core, by decreasing thickness, and thus reduce confinement.

It is important to develop waveguide designs that have low sensitivity to fabrication errors and that accumulate minimal propagation loss from a given surface roughness of the waveguide.

SUMMARY

The issue of high sensitivity to dimensional errors and surface roughness in strongly confined (high index contrast) resonant structures, in particular filters, comprising a plurality of resonators is addressed. At the same time, strong confinement, large FSR and high tunability are maintained. For example, structures that comprise a plurality of resonators require the precise frequency alignment of those resonators. The designs presented herein provide optimized, fabrication-tolerant waveguide designs for filters and tunable filters, and in general multi-cavity resonant structures, based on coupled microring resonators. Distinct advantages have been found of using aspect ratios of about 5:1 and larger in the TE polarization, with an index contrast of about 1.5:1 or larger. In addition, designs with sufficiently strong confinement have been found that enable efficient devices by operating in the TM polarization. These designs have similar performance, loss and tolerance characteristics to the TE designs, but require a mapping to a corresponding equivalent aspect ratio suitable for the TM design, with efficient aspect ratios found around 2:1 in an example, and sized so that they may confine multiple TE modes but only one TM mode.

The technology disclosed herein and various inventive concepts related thereto focus on improved high-index-contrast (HIC) waveguide designs for integrated optical devices including waveguides, resonators and interferometers. HIC devices have a high index contrast between the highest-index core material and at least one cladding material. The waveguide designs disclosed herein are preferably used with a single propagating polarization state in the majority of the optical circuit.

In some embodiments of the disclosed technology, designs are provided that have reduced sensitivity to relevant dimensional errors of the propagation constant (in the case of waveguides and interferometers) or of the resonant frequency (in the case of resonators, including microring resonators). In another aspect of the disclosed technology, designs are provided that have low sensitivity to the roughness and fabrication imperfections on the sidewalls and top/bottom-walls of an HIC waveguide, in the sense that they accumulate reduced propagation loss due to a given roughness amplitude.

In another embodiment of the technology disclosed herein, a method is provided for obtaining an optical propagating mode with low sensitivity to sidewall dimensional errors and low loss due to sidewall roughness. The method entails choosing an appropriate aspect ratio for the waveguide cross-section, choosing a cross-section area such that more than one guided TE mode is supported, and for propagation making use of a TM guided mode that is polarized along the shorter cross-sectional dimension of the core, such that it is a second or higher-order guided mode. The TM mode used is preferably the sole guided TM mode in the operating wavelength range, but may also be one of several TM modes.

Fabrication-tolerant HIC resonator and interferometer designs are described that are based on the concepts described above. In addition, HIC microring resonator designs are described that have the smallest radius for a given radiation loss due to bending, i.e., the largest FSR for a given radiation Q.

In a first aspect, embodiments of the invention relate to an optical waveguide. The waveguide includes a core region disposed over a substrate. The core region may have a substantially rectangular cross-section and may include a core material, which may include a semiconductor and may be substantially transparent within an operating wavelength range having a free-space center wavelength. A cladding region may surround the core region, with the cladding region (i) including at least one cladding material having a refractive index, and (ii) having a maximum cladding refractive index equal to the largest refractive index of the at least one cladding material. The rectangular cross-section may have an aspect ratio $A_R$ defined by a ratio of a width of the rectangular cross-section to a height of the rectangular cross-section; the aspect ratio may be at least 5:1, and a height of the core region may be between $1/150$ and $1/10$ of the free-space center wavelength.

One or more of the following features may be included. The semiconductor may be single crystalline, and/or the free-space center wavelength may be about 1.5 μm. A core refractive index of the core material may be at least 1.5 times as large as the maximum cladding refractive index or may be approximately equal to a refractive index of crystalline silicon. The highest cladding refractive index may be approximately equal to a refractive index of silica. The aspect ratio, the height, and the width of the core region cross-section may cooperate to support a single TE mode. The height may be selected from a range of 10 nm to 150 nm. The optical waveguide may further include a slanted sidewall defining a sidewall angle of less than 5 degrees with respect to a top portion of the optical waveguide.

In another aspect, embodiments of the invention relate to an optical waveguide. The optical waveguide includes a core region disposed over a substrate. The core region may have a substantially rectangular cross-section and include a core material, which may include a semiconductor and be substantially transparent within an operating wavelength range having a free-space center wavelength. A cladding region may surround the core region; the cladding region (i) may include at least one cladding material having a refractive index, and (ii) may have a maximum cladding refractive index equal to the largest refractive index of the at least one cladding material. The rectangular cross-section may have an aspect ratio $A_R$ defined by a ratio of a width of the rectangular cross-section to a height of the rectangular cross-section; the aspect ratio may be at least 5:1, and an area of the core region cross-section may be less than or equal to $0.047+0.057\times[\mathrm{sech}(3\times A_R)]^{0.44}$ square micrometers.

In another aspect, embodiments of the invention may include an optical interferometer. The optical interferometer may include a first optical path associated with a first propagating optical mode and a second optical path associated with a second propagating optical mode. A first optical coupler and a second optical coupler may each be configured to couple optical power from the first optical path to the second optical path and/or from the second optical path to the first optical path. A waveguide may include a core region having a substantially rectangular cross-section and including a core material; the core material may have a core refractive index and may be substantially transparent within an operating wavelength range having a free-space center wavelength. A cladding region may surround the core region; the cladding region (i) may include at least one cladding material having a refractive index, and (ii) may have a maximum cladding refractive index equal to the largest refractive index of the at least one cladding material. The rectangular cross-section may have an aspect ratio defined by a ratio of a width of the rectangular cross-section to a height of the rectangular cross-section. The aspect ratio may be at least 5:1, a height of the core region may be between 1/150 and 1/10 of the free-space center wavelength, the core refractive index may be at least 1.5 times the maximum cladding refractive index, and at least one of the first and second optical paths may include the waveguide.

In another aspect, embodiments of the invention may relate to an optical ring resonator. The optical ring resonator may include an optical path associated with a propagating optical mode. The optical path may include an optical waveguide with a core region having a substantially rectangular cross-section and including a core material; the core material may have a core refractive index and may be substantially transparent within an operating wavelength range having a free-space center wavelength. A cladding region may surround the core region; the cladding region (i) may include at least one cladding material having a cladding refractive index, and (ii) may have a maximum cladding refractive index equal to the largest refractive index of the at least one cladding material. The rectangular cross-section may have an aspect ratio defined by a ratio of a width of the rectangular cross-section to a height of the rectangular cross-section, and the aspect ratio may be at least 5:1. A height of the core region may be between 1/150 and 1/10 of the free-space center wavelength, and the optical path may be closed. Light propagating at a point along the optical path may return, with a substantial fraction of power remaining, to the point after a round-trip delay time equal to a closed-loop length of the path divided by the group velocity of the propagating optical mode, and the core refractive index may be at least 1.5 times the maximum cladding refractive index.

In another aspect, embodiments of the invention may include an optical filter. The optical filter may include an input port associated with a first propagating optical mode and an output port associated with a second propagating optical mode. An optical ring resonator may include a first optical path associated with a third propagating optical mode, the first optical path including an optical waveguide. The optical waveguide may include a core region having a substantially rectangular cross-section and including a core material, the core material having a core refractive index and being substantially transparent within an operating wavelength range having a free-space center wavelength The optical waveguide may also include a cladding region surrounding the core region; the cladding region may (i) include at least one cladding material having a cladding refractive index, and (ii) may have a maximum cladding refractive index equal to the largest cladding refractive index of the at least one cladding material. The optical ring resonator may further include a second optical path coupled to the input port, the output port, and the optical ring resonator. The rectangular cross-section may have an aspect ratio defined by a ratio of a width of the rectangular cross-section to a height of the rectangular cross-section; the aspect ratio may be at least 5:1 and a height of the core region may be between 1/150 and 1/10 of the free-space center wavelength. The first optical path may be closed insofar as light propagating at a point along the first optical path returns, with a substantial fraction of power remaining, to the point after a round-trip delay time equal to a closed-loop length of the first optical path divided by the group velocity of the third propagating optical mode, and the core refractive index may be at least 1.5 times the maximum cladding refractive index.

The first propagating optical mode may be the same as the second propagating optical mode.

In another aspect, embodiments of the invention may include a directional coupler. The directional coupler includes a first optical path associated with a first propagating optical mode, a second optical path associated with a second propagating optical mode, and an optical power coupler coupled to the first and the second optical paths. The optical power coupler may couple a substantial fraction of (i) the optical power propagating in the first optical path to the second optical path and/or (ii) the optical power propagating in the second optical path to the first optical path. At least one of the first and second optical paths may include an optical waveguide including a core region having a substantially rectangular cross-section and including a core material, the core material having a core refractive index and being substantially transparent within an operating wavelength range having a free-space center wavelength; and a cladding region surrounding the core region, the cladding region (i) including at least one cladding material having a cladding refractive index, and (ii) having a maximum cladding refractive index equal to the largest refractive index of the at least one cladding material. The rectangular cross-section may have an aspect ratio defined by a ratio of a width of the rectangular cross-section to a height of the rectangular cross-section, the aspect ratio may be at least 5:1, a height of the core region may be between 1/150 and 1/10 of the free-space center wavelength, and the core refractive index may be at least 1.5 times the maximum cladding refractive index.

In another aspect, embodiments of the invention may include a ring filter. The ring filter may include an optical port and a first optical path including a first optical waveguide; the first optical path may couple the optical port to a first optical ring resonator. The first optical ring resonator may include a first closed optical path associated with a first propagating optical mode; the first closed optical path may include a second optical waveguide including a first core region having a substantially rectangular first cross-section and including a first core material, the first core material having a first core refractive index and being substantially transparent within an operating wavelength range having a first free-space center wavelength. The first closed optical path may also include a first cladding region surrounding the first core region, the first cladding region (i) including at least one cladding material having a cladding refractive index, and (ii) having a maximum cladding refractive index equal to the largest cladding refractive index of the at least one cladding material. The ring filter may also include a second optical ring resonator optically coupled to the first optical ring resonator, the second optical ring resonator including a second closed optical path associated with a second propagating optical mode, the second closed optical path including a third optical waveguide. The rectangular first cross-section may have a first aspect ratio defined by a ratio of a width of the rectangular first cross-section to a height of the rectangular first cross-section, and the first aspect ratio may be at least 5:1. A height of the first core region may be between 1/150 and 1/10 of the first free-space center wavelength, and light propagating at a point along the first closed optical path may return, with a substantial fraction of power remaining, to the point after a round-trip delay time equal to a closed-loop length of the path divided by the group velocity of the first propagating optical mode. The first core refractive index may be at least 1.5 times the maximum cladding refractive index.

One or more of the following features may be included. The third optical waveguide may include a second core region having a substantially rectangular second cross-section and including a second core material, the second core material having a second refractive index and being substantially transparent within an operating wavelength range having a second free-space center wavelength. The third optical waveguide may also have a second cladding region surrounding the second core region, the second cladding region (i) including at least one cladding material having a refractive index, and (ii) having a maximum cladding refractive index equal to the largest refractive index of the at least one cladding material. The rectangular second cross-section may have a second aspect ratio defined by a ratio of a width of the rectangular second cross-section to a height of the rectangular second cross-section, and the second aspect ratio may be at least 5:1 A height of the second core region may be between $1/150$ and $1/10$ of the second free-space center wavelength, and light propagating at a point along the second closed optical path may return, with a substantial fraction of power remaining, to the point after a round-trip delay time equal to a closed-loop length of the path divided by the group velocity of the second propagating optical mode. The second core refractive index may be at least 1.5 times the maximum cladding refractive index.

Further features may include a tunable ring filter, which may further include a heating element associated with one of the first or second optical ring resonators, the heating element being disposed in proximity to the one of the first and second optical ring resonators at a distance to a respective optical waveguide of the one of the first and second optical ring resonators (i) sufficiently small to facilitate substantial transfer of heat from the heating element to the respective optical waveguide, and (ii) sufficiently great to avoid substantial absorbance by the heating element of optical radiation propagating through the respective optical waveguide. In another embodiment, the tunable ring filter may further include a first and a second heating element, associated with the first and the second optical ring resonators respectively, each heating element being disposed in proximity to a respective optical ring resonator at a distance to the optical waveguide of the respective optical ring resonator (i) sufficiently small to facilitate substantial transfer of heat from each heating element to the respective optical waveguide, and (ii) sufficiently great to avoid substantial absorbance by each heating element of optical radiation propagating respectively through the respective optical waveguide.

The distance may be at least 2 evanescent-mode decay lengths, and may be no more than 5 evanescent-mode decay lengths. The first and second heating elements may each include a metal and a semiconductor.

In another aspect, embodiments of the invention may include a device including a first optical waveguide and a second optical waveguide coupled to the first optical waveguide. The first optical waveguide may include a first core region having a substantially rectangular first cross-section and including a first core material, the first core material including a semiconductor and being substantially transparent within an operating wavelength range having a first free-space center wavelength. The first optical waveguide may also include a first cladding region surrounding the first core region, the first cladding region (i) including at least one cladding material having a first cladding refractive index, and (ii) having a first maximum cladding refractive index equal to the largest refractive index of the at least one cladding material. The second optical waveguide may include a second core region having a substantially rectangular second cross-section and including a second core material, the second core material including a semiconductor and being substantially transparent within an operating wavelength range having a second free-space center wavelength. The second optical waveguide may also include a second cladding region surrounding the second core region, the second cladding region (i) including at least one cladding material having a second cladding refractive index, and (ii) having a second maximum cladding refractive index equal to the largest refractive index of the at least one cladding material. The rectangular first cross-section may have a first aspect ratio defined by a ratio of a width of the rectangular first cross-section to a height of the rectangular first cross-section, and the first aspect ratio may be at least 5:1. A height of the first core region may be between $1/150$ and $1/10$ of the first free-space center wavelength, and the rectangular second cross-section may have a second aspect ratio defined by a ratio of a width of the rectangular second cross-section to a height of the rectangular second cross-section. The second aspect ratio may be at least 5:1, and a height of the second core region may be between $1/150$ and $1/10$ of the second free-space center wavelength.

One or more of the following features may be included. The first core refractive index may be at least 1.5 times the first maximum cladding refractive index, and the second core refractive index may be at least 1.5 times the second maximum cladding refractive index. In an embodiment, the device may include an optical interferometer; the optical interferometer may further include a first optical path associated with a first propagating optical mode and including the first optical waveguide, a second optical path associated with a second propagating optical mode and including the second optical waveguide, and first and second optical couplers may be configured to couple optical power from the first optical path to the second optical path and/or from the second optical path to the first optical path. A portion of the first optical waveguide disposed between the first and second optical couplers may define a first waveguide length, a portion of the second optical waveguide disposed between the first and second optical couplers may define a second waveguide length, and a difference between the first and second waveguide lengths induces an optical response.

The device may include a ring filter, which may include a first and a second ring resonator, and an optical port. The first ring resonator may include the first waveguide, and the second ring resonator may include the second waveguide, each of the first and second waveguides being closed in a loop. The first ring resonator may be coupled to the second ring resonator, and the optical port may be optically coupled to the first ring resonator.

In another aspect, embodiments of the invention may feature a method of propagating optical signals through a waveguide with low loss and low device sensitivity to fabrication imperfections. An optical waveguide having a substantially rectangular cross-section with an aspect ratio defined by a ratio of width to height of at least 5:1 may be provided; the cross-section may support a single mode. Light may be propagated in the optical waveguide solely in the single mode.

One or more of the following features may be included. The single mode may include a TE mode. The optical waveguide may include a core region disposed over a substrate, the core region having the substantially rectangular cross-section and including a core material, the core material including a semiconductor and being substantially transparent within an operating wavelength range having a free-space center wavelength. The optical waveguide may also include a cladding region surrounding the core region, the cladding region (i) including at least one cladding material having a refractive index, and (ii) having a maximum cladding refractive index equal to the largest refractive index of the at least one cladding material. A height of the core region may be between $1/150$ and $1/10$ of the free-space center wavelength.

In another aspect, embodiments of the invention may feature a method of propagating optical signals through a waveguide with low loss and low device sensitivity to fabrication imperfections. The method may begin with providing an optical waveguide having a cross-section with an aspect ratio of width to height of about 1.8:1, the cross-section supporting at least two TE modes and only one TM mode, and the optical waveguide having at least one TE mode with a higher effective index than the TM mode. Light may be propagated in the optical waveguide solely in the TM polarized mode.

One or more of the following features may be included. The optical waveguide may include a core region having a substantially rectangular cross-section and including a core material, the core material including a semiconductor and being substantially transparent within an operating wavelength range having a free-space center wavelength. The optical waveguide may also include a cladding region surrounding the core region, the cladding region (i) including at least one cladding material having a refractive index, and (ii) having a maximum cladding refractive index equal to the largest refractive index of the at least one cladding.

Still more features may be included. The center wavelength may be about 1.5 μm. A core refractive index of the core material may be at least 1.5 times as large as the maximum cladding refractive index or may be approximately equal to a refractive index of crystalline silicon. The highest cladding refractive index may be approximately equal to a refractive index of silica. The cross-section, the height, and the width of the core region cross-section may cooperate to support the single TM mode; the cross-section may encompass the largest possible area corresponding to the given aspect ratio. The waveguide may include a slanted sidewall defining a sidewall angle with respect to a top portion of the optical waveguide, wherein the sidewall angle may be less than 5 degrees. An area of the cross-section may be less than or equal to about $0.403-0.285\times[\text{sech}(1.65\times A_R)]^{0.36}$ square micrometers, or may be equal to or greater than about $0.047+0.057\times[\text{sech}(3\times A_R)]^{0.44}$ square micrometers.

In another aspect, embodiments of the invention may include an optical interferometer including a first optical path associated with a first propagating optical mode, a second optical path associated with a second propagating optical mode, and first and second optical couplers may be configured to couple optical power from the first optical path to the second optical path and/or from the second optical path to the first optical path. The optical interferometer may also include a waveguide including a core region disposed over a substrate, the core region having a substantially rectangular cross-section and including a core material, the core material having a core refractive index and being substantially transparent within an operating wavelength range having a free-space center wavelength. The waveguide may also include a cladding region surrounding the core region, the cladding region (i) including at least one cladding material having a refractive index, and (ii) having a maximum cladding refractive index equal to the largest refractive index of the at least one cladding material. The rectangular cross-section may have an aspect ratio defined by a ratio of a width of the rectangular cross-section to a height of the rectangular cross-section. The aspect ratio may be at least 1.8:1, and the aspect ratio, the height, and the width of the core region cross-section may cooperate to support a single TM mode and more than one TE mode. The core refractive index may be at least 1.5 times the maximum cladding refractive index, and at least one of the first and second optical paths may include the waveguide.

In another aspect, embodiments of the invention may include an optical ring resonator including an optical path associated with a propagating optical mode. The optical path may include an optical waveguide that includes a core region disposed over a substrate, the core region having a substantially rectangular cross-section and including a core material, the core material having a core refractive index and being substantially transparent within an operating wavelength range having a free-space center wavelength. The optical path may also include a cladding region surrounding the core region, the cladding region (i) including at least one cladding material having a refractive index, and (ii) having a maximum cladding refractive index equal to the largest refractive index of the at least one cladding material. The rectangular cross-section may have an aspect ratio defined by a ratio of a width of the rectangular cross-section to a height of the rectangular cross-section, and the aspect ratio may be at least 1.8:1. The aspect ratio, the height, and the width of the core region cross-section may cooperate to support a single TM mode and more than one TE mode, and the optical path may be closed. Light propagating at a point along the optical path may return, with a substantial fraction of power remaining, to the point after a round-trip delay time equal to a closed-loop length of the path divided by the group velocity of the propagating optical mode, and the core refractive index may be at least 1.5 times the maximum cladding refractive index.

In another aspect, embodiments of the invention may include an optical filter including an input port associated with a first propagating optical mode, an output port associated with a second propagating optical mode, an optical ring resonator, and a second optical path coupled to the input port, to the output port, and to the optical ring resonator. The optical ring resonator may include a first optical path associated with a third propagating optical mode. The first optical path may include an optical waveguide that includes a core region disposed over a substrate, the core region having a substantially rectangular cross-section and including a core material, the core material having a core refractive index and being substantially transparent within an operating wavelength range having a free-space center wavelength. The first optical path may also include a cladding region surrounding the core region, the cladding region (i) including at least one cladding material having a refractive index, and (ii) having a maximum cladding refractive index equal to the largest refractive index of the at least one cladding material. The rectangular cross-section may have an aspect ratio defined by a ratio of a width of the rectangular cross-section to a height of the rectangular cross-section, and the aspect ratio may be at least 1.8:1. The aspect ratio, the height, and the width of the core region cross-section may cooperate to support a single TM mode and more than one TE mode, and the first optical path may be closed. Light propagating at a point along the first optical path may return, with a substantial fraction of power remaining, to the point after a round-trip delay time equal to a closed-loop length of the first optical path divided by the group velocity of the third propagating optical mode, and the core refractive index may be at least 1.5 times the maximum cladding refractive index.

The following feature may be included. The first and second propagating modes may include a single propagating mode.

In another aspect, embodiments of the invention may include a directional coupler including a first optical path associated with a first propagating optical mode, a second optical path associated with a second propagating optical mode, and an optical power coupler coupled to the first and the second optical paths. The optical power coupler may couple a substantial fraction of (i) the optical power propagating in the first optical path to the second optical path and/or (ii) the optical power propagating in the second optical path to the first optical path. At least one of the first and second optical paths may include an optical waveguide including a core region disposed over a substrate, the core region having a substantially rectangular cross-section and including a core material, the core material having a core refractive index and being substantially transparent within an operating wavelength range having a free-space center wavelength. The optical waveguide may also include a cladding region surrounding the core region, the cladding region (i) including at least one cladding material having a refractive index, and (ii) having a maximum cladding refractive index equal to the largest refractive index of the at least one cladding material. The rectangular cross-section may have an aspect ratio defined by a ratio of a width of the rectangular cross-section to a height of the rectangular cross-section, the aspect ratio may be at least 1.8:1, and the aspect ratio, the height, and the width of the core region cross-section may cooperate to support a single TM mode and more than one TE mode, and the core refractive index may be at least 1.5 times the maximum cladding refractive index.

In another aspect, embodiments of the invention may include a ring filter including a first optical path including a first optical waveguide coupled to a first optical ring resonator including a second optical path associated with a first propagating optical mode. The second optical path may include a second optical waveguide that includes a first core region disposed over a substrate, the first core region having a substantially rectangular first cross-section having a first core refractive index and including a first core material, the first core material being substantially transparent within an operating wavelength range having a free-space center wavelength. The second optical waveguide may also include a first cladding region surrounding the first core region, the first cladding region (i) including at least one cladding material having a refractive index, and (ii) having a maximum cladding refractive index equal to the largest refractive index of the at least one cladding material. The rectangular first cross-section may have a first aspect ratio defined by a ratio of a width of the rectangular first cross-section to a height of the rectangular first cross-section, and the first aspect ratio may be at least 1.8:1. The aspect ratio, the height, the width of the core region first cross-section may cooperate to support a single TM mode and more than one TE mode, and the first core refractive index may be at least 1.5 times the maximum cladding refractive index. The second optical path may be closed, and light propagating at a first point along the second optical path may return, with a substantial fraction of power remaining, to the first point after a round-trip delay time equal to a closed-loop length of the second optical path divided by the group velocity of the first propagating optical mode. The ring filter may also include at least a second optical ring resonator, coupled to the first optical ring resonator, the second optical ring resonator including a third optical path associated with a second propagating optical mode. The third optical path may include a third optical waveguide that includes a second core region disposed over a substrate, the second core region having a substantially rectangular second cross-section and including a second core material, the second core material being substantially transparent within an operating wavelength range having a free-space center wavelength. The third optical waveguide may also include a second cladding region surrounding the second core region, the second cladding region (i) including at least one cladding material having a refractive index, and (ii) having a maximum cladding refractive index equal to the largest refractive index of the at least one cladding material. The rectangular second cross-section may have a second aspect ratio defined by a ratio of a width of the rectangular second cross-section to a height of the rectangular second cross-section, and the second aspect ratio may be at least 1.8:1. The aspect ratio, the height, and the width of the core region second cross-section cooperate to support a single TM mode and more than one TE mode, and the second core refractive index may be at least 1.5 times the maximum cladding refractive index. The third optical path may be closed, and light propagating at a second point along the third optical path may return, with a substantial fraction of power remaining, to the second point after a round-trip delay time equal to a closed-loop length of the third optical path divided by the group velocity of the second propagating optical mode.

One or more of the following features may be included. The ring filter may be tunable, and may further include a heating element associated with one of the first or second optical ring resonators, the heating element being disposed in proximity to the one of the first and second optical ring resonators at a distance to a respective optical waveguide of the one of the first and second optical ring resonators (i) sufficiently small to facilitate substantial transfer of heat from the heating element to the respective optical waveguide, and (ii) sufficiently great to avoid substantial absorbance by the heating element of optical radiation propagating through the respective optical waveguide. In another embodiment, the ring filter may be tunable, and may further include a first and at least a second heating element, associated with the first and at least the second ring resonators respectively, each heating element being disposed in proximity to a respective optical ring resonator at a distance to the optical waveguide of the respective optical ring resonator (i) sufficiently small to facilitate substantial transfer of heat from each heating element to the respective optical waveguide, and (ii) sufficiently great to avoid substantial absorbance by each heating element of optical radiation propagating through the respective optical waveguide. The distance may be at least 2 evanescent-mode decay lengths, and may be no more than 5 evanescent-mode decay lengths. The first and at least the second heating elements each may include a metal and/or a semiconductor.

An optical waveguide may include a core region having a substantially rectangular cross-section and including a core material, the core material being substantially transparent within an operating wavelength range having a free-space center wavelength and a cladding region surrounding the core region, the cladding region (i) including at least one cladding material having a refractive index, and (ii) having a maximum cladding refractive index equal to the largest refractive index of the at least one cladding material. The rectangular cross-section may have an aspect ratio defined by a ratio of a width of the rectangular cross-section to a height of the rectangular cross-section, and the aspect ratio may be less than 3:4. A core refractive index of the core material may be at least 1.5 times as large as the maximum cladding refractive index, or may be about 3.5 and at least one cladding material has a refractive index near 1.5. The waveguide width may be no more than ⅙ of the free-space center wavelength, or may be no more than 250 nm. The height may be greater than ¼ of the free-space center wavelength, or may be greater than 450 nm. The cross-section may support only one TM mode.

In another aspect, embodiments of the invention may include a microring resonator including an optical path associated with a propagating optical mode. The optical path may include an optical waveguide including a core region having a substantially rectangular cross-section and including a core material, the core material being substantially transparent within an operating wavelength range having a free-space center wavelength and a cladding region surrounding the core region, the cladding region (i) including at least one cladding material having a refractive index, and (ii) having a maximum cladding refractive index equal to the largest refractive index of the at least one cladding material. The rectangular cross-section may have an aspect ratio defined by a ratio of a width of the rectangular cross-section to a height of the rectangular cross-section, and the aspect ratio may be less than 3:4, the optical path may be closed, and light propagating at a point along the optical path may return, with a substantial fraction of power remaining, to the point after a round-trip delay time equal to a closed-loop length of the path divided by the group velocity of the propagating optical mode.

One or more of the following features may be included. The circumference may be smaller than 100 guided wavelengths, a guided wavelength being equal to a free space wavelength divided by an effective index. An area of the cross-section may be less than or equal to about $0.403-0.285 \times [\text{sech}(1.65 \times A_R)]\ 0.36$ square micrometers, or may be equal to or greater than about $0.047+0.057 \times [\text{sech}(3 \times A_R)]\ 0.44$ square micrometers.

In another aspect, embodiments of the invention may include a method of propagating optical signals through a waveguide with strong lateral optical confinement and low bending loss, the method including the steps of providing an optical waveguide having a cross-section with an aspect ratio of width to height of less than about 3:4, the cross-section supporting only one TM mode, and propagating light in the optical waveguide solely in the TM polarized mode.

In a final aspect, embodiments of the invention may include an optical waveguide. The optical waveguide includes a core region disposed over a substrate, the core region having a substantially rectangular cross-section and including a core material, the core material including a semiconductor and being substantially transparent within an operating wavelength range having a free-space center wavelength. A cladding region surrounds the core region, the cladding region (i) including at least one cladding material having a refractive index, and (ii) having a maximum cladding refractive index equal to the largest refractive index of the at least one cladding material. The rectangular cross-section has an aspect ratio $A_R$ defined by a ratio of a width of the rectangular cross-section to a height of the rectangular cross-section, the aspect ratio is at least 5:1, and an area of the core region cross-section is less than or equal to $0.403-0.285 \times [\text{sech}(1.65 \times A_R)]^{0.36}$ square micrometers.

BRIEF DESCRIPTION OF THE DRAWINGS

FIG. 1 is a schematic diagram generally illustrating cross-sections of three waveguide types to which the technology disclosed applies but is not limited to;

FIG. 3a is a schematic diagram depicting an optical filter architecture comprising an input/output waveguide and a plurality of resonators configured to be optically coupled, here in a linear (series-coupled) arrangement;

FIG. 3b is a schematic diagram depicting an optical filter architecture comprising a first input/output waveguide, a second waveguide, a plurality of resonators configured to be optically coupled to each other and to the first and second waveguide, here in a linear (series-coupled) arrangement;

FIG. 3c is a schematic diagram depicting an optical filter architecture comprising an input/output waveguide and a plurality of resonators configured to be optically coupled via the waveguide only, here in a cascaded ("parallel") arrangement;

FIG. 3d is a schematic diagram depicting an optical filter architecture comprising a first input/output waveguide, a second waveguide, a plurality of resonators configured to be optically coupled via the first and second waveguide, here in a cascaded (parallel) arrangement;

FIG. 8a is a graph illustrating the minimum bending radius that supports less than 0.001 dB/90' bending loss vs. waveguide aspect ratio, for fundamental TE and TM modes of each of the TE and TM waveguide designs in FIG. 5;

FIG. 8b is a graph illustrating the quality factor (Q) due to bending loss of the fundamental TE and TM modes in a microring resonator vs. waveguide aspect ratio, for TE and TM waveguide designs, for each waveguide aspect ratio, the resonator having the cross-section dimensions given in FIG. 5, and a radius that supports 0.001 dB/90' bending loss as given in FIG. 8a;

FIG. 8c is a graph illustrating the free spectral range (FSR) of the fundamental TE and TM modes of a microring resonator vs. waveguide aspect ratio, for TE and TM waveguide designs, for each waveguide aspect ratio, the resonator having the cross-section dimensions given in FIG. 5, and a radius that supports 0.001 dB/90' bending loss given in FIG. 8a;

FIG. 13a is a graph illustrating the waveguide propagation loss of a TE waveguide mode of a microring or equivalent waveguide bend section, in dB/cm, corresponding to the Q and configuration in FIG. 14a;

FIG. 18 is a table illustrating a typical microring-resonator filter specification with 2 THz FSR and 40 GHz bandwidth, silicon-core and silica waveguides, and the constraints on the aspect ratio among possible designs in FIG. 5, for TE and TM designs, and based on results in FIGS. 4, 5, 7-14, 16, 17, as relates to typical constraints on a number of the filter criteria;

FIG. 22b is a graph illustrating the resonant filter response of the TM filter design in FIGS. 21a-21c and 22a, when excited by a TE input mode as illustrated in FIG. 22a;

DETAILED DESCRIPTION

Figure 1:
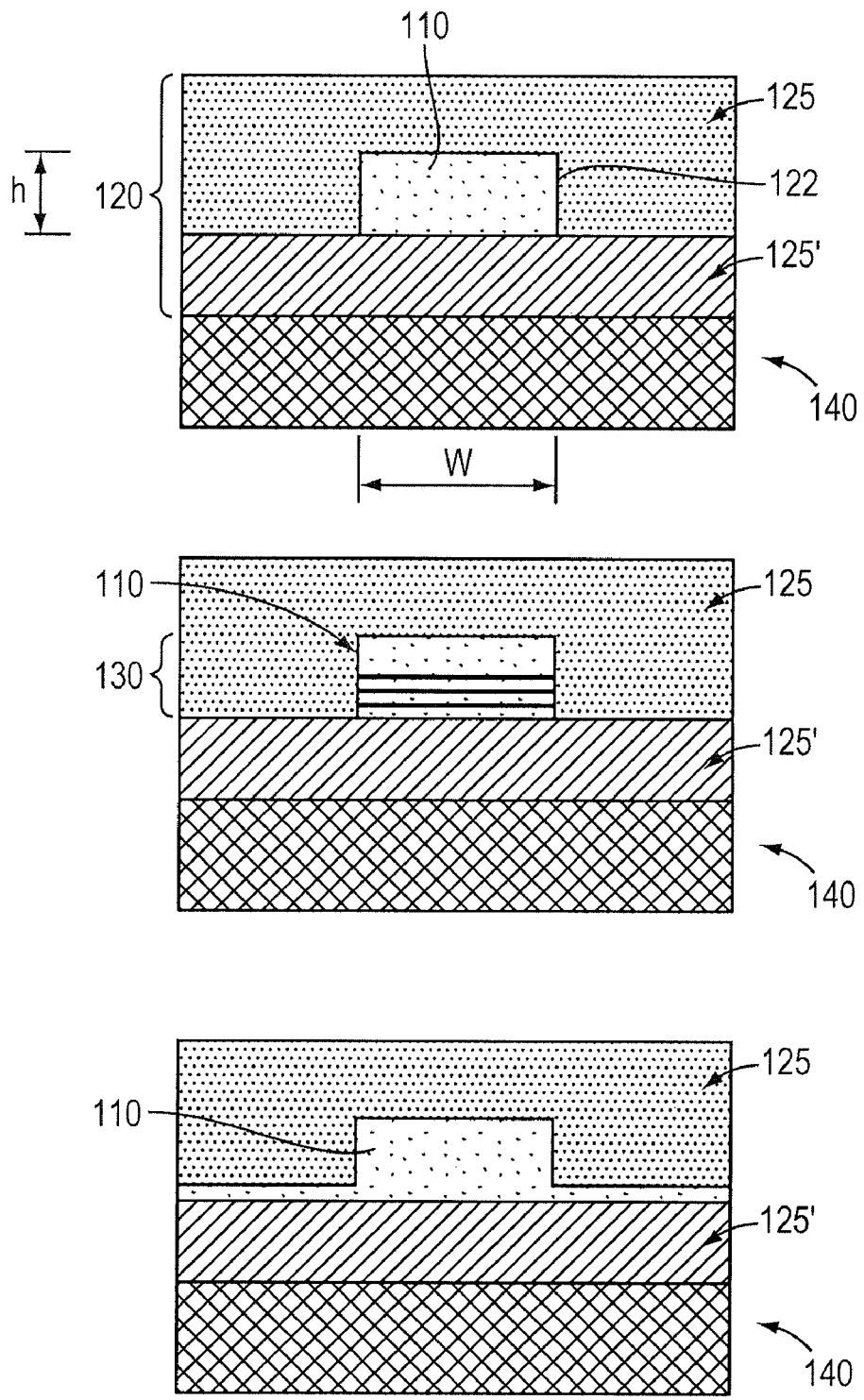

Various embodiments of the presently disclosed technology are results of a systematic, rigorous study of high-index-contrast waveguides. A plurality of properties of the waveguide are studied as a function of waveguide cross-section in order to arrive at waveguide designs for high-index-contrast microphotonic structures, such as resonators and interferometers, that are optimal over a set of realistic constraints.

As used herein, TE denotes TE-like modes, i.e., transverse-electric-like modes. TM denotes TM-like modes, i.e., transverse-magnetic-like modes.

Throughout this document, results are presented on optimization of a waveguide to be used preferably with a single designed polarization state and mode. Polarization-independent structures may be obtained by making use of dual, preferably identical, structures and polarization diversity. Fields polarized in the plane of the chip are referred to herein as TE polarized, and fields polarized normally to the plane of the chip are referred to herein as TM polarized. High-indexcontrast dielectric waveguides in general support modes with hybrid polarization (which may have a major and minor transverse polarization field) and not necessarily pure TE and TM modes. However, the waveguides considered here usually support modes of interest that are TE-like and TM-like. In the following presented information, the nomenclature is simplified to TE and TM. All information is illustrated by an example using silicon waveguides with a rectangular cross-section and a uniform dielectric silica cladding, but the general conclusions hold for a range of core and cladding indices of high index contrast, and waveguide cross-sections.

In the examples presented herein, the waveguides have a symmetry about a horizontal reflection axis. In these cases, TE modes are defined as all modes having a PMC (perfect magnetic conductor) symmetry about a horizontal axis, i.e., having symmetric transverse electric and antisymmetric transverse magnetic fields; and TM modes as all modes having a PEC (perfect electric conductor) symmetry, i.e., having symmetric transverse magnetic and antisymmetric transverse electric fields (where transverse means transverse to the symmetry plane, and symmetric/antisymmetric means that in the direction normal to the symmetry plane). This definition is consistent with coupling being forbidden by symmetry between TE and TM modes of structures side-coupled in the plane of the chip (i.e., the entire structure retaining symmetry about a reflection plane that is horizontal—parallel to the chip surface). Throughout, reference is made to two waveguide designs, one design where the TE polarization is to be used, henceforth called the TE design; and one design where the TM polarization is to be used, henceforth called the TM design.

The designs and methods presented apply more generally to structures that do not have a vertically and/or horizontally symmetric cross-section, but which resemble these structures in having the feature of strong transverse optical confinement (i.e., in the cross-sectional plane of the waveguide) and at least one high index core material. This specifically includes waveguides with a bottom cladding with a different index of refraction than top cladding, waveguides with a layered core comprising multiple materials (such as in III-V semiconductors), waveguides having auxiliary structures that do not significantly alter the mode confinement such as deep-etched ridge waveguides (FIG. 1), etc.

Referring to FIG. 1, in an embodiment, a waveguide 100 includes a core region 110 surrounded by a cladding region 120. The core region 110 may have a substantially rectangular cross-section 122 and may include a core material that may include or consist essentially of a semiconductor material, such as a group IV element or compound (e.g., Si, Ge, SiGe, SiC, diamond, etc.), a III-V compound (e.g., AlGaAs, InP, wide-bandgap III-V compounds such as GaN, AlN, BN, and other combinations of Ga, Al, B, and N, etc.) or a II-VI compound (e.g., CdTe, ZnSe, etc.). The core material may include or consist of a dielectric material, such as silicon nitride. In some embodiments, the core may include a plurality 130 of material layers, e.g., a combination of lattice-matched III-V semiconductor compounds. For example, each material layer may be $In_xGa_{1-x}As_yP_{1-y}$, where x and y are relative concentrations (each between 0.0 and 1.0) and where each material layer may have a different value of x,y. The core material may have an electronic bandgap less than or equal to about 4 eV and greater than or equal to about 0.4 eV. In some embodiments, the electronic bandgap may be less than or equal to 4 times the energy of photons corresponding to the free-space center wavelength used with the waveguide. The semiconductor material may be single crystalline. The core material is substantially transparent within an operating free-space wavelength range having a center wavelength. The operating wavelength range may be, for example, 1.4 to 1.6 µm, with a center wavelength of e.g., 1.5 µm. The rectangular cross-section 122 has an aspect ratio $A_R$ defined by a ratio of a width w of the rectangular cross-section to a height h of the rectangular cross-section; the aspect ratio may be at least 5:1, e.g., 6:1. A thickness of the core region, i.e., the height h of its rectangular cross-section, may be between 1/150 and 1/10 of the center wavelength, e.g., between 10 nm and 150 nm for a center wavelength of 1.5 µm.

The cladding region includes at least one cladding material, such as, e.g., silica, or hydrogen silsesquioxane (HSQ), polymethyl-methacrylate (PMMA) or other polymers of sufficiently low index. The cladding region may have a maximum cladding refractive index that is defined herein as being equal to the largest refractive index of the at least one cladding material, e.g., equal to a refractive index of silica.

Cladding region 120 may include a bottom cladding portion 125' having a different index of refraction than a top cladding portion 125. In a number of processes employed to fabricate microphotonic waveguides, the bottom cladding is created with a separate deposition process from the top cladding. In an embodiment, the two cladding layers may be separated by a portion of the core material in the area forming the waveguide core and may be in contact with each other in areas to the sides of the waveguide core region, i.e., a thickness of the core material adjacent to the waveguide core may be 0 µm. In other embodiments, the two cladding layers may be separated from each other in regions adjacent the waveguide core, i.e., a thickness of the core material adjacent to the waveguide may be greater than 0 µm.

A core refractive index may be approximately equal to that of crystalline silicon (about 3.5 at 1.5 µm). The core refractive index of the core material may be at least 1.5 or, preferably, at least twice as large as the maximum cladding refractive index. For example, the core material may have a refractive index of 3.5 and the maximum cladding refractive index may be 1.45. The highest cladding refractive index may be approximately equal to a refractive index of silica (about 1.45 at 1.5 µm wavelength), silicon nitride (about 2.0 at 1.5 µm wavelength), or that of other materials.

In some embodiments, core region 110 is disposed on a substrate 140. The substrate may comprise or consist essentially of a semiconductor material, such as a Group IV element or compound, a III-V compound, or a II-VI compound, or a dielectric such as aluminum oxide ($Al_2O_3$) or magnesium oxide (MgO).

The waveguide may be highly confined and index tunable and, at the same time, tolerant to dimensional errors. These parameters are particularly important for ring resonators and filters based on ring resonators, because resonant structures amplify the deleterious effect of perturbations caused by dimensional errors.

Figure 2A:
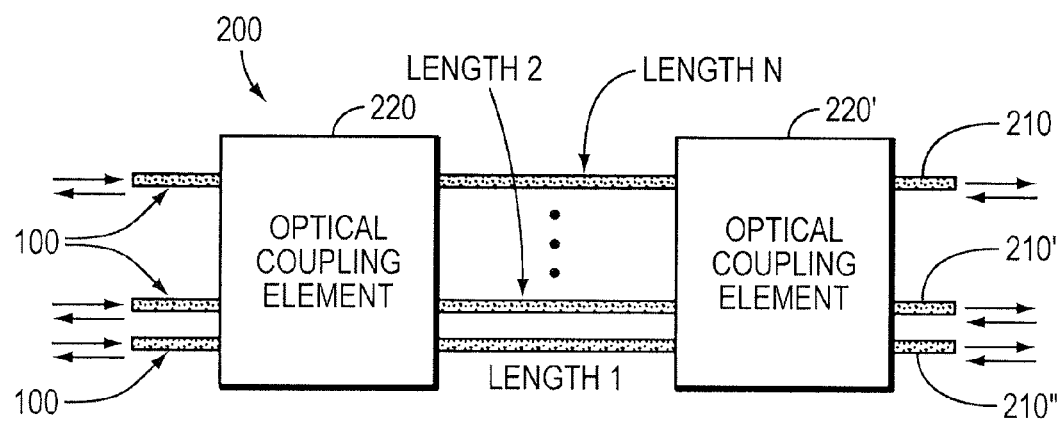
FIG. 2a is a schematic diagram illustrating a general optical interferometer comprising a plurality of optical paths, each represented by a waveguide in this example, and at least two optical coupling elements, each of the optical coupling elements optically coupling at least two optical paths, and the optical lengths of the paths between the coupling elements determining the optical transmission response.

A number of optical devices, including but not limited to ones illustrated in FIGS. 2 and 3, may incorporate waveguides having the features described herein. FIG. 2a is a schematic diagram illustrating a general optical interferometer 200 comprising a plurality of optical paths 210, 210', 210", each represented by a waveguide 100 in this example, and at least two optical coupling elements 220, 220', each of the optical coupling elements optically coupling at least two optical paths, and the optical lengths of the paths between the coupling elements (and the coupling coefficients of the coupling elements) determining the optical transmission response.

Figures 2B, 2C:
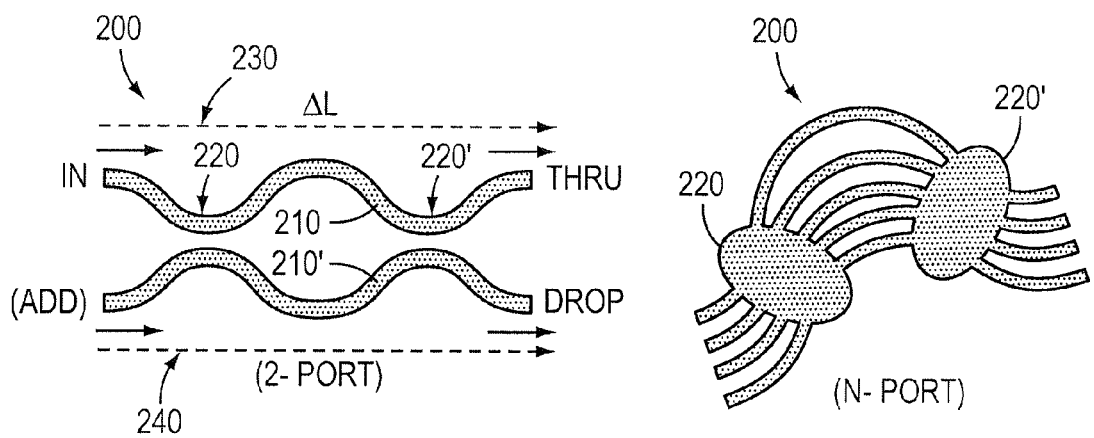
FIG. 2b is a schematic diagram of a specific implementation of the interferometer of FIG. 2a as a 2-waveguide Mach-Zehnder interferometer, having two waveguides optically coupled at two points, in this case by evanescent field coupling.
FIG. 2c is a schematic diagram of a specific implementation of the interferometer of FIG. 2a as a N-waveguide arrayed waveguide grating (AWG) interferometer, having N waveguides optically coupled at two points (referred to in literature as "star couplers")
Figure 3E:
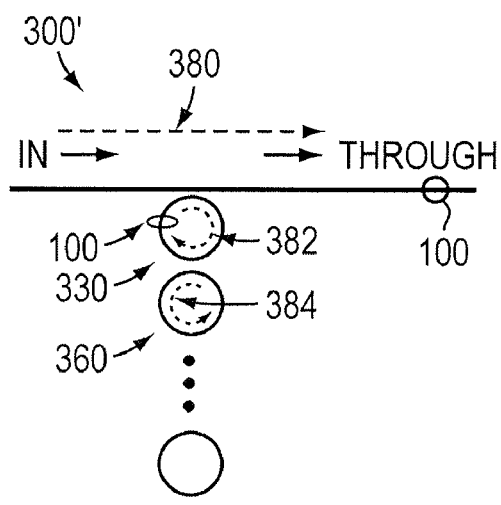
FIG. 3e is a schematic diagram depicting an optical filter architecture comprising an input/output waveguide and a plurality of resonators configured to be optically coupled, here in a linear (series-coupled) arrangement.
Figure 3F:
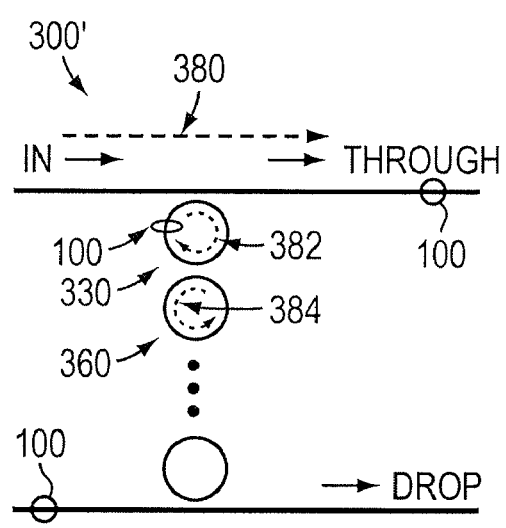
FIG. 3f is a schematic diagram depicting an optical filter architecture comprising a first input/output waveguide, a second waveguide, a plurality of resonators configured to be optically coupled to each other and to the first and second waveguide, here in a linear (series-coupled) arrangement.

A exemplary optical interferometer 200, including but not limited to the example shown in FIG. 2b, may be a 2-waveguide Mach-Zehnder interferometer including a first optical path 230 associated with a first propagating optical mode and a second optical path 240 associated with a second propagating optical mode. The optical interferometer may also include first and second optical couplers 220, 220', each configured to couple optical power from the first optical path to the second optical path and/or from the second optical path to the first optical path, e.g., by evanescent field coupling. At least one of the first and second optical paths may include the waveguide 100 described herein, having a core material substantially transparent within an operating wavelength range having a free-space center wavelength, and an aspect ratio of at least 5:1, with a height of the core region being between $1/150$ and $1/10$ of the free-space center wavelength.

An optical path section of optical paths 210, 210' providing an optical length difference between the first and second optical paths may determine the optical response, i.e., the difference may produce a frequency-dependent optical amplitude or phase response. Variations due to fabrication imperfections in the optical path section that determines the optical length difference may affect the optical response. Therefore, the optical path section that determines the optical length difference may be made of the tolerant waveguide designs 100 provided herein to render the device substantially insensitive to variations.

Referring to FIG. 2c, a specific implementation of the interferometer 200 of FIG. 2a may be an N-waveguide arrayed waveguide grating (AWG) interferometer, having N waveguides optically coupled at two points (with the optical coupling elements 220, 220' comprising, as referred to in literature, "star couplers"). The coupling among waveguides in this case is achieved by diffraction in the star couplers. The difference of optical path lengths between the first and second coupling points determines the optical response. Variations due to fabrication imperfections in the optical path section that determines the optical length difference will affect the optical response. Therefore, the optical path section that determines the optical length difference may be made of the tolerant waveguide designs provided herein to render the device insensitive to variations.

Another exemplary optical device is a directional coupler (i.e., an optical power coupler such as either one of the two directional optical couplers 220, 220' illustrated as part of the interferometer 200 in FIG. 2b) including a first optical path 230 associated with a first propagating optical mode, a second optical path 240 associated with a second propagating optical mode, and an optical power coupler 220 coupled to the first 230 and the second 240 optical paths. The optical power coupler 220, 220' couples a substantial fraction of (i) the optical power propagating in the first optical path 230 to the second optical path 240 and/or (ii) the optical power propagating in the second optical path 240 to the first optical path 230. At least one of the first 230 and second 240 optical paths includes optical waveguide 100, with the core refractive index of the waveguide being at least 1.5 times the maximum cladding refractive index.

Yet another optical device is an optical filter 300, including but not limited to the examples shown in FIGS. 3a-3d, including an input port 310 associated with a first propagating optical mode, and an output port 320 associated with a second propagating optical mode. The optical filter 300 also includes an optical resonator, e.g., optical ring resonator 330 that includes a first optical path 340 associated with a third propagating optical mode and optical waveguide 100. A second optical path 350 is coupled to the input port 310, the output port 320, and the optical ring resonator 330. The first optical path 340 may be closed, with light propagating at a point along the first optical path returning, with a substantial fraction of power remaining, to the point after a round-trip delay time equal to a closed-loop length of the first optical path 340 divided by the group velocity of the propagating optical mode. In some embodiments, the first propagating optical mode is the same as the second propagating mode.

An optical filter may be a ring (i.e., a microring resonator) filter 300'. A ring filter (such as the ring filters illustrated in FIGS. 3e-3f) may include an optical port 310, and a first optical path 380 including a first optical waveguide 100 coupling the optical port 310 to a first optical ring resonator 330. The first optical ring resonator 330 may include a first closed optical path 382 associated with a first propagating optical mode and including a second waveguide. A second optical ring resonator 360, optically coupled to the first optical ring resonator 330, includes a second closed optical path 384 associated with a second propagating optical mode and including a third optical waveguide. The third optical waveguide and second closed optical path 384 may also have the characteristics of the first optical waveguide 100 and the first optical path 380, i.e., in each instance, (i) the rectangular cross-section 122 of the core region has an aspect ratio defined by a ratio of a width of the rectangular cross-section 122 to a height of the rectangular cross-section, (ii) the aspect ratio is at least 5:1, (iii) a height of the core region is between $1/150$ and $1/10$ of the free-space center wavelength, (iv) light propagating at a point along the second closed optical path 384 returns, with a substantial fraction of power remaining, to the point after a round-trip delay time equal to a closed-loop length of the path 384 divided by the group velocity of the second propagating optical mode, and (v) the second core refractive index is at least 1.5 times the maximum cladding refractive index.

The optical filter 300 includes a plurality of resonators 330, 360, etc. (having respective optical paths 340, 370, etc.) configured to be optically coupled; in an exemplary embodiment, the resonators are disposed in a linear (series-coupled) arrangement. In the case of low-loss resonators, the optical response is an all-pass, phase response. The optical response is sensitive to variations in the optical round-trip path length in each of the resonators, due to, for example, fabrication errors. The optical resonators may be made of the tolerant waveguide designs provided herein to render the optical response insensitive to device dimensional or refractive index variations.

The ring filter 300' may be tunable and may include a first and/or a second heating element (e.g., heating element 400, illustrated in FIG. 4a), associated with the first 330 and the second 360 ring resonators respectively, each heating element being disposed in proximity to a respective optical ring resonator at a distance to the optical waveguide of the respective optical ring resonator (i) sufficiently small to facilitate substantial transfer of heat from the heating element to the respective optical waveguide, and (ii) sufficiently great to avoid substantial absorbance by the heating element of optical radiation propagating through the respective optical waveguide. This distance may be at least 2 evanescent-mode decay lengths, and no more than 5 evanescent-mode decay lengths. The first and second heating elements may each include a metal and/or a semiconductor. A waveguide cross-section of an exemplary optical ring resonator 330, with a heating element 400 disposed above the optical ring resonator waveguide 330, is shown schematically in FIG. 4a, with the ring loss vs. metal slab distance illustrated in FIGS. 4b and 4c, and discussed in detail below.

Figure 16A:
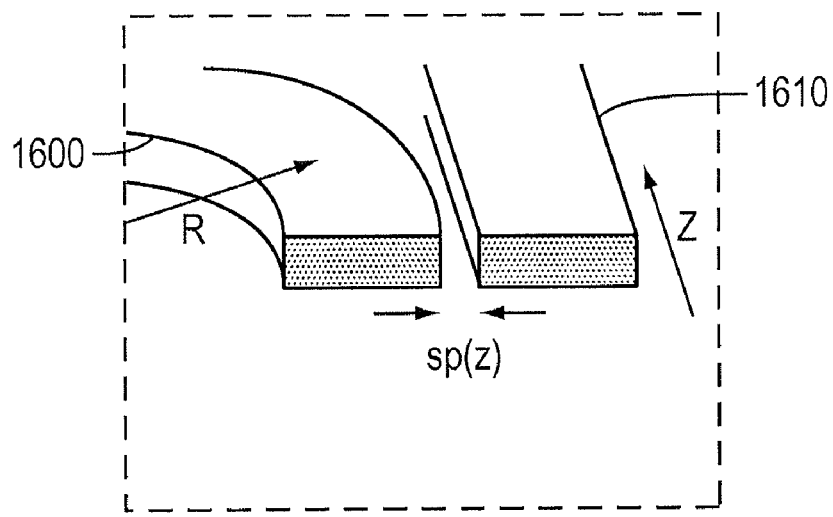
FIG. 16a is an illustration of a section through a directional coupling region showing a microring resonator and bus waveguide; the ring and bus waveguide modes interact via evanescent field coupling mostly where the gap is narrowest.

In some embodiments (see, e.g., FIGS. 2 and 3), a device, referred to as an optical power coupler, may include first and second waveguides 100 coupled to each other. Each ring resonator includes a waveguide. Therefore a ring filter 300' including a first waveguide (that includes a first optical path 380) coupled to a ring resonator 330 contains an optical power coupler comprising the first waveguide and a waveguide forming at least part of the ring resonator 330. Such a device may include the following features: (i) the rectangular first cross-section of the first waveguide core region has a first aspect ratio defined by a ratio of a width of the rectangular first cross-section to a height of the rectangular first cross-section, (ii) the first aspect ratio is at least 5:1, (iii) a height of the first core region is between $\frac{1}{150}$ and $\frac{1}{10}$ of the first free-space center wavelength. Similarly, (i) the rectangular second cross-section of the second waveguide core region has a second aspect ratio defined by a ratio of a width of the rectangular second cross-section to a height of the rectangular second cross-section, (ii) the second aspect ratio is at least 5:1, and (iii) a height of the second core region is between $\frac{1}{150}$ and $\frac{1}{10}$ of the second free-space center wavelength. The cross-section of such an exemplary optical power coupler is illustrated in FIG. 16a. Such an optical power coupler may be found in a ring filter 300' in FIG. 3, as described. Such an optical power coupler 220 or 220' may also be found in a Mach-Zehnder (MZ) interferometer, and other optical devices.

Examples of such devices with two waveguides 100 include an optical interferometer (including examples illustrated in FIG. 2) and a ring filter (including examples illustrated in FIG. 3). In addition to two waveguides 100, the optical interferometer may include first and second optical paths associated with first and second propagating optical modes and including the first and second optical waveguides, respectively. The optical interferometer may also include first and second optical couplers, each configured to couple optical power from the first optical path to the second optical path and/or from the second optical path to the first optical path. A portion of the first optical waveguide disposed between the first and second optical couplers defines a first waveguide length, a portion of the second optical waveguide disposed between the first and second optical couplers defines a second waveguide length, and a difference between the first and second waveguide lengths induces an optical response.

The optical response may be, for example, a sinusoidal (in frequency) amplitude or intensity response, as may be useful for a frequency-selective filtering response. Alternatively, the optical response may be a broadband (wavelength independent over an operating wavelength range) amplitude or intensity response, where the splitting ratio of input power into at least two outputs may be controlled by a change of the effective index in the propagating mode induced by temperature change by application of electrical current to a heater element, or by electrooptic or non-linear optical means. The latter type of response may be useful for switching optical signals between a plurality of output ports.

Another example of a device with two waveguides 100 is an optical filter 300, e.g., a ring filter 300' (see, e.g., FIGS. 3a-3f) that also includes an optical port 310 and first and second ring resonators 330, 360, with the first ring resonator 330 including the first waveguide (e.g., forming at least part of the first optical path 340) and the second ring resonator 360 including the second waveguide (e.g., forming at least part of the second closed optical path 370), each of the first and second waveguides being closed in a loop. Further, in this embodiment, the first ring resonator 330 is coupled to the second ring resonator 360, and the optical port 310 is optically coupled to the first ring resonator 330. In some embodiments (e.g., FIG. 3b) that contain an output optical path 372 (including an output optical waveguide), the optical response of this device may provide a resonant passband, referred to as a channel dropping filter. The optical response may be sensitive to variations in the optical round-trip path length in each of the resonators, due to, for example, fabrication errors. The optical resonators may be made of the tolerant waveguide designs provided herein to render the optical response insensitive to device dimensional or refractive index variations.

In some embodiments, e.g., the embodiments illustrated in FIGS. 3c and 3d, a pair of resonators 330, 360 may be not configured to be directly (via evanescent coupling) optically coupled to each other, but rather may be configured to be coupled only via the at least one waveguide (the first waveguide of the at least one waveguide forming part of the first optical path 380). For example, referring to FIG. 3c, an optical filter architecture includes an input/output waveguide and a plurality of resonators 330, 360, ..., 390 configured to be optically coupled via the waveguide only, here in a cascaded ("parallel") arrangement. In the case of low-loss resonators, the optical response is an all-pass, phase response. The optical response is sensitive to variations in the optical round-trip path length in each of the resonators, due to fabrication errors for example. The optical resonators may be made of the tolerant waveguide designs provided herein to render the optical response insensitive to device dimensional or refractive index variations.

Referring to FIG. 3d, an optical filter architecture includes a first input/output waveguide 374, a second waveguide 376, a plurality of resonators 330, 360, ..., 390 configured to be optically coupled via the first and second waveguides 374, 376, here in a cascaded (parallel) arrangement. The optical response may provide a resonant passband, referred to as a channel dropping filter. The optical response is sensitive to variations in the optical round-trip path length in each of the resonators, due to fabrication errors for example. The optical resonators may be made of the tolerant waveguide designs provided herein to render the optical response insensitive to device dimensional or refractive index variations.

In some embodiments, methods of propagating optical signals through a waveguide are provided, such that the signals are propagated with low loss and low device sensitivity to fabrication imperfections. A method may include the steps of providing an optical waveguide 100 having a substantially rectangular cross-section with an aspect ratio defined by a ratio of width to height of at least 5:1, the cross-section supporting a single mode; and propagating light in the optical waveguide solely in the single mode, e.g., a TE mode.

Referring to FIGS. 5a-5d, in some embodiments, any of the waveguides and devices described above may include a waveguide core cross-section 122 with an aspect ratio of at least 1.8:1, and the core aspect ratio, height, and width may cooperate to support a single TM mode. Furthermore, they may preferably support more than one TE mode, e.g., at least two TE modes, insofar as the maximum confinement (i.e., maximum cross-sectional area) is desirable while only constraining the number of guided TM modes to one. A waveguide may have at least one TE mode with a higher effective index than the TM mode. As discussed below with reference to FIG. 5d, a waveguide may be employed with a TM polarized mode, and an area of the core cross-section may be less than or equal to about $0.403 - 0.285 \times [\mathrm{sech}(1.65 \times A_R)]^{0.36}$ square micrometers and/or equal to or greater than about $0.047 + 0.057 \times [\mathrm{sech}(3 \times A_R)] \, 0.44$ square micrometers.

Figure 5A:
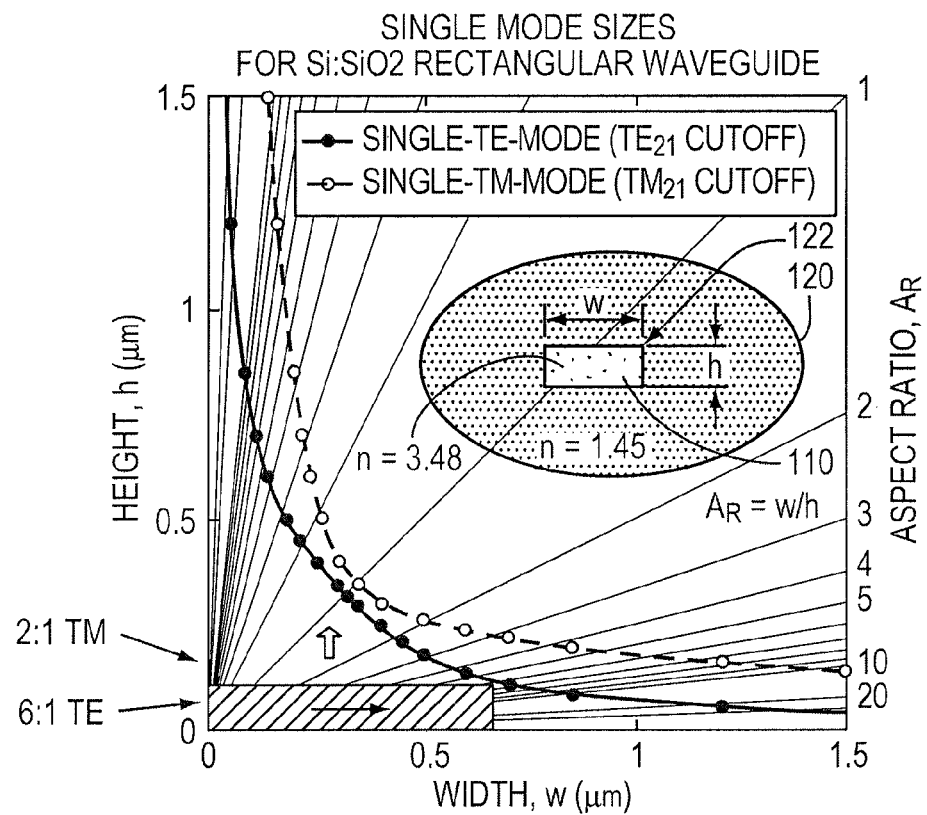
FIG. 5a is a graph illustrating the largest dimensions for single-TE-mode and single-TM-mode waveguide cross-sections of various aspect ratios, where for each aspect ratio the waveguide is near the cutoff condition for the second TE and TM mode, respectively, for exemplary waveguides with a core index of about 3.48 and uniform cladding index of about 1.45; and illustrating an exemplary waveguide design and used polarization in each of the single-TE-mode and single-TM-mode cases.

Referring to FIG. 5a, a graph illustrates the largest dimensions for single-TE-mode and single-TM-mode waveguide cross-sections of various aspect ratios, where for each aspect ratio the waveguide is near the cutoff condition for the second TE and TM mode, respectively, for exemplary waveguides with a core 110 index of about 3.48 (e.g., silicon) and a uniform cladding 120 index of about 1.45 (e.g., silicon dioxide). An exemplary waveguide design and used polarization in each of the single-TE-mode and single-TM-mode cases are given.

Figure 5B:
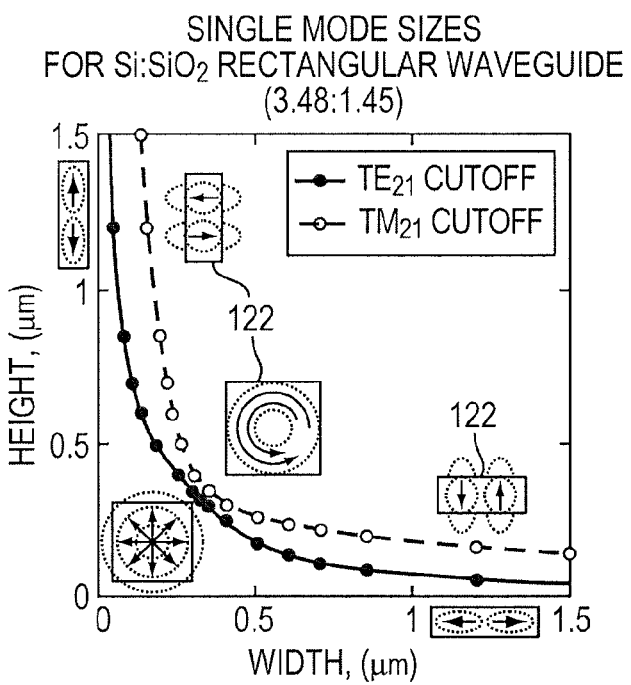
FIG. 5b is a graph showing the same data as FIG. 5a, and illustrating schematically, at various aspect ratios (i.e., in various regions of the plot), the waveguide cross-section and the corresponding electric field distribution of the higher-order mode that is near cutoff, for each of the single-TE-mode and single-TM-mode designs.

FIG. 5*b* is a graph showing the same data as FIG. 5*a*, and illustrating schematically, at various aspect ratios (i.e., in various regions of the plot), the waveguide cross-section 122 and the corresponding electric field distribution of the higher-order mode that is near cutoff, for each of the single-TE-mode and single-TM-mode designs.

Figure 5C:
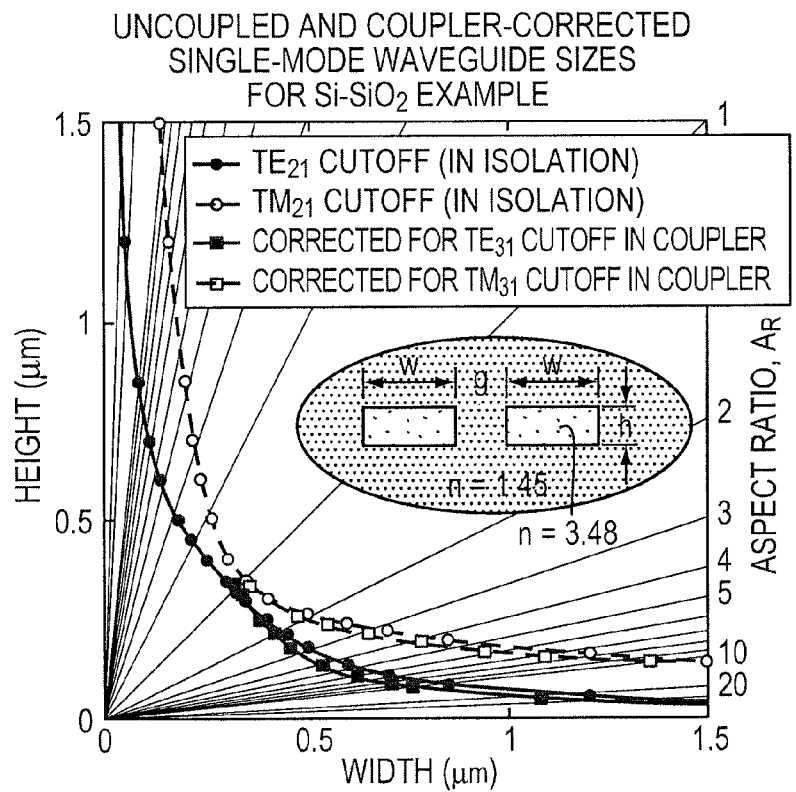
FIG. 5c is a graph showing data in FIG. 5a as well as illustrating curves of modified waveguide cross-sectional dimensions required to maintain only two like-polarized modes (one per waveguide) under operation in a directional coupler of a given coupling strength and effective coupling length, in this case chosen as 12.8% coupling, with a radius appropriate to 2 THz FSR and thus the corresponding coupling gap.

FIG. 5*c* is a graph showing the data of FIG. 5*a* as well as illustrating curves of modified waveguide cross-sectional dimensions required to disallow higher order TE modes than $TE_{11}$ (the lowest-order TE mode) in the single-TE mode design and higher order modes that $TM_{11}$ (the lowest order TM mode) in the single_™ mode design in a directional coupler of a given coupling strength and effective coupling length. In the illustrated embodiment, 12.8% coupling is used, with a radius appropriate to 2 THz FSR and with a corresponding coupling gap.

Figure 5D:
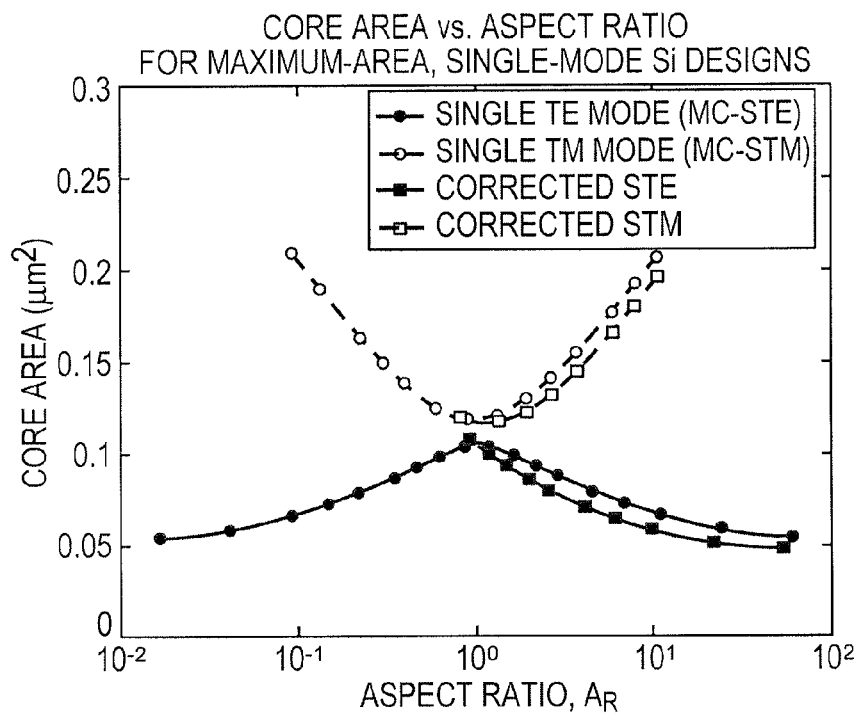
FIG. 5d is a graph depicting the data in FIG. 5c (height vs. width for maximally confined waveguide designs of various aspect ratios) in a second form, by plotting the waveguide core cross-sectional area (width times height), as a function of waveguide core aspect ratio (width divided by height)

FIG. 5*d* is a graph depicting the data in FIG. 5*c* (height vs. width for maximally confined waveguide designs of various aspect ratios) in a second form. Here, the waveguide core cross-sectional area (width times height) is plotted as a function of waveguide core aspect ratio (width divided by height). The solid curves show the maximum-cross sectional area for operation with a single TE and a single TM mode, while the dashed curves show these respective designs corrected in width to maintain only two like-polarized modes (one per waveguide) under operation in a directional coupler of a given coupling strength and effective coupling length. In the illustrated embodiment, 12.8% power coupling is used with a radius appropriate to 2 THz FSR and with a corresponding coupling gap.

TM designs of various aspect ratios may have core areas smaller than those plotted in FIG. 5*d* (hollow-dot-solid-line) in order to support only a single TM mode near 1.55 μm free-space wavelength in Si—$SiO_2$ waveguides. Under this constraint, they may preferably have maximum cross-sectional area in order to provide maximum optical confinement; for example, they may preferably have cross-sectional areas greater than the single-TE-mode size (FIG. 5*d*, solid-dot-solid-line). In an embodiment, the TM waveguide designs may preferably have an aspect ratio between about 1.8 and 3 (see summary table given in FIG. 18, discussed below). Microring resonators may be formed with such waveguides, using the fundamental TM mode, to form optical filters. In an example of third-order (3-ring) filters having 40 GHz bandwidth and 2 THz FSR, the waveguide designs may more preferably have cross-sectional areas equal to or smaller than the corrected area (FIG. 5*d*, hollow-dot-dashed-line) that avoids excitation of high order modes in coupling regions, thereby providing a lower loss design. Furthermore, as designs confining a single TM mode but multiple TE modes are permitted and in some cases desirable, slanted sidewalls may cause unwanted coupling between TE and TM modes (see FIGS. 21*a*-24*b*, discussed in detail below). Therefore, it is further desirable that the TM design waveguides have sidewalls that are substantially vertical, having less than 5 degrees wall slant, and more preferably less than 2 degrees (see FIG. 23*b* and detailed description below).

In some embodiments, a high FSR may be attained with waveguide 100 having a core cross-section aspect ratio less than 3:4. The core refractive index may be 1.5 times as large as the maximum cladding refractive index. For example, the core refractive index may be about 3.5, i.e., between 3.0 and 4.0, and at least one cladding material may have a refractive index near 1.5, i.e., between 1.3 and 1.6. The waveguide width may be no more than ⅙ of the free-space center wavelength, e.g., no more than 250 nm. The height may be greater than ¼ of the free-space center wavelength, e.g., greater than 450 nm. Light may be propagated through this waveguide solely in a TM polarized mode. The waveguide may be planar, and may include or consist essentially of a semiconductor, such as silicon.

A microring resonator may include a waveguide 100 with such characteristics. More particularly, the microring resonator may include an optical path associated with a propagating optical mode, the optical path including the optical waveguide. The optical path is closed, and light propagating at a point along the optical path returns, with a substantial fraction of power remaining, to the point after a round-trip delay time equal to a closed-loop length of the path divided by the group velocity of the propagating optical mode.

The circumference of the microring resonator may be smaller than 100 guided wavelengths, with a guided wavelength being equal to a free space wavelength divided by an effective index. In an exemplary embodiment, in which a TM design is implemented with a TM polarized mode, an area of the core region cross-section may be less than or equal to about $0.403-0.285\times[\mathrm{sech}(1.65\times A_R)]^{0.36}$ square micrometers and/or equal to or greater than about $0.047+0.057\times[\mathrm{sech}(3\times A_R)]^{0.44}$ square micrometers, such designs being preferably used at about 1550 nm wavelength, with a core index near 3.48 and a cladding index near 1.45. Furthermore, by converting the areas to square wavelengths, the same designs may be employed at other wavelengths. The same designs may also be scaled to other index contrasts, in accordance with the simple relations described below.

In an alternative embodiment, e.g., employing a TE polarized mode, an area of the core region cross-section may be less than or equal to about $0.047+0.057\times[\mathrm{sech}(3\times A_R)]^{0.44}$ square micrometers Resonant integrated-optical filters, such as microring-resonator-based filters, enable high-order responses with flat passbands to be obtained by coupling multiple resonators. Flat passbands are preferred in telecommunications for channel add-drop filter applications. Resonators have an FSR for resonant modes typically determined by their size, or, more accurately, the round-trip time of flight when traversing the resonator. This is generally related to the round-trip length by the group velocity in the case of traveling-wave resonators such as microring resonators. An FSR may be assigned for each family of resonant modes corresponding to a particular transverse spatial waveguide-mode distribution. The FSR determines the maximum operating wavelength range (OWR) that a tunable filter based on such resonators alone can span, without operating on more than one channel simultaneously. Using several resonators of different FSRs enables extension of the effective filter FSR by Vernier schemes, but these can suffer from through-port dispersion.

The FSR of a ring resonator can be approximated to first order as inversely proportional to its radius:

$$FSR = c/(2\pi R n_g) = c/(L_r n_g) \tag{1}$$

where R is a suitably defined ring radius, $n_g$ is the effective group index of the waveguide mode given the radius definition, c is the free space speed of light and the FSR is given in regular frequency units (Hz if c is in meters/second (m/s) and R is in m). $L_{rt}$ is the round-trip cavity length in a more general cavity design like a racetrack or oval resonator, linear cavity, etc. In highly dispersive waveguides, such as sub-micron cross-section silicon waveguides, a second-order correction in eqn. (1) to account for group-velocity dispersion is needed for an accurate determination of the FSR.

Figure 6A:
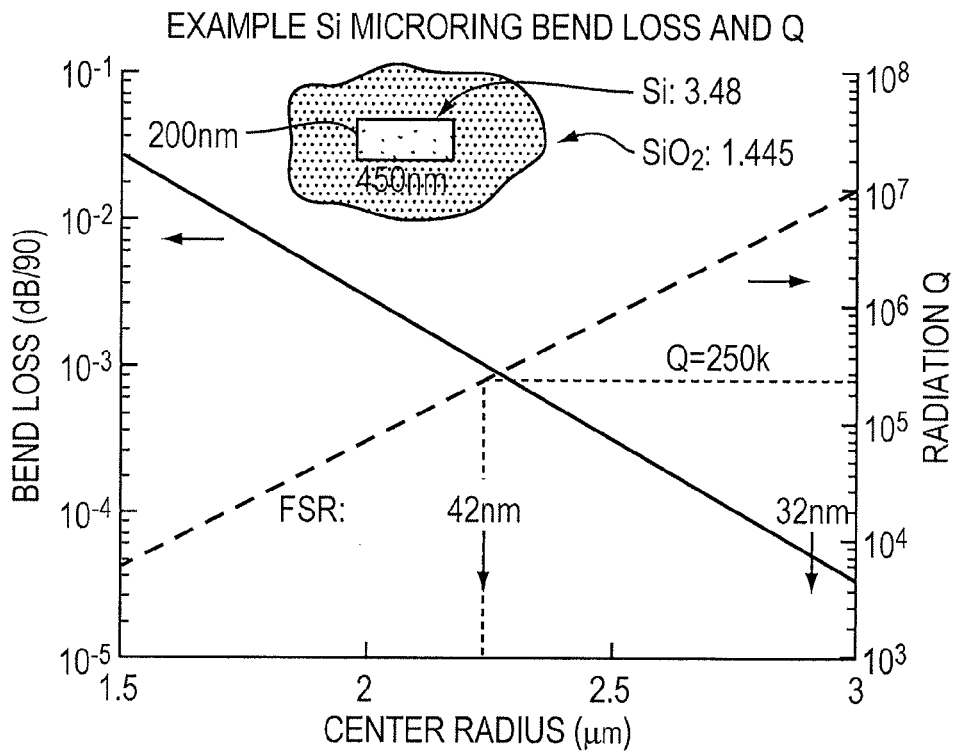
FIG. 6a is a graph illustrating the bending radiation loss and associated radiation quality factor (Q) of microring resonators of various radii, using a commonly used 450×200 nm waveguide cross-section.
Figure 6B:
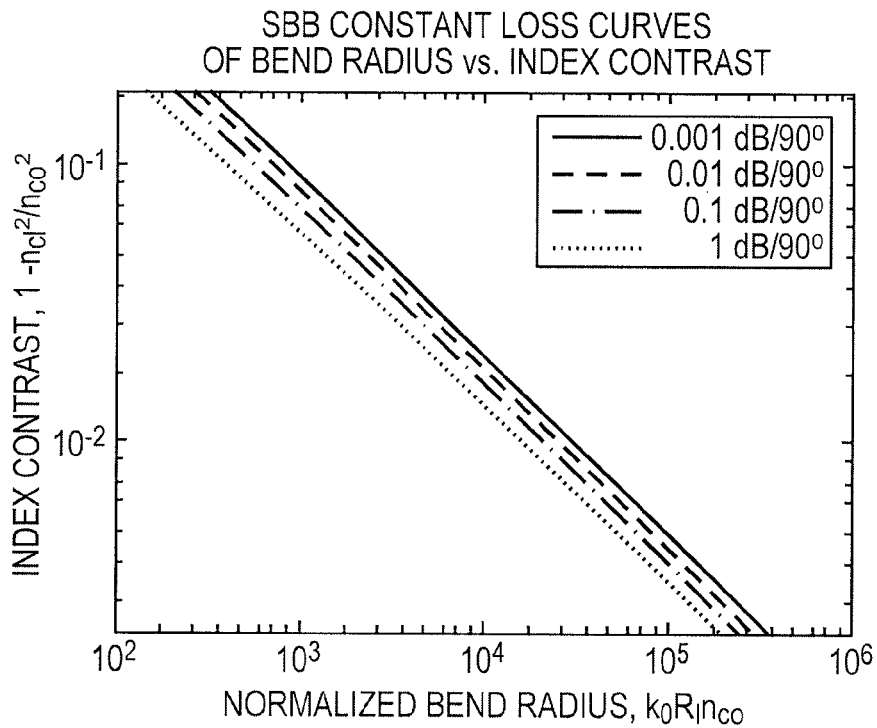
FIG. 6b is a graph illustrating the minimum bending radius that permits 1, 0.1, 0.01 or 0.001 dB/90' bending loss for various core-cladding index contrasts, computed for a infinitely tall slab single-boundary bend (i.e., 2D disk model). It is fairly representative of 3D devices in general of similar index contrast.

The maximum achievable FSR is limited by bending loss. It is generally known that a curved waveguide experiences radiation loss beyond the so-called radiation caustic line. The radiation loss per unit angle of propagation around a waveguide arc increases approximately exponentially with decreasing bending radius, as shown in FIGS. 6a-6b. The quality factor, Q, associated with this radiation loss is determined approximately as, $$Q = \frac{10\pi^2}{\ln 10} \frac{n_g R}{\lambda_o} \frac{1}{L_{dB90}} = \frac{0.2\pi}{\ln 10} \frac{n_g}{\lambda_o} \frac{1}{L_{dBcm}} \quad (2)$$

where the first expression gives the Q in terms of the effective radius R, modal group index $n_g$ at that effective radius (representative of group velocity), the free-space wavelength and the bending loss, $L_{dBcm}$, in dB/90° of propagation around the waveguide arc; and the second expression gives the Q in terms of the linear loss, $L_{dBcm}$, in dB/cm of propagation along the arc. Therefore, radiation loss Q increases roughly exponentially with increasing radius as shown in FIG. 6a. The radiation Q for a given bend radius also increases roughly exponentially with the index contrast between the core and cladding (not shown). That is, to maintain a given loss Q, if one reduces the radius by an order of magnitude, the index contrast needs to be increased by m orders of magnitude, where m is of order 1, i.e., near the value of 1. This is illustrated in FIG. 6b for a slab waveguide, but the principle applies more generally. See M. Popović, "Air trenches for dense silica integrated optics," M.S. Thesis, Massachusetts Institute of Technology, Dept. of Electrical Engineering and Computer Science, February 2002, p. 53, incorporated herein by reference.

Therefore, to simultaneously achieve a large FSR and high radiation Q in resonators, it is desirable to work with resonators of small radius and large index contrast. For example, a silicon-core microring resonator with a single-mode cross-section shown in FIG. 1 provides a 40 nm FSR and a bending loss Q over 250,000 at radii around 2 μm.

Large FSR is essential for channel add-drop filters, modulators and various other devices based on microresonators. Channel add-drop filters for a WDM optical communication system provide narrowband passbands (e.g., 10, 20, 40 GHz) to drop one of a number of channels typically spaced by 25, 33, 50, 100, 200 GHz on a WDM channel grid near the 1550 nm free-space wavelength, where the utilized WDM grid portion can typically occupy as much as 40 nm (C-band) or 80 nm (C-band and L-band). The dropped channel(s) are typically coupled to one output optical fiber, or directly guided to a photodetector, while all other channels (called through-port, or express, channels) are coupled to a second output optical fiber, which forms part of the optical network. In the following, add-drop filters having both an add and a drop port will be considered, but it is understood that embodiments of the present invention more generally refer to add and/or drop filters that have at least either the add or the drop functionality, i.e., either the drop or the add port.

A problem with optical waveguides with strong optical confinement, based on high index contrast, is their sensitivity to dimensional error and material properties. This sensitivity is particularly acute in narrowband resonant devices where the effect of any dimensional error may be amplified by multiple passes of the light through the device. On the one hand it makes the fabrication of multiple resonant-frequency-aligned resonant cavities difficult (see FIG. 10a, discussed below), yet achieving this facilitates the provision of high-order, multicavity filter responses that are highly desirable for meeting high fidelity telecom-grade signal processing requirements. A typically used silicon-core waveguide in present literature of dimensions 450 nm wide by 200 nm tall, and using the TE polarization, has about 100 GHz resonant frequency shift per 1 nm error in waveguide width (e.g., in lithography or etching).

On the other hand, width sensitivity is also a serious problem for achieving polarization-independent operation. As an example, one may suppose that a square-cross-section, buried silicon waveguide with uniform cladding has identical TE and TM propagation constants and therefore aligned TE and TM resonances. (While it is true that at small bend radii, the TE and TM modes deform and acquire slightly different propagation constants, this too may be corrected by adjusting the cross-section to be slightly rectangular.) Yet the TE and TM modes in such a resonator have highly different sensitivities of the resonant frequency to width. For example, a silicon square waveguide is single-mode (one TE and one TM guided mode) and has strong-confinement with a cross-section of 330×330 nm (see FIG. 5a). This cross-section is near the cutoff of the first higher-order TE and TM mode, around the 1550 nm free-space wavelength of operation. In such a waveguide, the TE and TM propagation constant sensitivities to waveguide width, for example, are about 210 GHz/nm and 85 GHz/nm, respectively. The difference is about 125 GHz/nm, which means that even if TE and TM resonances in a ring resonator are frequency aligned for a given design, a 1 angstrom error in ring waveguide width will misalign them by 12 GHz. For filters with 12 GHz bandwidth, this would clearly be intolerable. Thus, absolute dimensional control to atomic dimensions is required to achieve polarization independent operation in a single resonator, without some kind of post-fabrication trimming, which at present and for the foreseeable future is likely to be far beyond the realm of the practical.

As a result, the designs presented here are directed towards operation with a single excited polarization state. Polarization-independent operation may be obtained by using a polarization diversity scheme, where an arbitrary input polarization is split into two paths containing orthogonal polarization states, say TE and TM, then the states are processed by independent devices optimized for a single polarization state, and the outputs are recombined into a single output. One polarization state may be rotated prior to processing to create identical polarization states in both paths, so that identical processing devices may be used. The other polarization state is rotated after processing to preserve symmetry and avoid phase interference effects before the polarizations are combined. Such an approach has been demonstrated in the literature and offers a promising way to get polarization independent operation in high index contrast.

The large dimensional sensitivity that impacts HIC waveguides and resonators is also correlated with scattering losses. For example, large sensitivity of the propagation constant to waveguide width implies significant overlap of the optical field with the waveguide sidewalls. In turn, this means that surface roughness on the sidewalls causes significant propagation losses. Designing a waveguide with an insensitive propagation constant to width also contributes to making its propagation loss low for a given sidewall roughness. The same argument applies to the waveguide core height.

Since, on the one hand, high-index-contrast photonic circuits have unique properties that make them highly desirable for use in photonic circuits, while, on the other hand, their practical realization for high-performance devices is hampered by the acute dimensional and index sensitivities, it is therefore of technological relevance to search for high-index-contrast waveguide and resonator designs that are tailored to optimize performance as well as to maximally exploit the design space in order to trade off by making the designs insensitive to parameters that are poorly controllable in practice at the expense of other parameters which are comparatively easier to control. For example, waveguide width is determined by lithography and is much more difficult to control than waveguide height which is controlled by deposition. (In addition, the waveguide core layer thickness, i.e., height, may be measured prior to lithography to further reduce the uncertainty associated with that parameter.)

In seeking optimal waveguide cross-section designs in the context of tunable resonators, including microring resonators, and interferometers, it is also important to consider several other factors:

which polarization state should be used;

the dependence of bending loss on cross-section shape and polarization, and its impact on the FSR-index contrast tradeoff;

change of the optical confinement with cross-section shape and how it impacts the propagation constant tunability through tuning of the core or cladding material refractive index (e.g., thermally);

in the context of thermal tuning, where heating elements are preferably in close proximity to the resonator or waveguide, how the optical confinement changes optical losses in the form of absorption due to overlap of the optical field with the heating element; and substrate leakage losses through an undercladding to a high index substrate, e.g., a silicon wafer that may be 2 to 3 microns below the waveguide in the case of silicon-on-insulator (SOI) wafers where the waveguide is built in a silicon layer.

All of these factors are considered herein for a typical HIC waveguide, made of a single, rectangular, crystalline silicon core (refractive index about 3.48 at 1550 nm), and a uniform silica cladding (refractive index 1.45), as shown in the inset in FIG. 5a, to draw conclusions regarding preferable designs. These conclusions apply generally to structures with similar optical properties.

For example, substantially the same results apply to waveguides operating at different wavelengths other than that considered (1550 nm) if the dimensions of the waveguides are appropriately scaled together with the wavelength. This relationship is applicable because Maxwell's equations are known to be scale invariant, and the same solutions that apply for one structure at one wavelength, apply also for a structure that is half the size and half the wavelength (meaning twice the frequency, and thus, in the case of wavelength-selective structures, also twice the bandwidth). A few results do not directly scale, such as roughness estimates, but these are expected to hold as far as obtaining reasonable estimates and dependence over a relatively large range of wavelengths of at least 500-3000 nm.

The results also apply to various waveguide geometries that are optically similar, i.e., support strongly-confined optical modes (the mode full-width at half maximum being on the order of half a core-material wavelength). This includes rectangular core waveguides, multiple material core waveguides and even ridge waveguides (FIG. 1) as long as they are configured to strongly confine an optical mode in the sense defined. Strong confinement is also consistent with supporting low optical loss (under 0.1 dB/90°) with small bending radii on the order of a few tens of wavelengths or smaller.

First, an investigation is presented of the possible aspect ratios that support only one guided mode of the polarization employed. Two families of waveguide designs are considered: a design for a TE-polarized excitation, and a design for a TM-polarized excitation. These are referred to herein as the single-TE-mode design (STE), and single-TM-mode (STM) design.

FIG. 5a shows the largest STE and STM design waveguide cross-sections of various cross-section aspect ratios. The diagonal contours directly indicate the aspect ratio of the core, defined as $A_R$=width/height, as labeled on the right vertical axis. An example STE and STM waveguide cross-section is drawn over the plot as an inset, showing 6:1 and 2:1 aspect ratio respectively, and shows by an arrow the intended excited polarization state for each respective design. This plot will be used as a map of possible STE and STM designs to be compared in all other criteria. The two curves (solid-dotted and hollow-dotted) represent the largest-area STE and STM core designs for each aspect ratio, $A_R$, and in general the area under each curve represents all possible STE and STM designs. However, because larger area cores provide stronger optical confinement, the two curves themselves represent the maximum confined STE and STM designs for various aspect ratio values. We'll refer to these as MC-STE and MC-STM designs. As a result of the criteria, in this case the MC-STE designs have two guided modes (one fundamental TE and one fundamental TM), while MC-STM designs have three guided modes (one fundamental TM, one fundamental TE, and one higher-order TE mode).

The aspect ratio, height, and width of the core region cross-section, therefore, may cooperate to support a single TE or a single TM mode. This is attained by, for a given aspect ratio, scaling the width and height so that the cross-sectional area of the optically confining core region is small enough to support only one TE (or TM) mode. A large cross-sectional area is suitable for supporting multiple TE modes, while a small area is suitable for supporting one TE mode. The waveguide is single-mode below a threshold area (see FIG. 5d). This threshold area is different for different aspect ratios and core-to-cladding index contrasts. The threshold area scales with wavelength squared (see more detailed description below). Thus, going from a wavelength of 1 μm to 3 μm, the threshold area is 9 times larger, because the width and height each scale by 3, i.e., they are the same size "in wavelengths." FIG. 5a is a plot of these threshold dimensions for single-TE mode and single-TM mode cases, while FIG. 5d gives the same information in different form by plotting threshold area against aspect ratio. The single-TM mode case may have multiple TE modes, but has only one TM mode. Embodiments of the waveguide correspond to the values under (i.e., below and to the left of) the solid-dot curve in FIG. 5a for the particular case of a 1.5 μm wavelength, 3.5 core refractive index material, and 1.45 cladding refractive index material. To support a single TE mode, the width and height of the rectangular cross-section are preferably smaller than or equal to the values illustrated in FIG. 5a by the solid, hollow-dot curve. For a Si core, the threshold width and height are the intersection of the solid, hollow-dot curve and the diagonal line that corresponds to the desired aspect ratio. The threshold area may be read directly from FIG. 5d.

In some embodiments, the cross-section encompasses the largest possible area corresponding to the given aspect ratio. The height may be from the range of 10 nm to 150 nm at a free-space wavelength of 1550 nm, and when using a core index of 3.48 and cladding index of 1.45.

FIG. 5b illustrates the electric field distribution of the higher-order mode that is near cutoff in the MC-STE and MC-STM designs, in regions of low aspect ratio, nearly 1 aspect ratio and high aspect ratio. Rigorously, the cutoff higher-order mode in each of the MC-STE and MC-STM designs is cannot be trivially associated with TE or TM polarization. For example, in the MC-STE case, the higher-order mode has a dominant electric field polarized along the horizontal axis for large $A_R$'s, along the vertical axis for low $A_R$'s and a radially polarized field at $A_R=1$. However, for the given examples, the previously stated criterion is used to label modes, thus labeling modes with substantial PMC symmetry about a horizontal axis are continued to be labeled as TE, and modes with PEC-like symmetry are labeled as TM, as defined previously above. This labeling is consistent with aiming in each design to cut off the first higher-order mode having the same symmetry as the fundamental mode to be used for guidance, since modes having the same symmetry can couple in presence of perturbations (e.g., other waveguides in proximity, or unintended fabrication imperfections) resulting in crosstalk and loss. The labeling is also consistent with calling the waveguide designs STE and STM, respectively. The higher order TE mode in this case is labeled $TE_{21}$, and the higher order TM mode as $TM_{21}$, while the fundamental TE and TM modes are labeled $TE_{11}$ and $TM_{11}$, respectively.

Generally MC-STM designs permit a larger cross-section than MC-STE designs, for a given aspect ratio, $A_R$. This is because they may permit one more guided mode that is unable to couple to the used fundamental TM mode by symmetry, in the employed scenario where waveguides are assumed to lie in the same plane and to couple horizontally.

FIG. 5d illustrates the maximum cross-sectional-area, single TE or TM mode waveguide designs shown in FIG. 5a, with the information presented in alternative terms as the waveguide core cross-sectional area (width times height) plotted against waveguide core aspect ratio $A_R$ (width divided by height). All waveguide designs under the single TE-mode (MC-STE) design curve (solid-line with solid circles) have a single TE mode, with the curve giving the most strongly confined design for a given aspect ratio, while maintaining single TE mode operation near 1550 nm free-space wavelength. The single TM-mode (MC-STM) design curve (solid-line with hollow circles) shows maximum area single-TM-mode waveguides for each aspect ratio, with all smaller area guides for each aspect ratio also being single TM mode. The area between the MC-STE and MC-STM curves represents waveguides supporting multiple TE modes but only one TM mode. These designs may provide advantages when propagating light in the TM polarization, as described further later in this document. It is shown later also that the width may be corrected slightly to prevent deleterious high-order modes from being present in the coupler region. The dashed curves show the STE and STM waveguide designs corrected (i.e., narrowed) in order to suppress spurious modes for resonant filters with 12.8% power coupling between ring and bus waveguide with parameters described in an example given later in this document. Therefore the cross-sectional areas are slightly smaller.

These waveguide designs may be parameterized in a simple way by fitting the computed design curves in FIG. 5d to a simple model function that gives the area as a function of the given aspect ratio, $A_R$. The model function used here is of the form $$\text{area}(A_R) \approx a + b[\text{sech}(cA_R - f)]^d \quad (2.1)$$

where sech( ) is the hyperbolic secant function. The model has 5 free parameters obtained from fitting: (a,b,c,d,f). The input is the aspect ratio, $A_R$, and the computed value is the core area. Fit parameters were obtained for the four curves in FIG. 5d, and each fit is virtually indistinguishable from the corresponding actual data. The fit parameters for eqn (2.1) corresponding to each of the four curves in FIG. 5d are given in the following table:

TABLE 1

Fit parameters for model eqn (2.1) to represent curves in FIG. 5d

| | a | b | c | d | f |
|---|---|---|---|---|---|
| STE | 0.0468 | 0.0574 | 3.03 | 0.442 | 0 |
| STM | 0.4034 | −0.2854 | 1.65 | 0.361 | 0 |
| Corrected STE | 0.0438 | 0.0648 | 8.70 | 0.170 | −0.582 |
| Corrected STM | 0.3651 | −0.2478 | 2.32 | 0.231 | 0.165 |

The fit parameters in Table 1 may be used to identify the maximum-area waveguide designs described in this document.

Generally the STE waveguide designs described herein use cross-sectional areas equal to or smaller than the area given by the MC-STE or the corrected STE curve, with larger areas generally being preferable. Generally the STM designs described herein use cross-sectional areas equal to or smaller than the area given by the MC-STM or the corrected STM curve, with larger areas generally being preferable, including a unique operating region between the STE and the STM curve pairs where two TE modes are supported but only one TM mode.

The curves shown provide the area for each aspect ratio at or near the operating free-space wavelength of 1550 nm, and for a waveguide of core material index near 3.48 and cladding index near 1.45. However, it being generally known that electromagnetic phenomena scale with wavelength, the area scales with wavelength squared. Thus these curves universally apply to any wavelength for this material system, where the desired area may be measured in square free-space wavelengths, referred to as normalized area, with the desired value of the normalized area given by model equation (2.1) divided by 1.550 squared (i.e., the area in square microns normalized by the wavelength at which it was computed).

Furthermore, it is generally known that confinement is largely dependent on background index and index contrast, and therefore the results may be applied to arbitrary materials and index contrasts as follows. In symmetric slab waveguides, it is well known that the confinement level (mode shape) is determined only by the V-number, $$V = \frac{1}{2}k_o w \sqrt{n_{co}^2 - n_{cl}^2} = \pi \frac{n_{cl}}{\lambda_o} w \sqrt{\frac{n_{co}^2}{n_{cl}^2} - 1},$$

where $k_o$ is the free-space wavenumber, w is the slab waveguide width and $n_{co}$ and $n_{cl}$ are the respective core and cladding refractive indices. Since the single-mode condition is given only by the V-number for slab waveguides, for both TE and TM polarizations, the slab width that gives the widest (largest) single-mode core, with the width in free space wavelengths, is the same for a fixed core-cladding dielectric difference, $n_{co}^2 - n_{cl}^2$, and scales with the square root of this quantity. Alternatively, this maximum single-mode width, in cladding-material wavelengths is fixed for a fixed index contrast ratio, $n_{co}/n_{cl}$ and scales with $\sqrt{(n_{co}/n_{cl})^2 - 1}$. As this condition holds exactly for both TE and TM symmetric slab waveguides, one may also apply it approximately to rectangular waveguides, the case being that the rectangular-core waveguide operated in the fundamental TE or TM polarization mode has TE-like confinement in one (e.g., horizontal) direction and TM-like confinement in the other (vertical) direction. From this, one may conclude that the waveguide sizes of designs in FIGS. 5a and 5c for Si:SiO$_2$ may be scaled to other index contrasts by scaling the dimensions, in units of the wavelength in the cladding material, as $\sqrt{(n_{co}/n_{cl})^2-1}$. So, if the index contrast $n_{co}/n_{cl}$ increases from 2 to 3, factor $\sqrt{(n_{co}/n_{cl})^2-1}$ increases from $\sqrt{3}$ to $\sqrt{8}$, so the cross-sectional dimension is to be divided by $\sqrt{8/3}$, and thus the area is to be divided by a factor of 8/3, in cladding wavelengths. The actual area is divided, if the cladding index is fixed. If the cladding index is changed to change the index contrast, then both the area in square cladding wavelengths, and the cladding wavelength, change. (The approximate area scaling is consistent with the known exact analytic solution for a circular 2D cross-section optical fiber, which also has the same definition of V-number as a slab waveguide, with slab width w replaced by radius of the fiber core).

In various following plots showing the results of a design study, typically black plot lines are used for TE modes and gray lines for TM modes. Also, solid dots mark plot lines belonging to MC-STE waveguide designs and hollow dots are used for MC-STM designs.

Figure 7A:
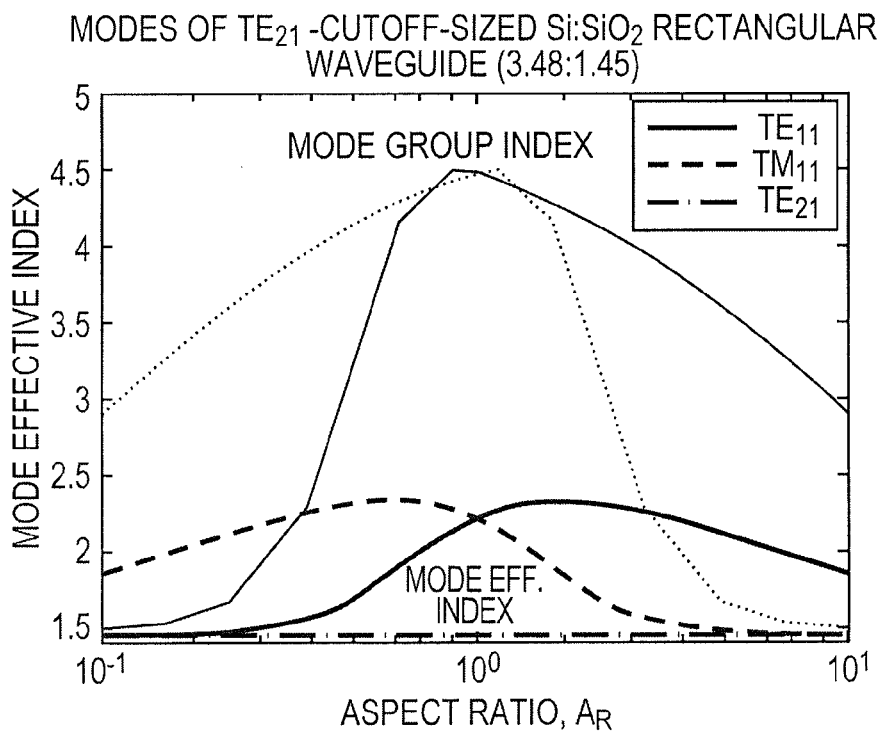
FIG. 7a is a graph illustrating the effective index and group index vs. waveguide aspect ratio of the fundamental TE and TM modes, and of the cut-off second-order TE mode of the TE waveguide design of FIG. 5.
Figure 7B:
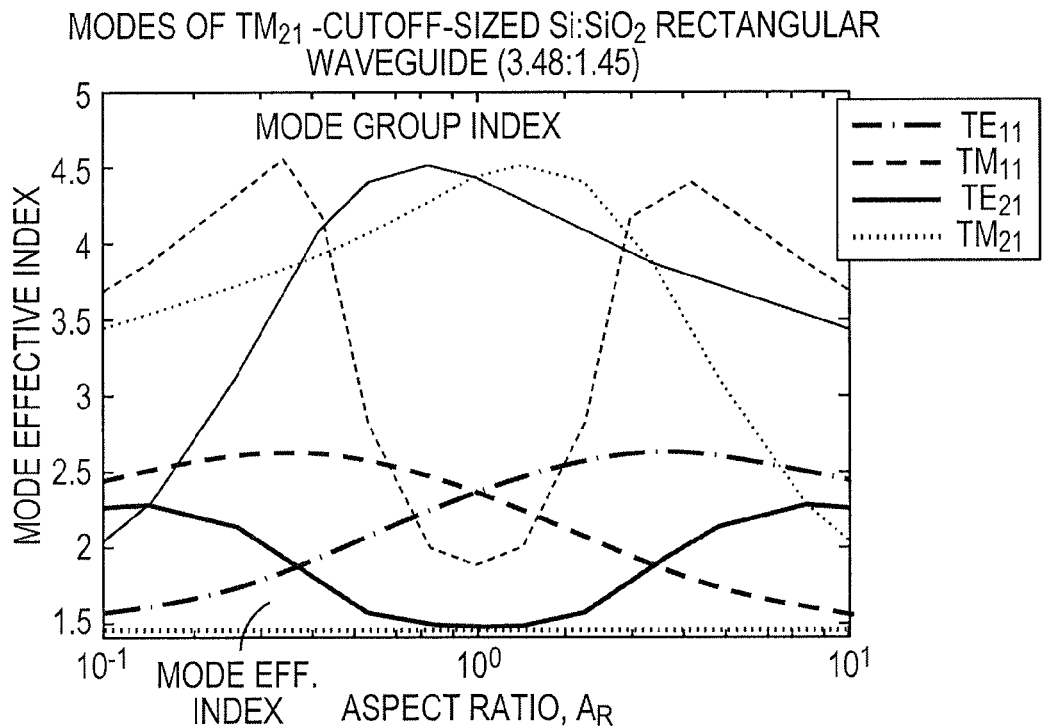
FIG. 7b is a graph illustrating the effective index and group index vs. waveguide aspect ratio of the fundamental and second-order TE and TM modes, of the TM waveguide design of FIG. 5.

FIGS. 7a and 7b illustrate an investigation of the modal effective index (thick lines) and group index (thin lines), at 1550 nm wavelength, vs. aspect ratio for modes of the designs in FIG. 5a. Effective index of a waveguide mode is defined as $n_{eff} \equiv \beta/k_o$, where/is the mode propagation constant $k_o \equiv 2\pi/\lambda_o$, is the free-space wavenumber, and $\beta$ is the wavelength. Group index of a mode is defined as $n_g \equiv \partial(\omega n_{eff})/\partial\omega = \omega\beta/\omega k_o$. The effective index, when compared with the core and cladding indices is indicative of level of mode confinement—the higher the effective index, the stronger the optical confinement (and the lower the bending loss in a curved waveguide of given radius, for example). The group index enters into several important parameters, including the FSR and loss Q described in eqns. (1) and (2), as well as the wavelength tunability of a resonator which is described by $$\frac{\Delta\lambda}{\lambda_r} \approx \frac{\Delta n_{eff}}{n_g} \quad (3)$$

where $\Delta n_{eff}$ is the change in effective index due to a perturbation, such as temperature change or interaction with a movable dielectric or metallic structure, $\Delta\lambda$ is the resonant wavelength shift of the resonator mode, and $\lambda_r$ is the starting resonant wavelength before the perturbation is applied.

A larger group index, $n_g$, all other parameters staying equal, leads to a smaller FSR, higher cavity Q (for the same distributed losses per unit length), and smaller wavelength tunability.

Several conclusions may be drawn from FIG. 7a, where the mode of primary interest is TE$_{11}$. First, the plot is symmetric about the A$_R$=1 point on the horizontal axis because the TE$_{11}$ mode in a 2:1 aspect-ratio, straight rectangular waveguide with uniform cladding is the same as a TM$_{11}$ mode in a 1:2 aspect ratio waveguide, for example (the cross-section being only rotated 90 degrees, which has no effect on the $n_{eff}$). Secondly, the dashed line confirms that the TE$_{21}$ mode is at cutoff for all aspect ratios, having an effective index near the cladding index, as intended for the MC-STE designs. Third, the highest effective index and thus strongest confinement for the used TE$_{11}$ mode in the MC-STE design is for A$_R \approx$ 1.76, i.e., a waveguide cross-section of about width×height=415× 235 nm. This is near the typical dimensions used for silicon waveguides in literature, of about 400-500 nm wide by 200 nm tall. Fourth, $n_{eff}$ of the primary mode, TE$_{11}$, is fairly near the value for the cladding index when A$_R$<0.2, indicating weak confinement, so that region of the design space (A$_R$<0.2) may be excluded for the MC-STE design. The group index of the TE$_{11}$ mode is highest and thus reduces the FSR most near A$_R$=0.8. At A$_R \approx$3, the TE$_{11}$ mode has half the FSR that the TM$_{11}$ mode has for the same physical cavity length, or microring resonator radius. For the TM$_{11}$ mode, maximum confinement is near A$_R \approx$1/1.76$\approx$0.57, i.e., for a 235×415 nm cross-section.

FIG. 7b shows the modal effective and group indices for the MC-STM designs in FIG. 5a. The primary (used) mode here is TM$_{11}$. The TM$_{21}$ mode is seen to be cut off, but there are two TE modes, TE$_{11}$ and TE$_{21}$, in addition. Here, the TM$_{11}$, mode has a low $n_{eff}$ near the cladding index for A$_R$>10, so that region of the design space may be excluded. The highest effective index and thus strongest confinement for the TM$_{11}$, mode in the MC-STM design is for A$_R \approx$0.3, i.e., a tall and narrow waveguide cross-section of about width× height=215×700 nm. One important point is that the TE$_{21}$ mode is degenerate with the TM$_{11}$, mode, i.e., they have the same effective index, near A$_R$=3. Although TE and TM modes are ideally orthogonal in this symmetric waveguide geometry, and nearly so in general, when the modes are degenerate, the slightest perturbation can cause a large coupling between them (when extended over sufficient length). For example, unevenly slanted sidewalls in fabrication may couple TE and TM modes, or slanted sidewalls in coupling regions. This leads to crosstalk. Therefore, the A$_R$=3 point is preferably avoided in the MC-STM design. Either sufficiently larger or smaller A$_R$ is preferable.

After the mapping of effective and group indices, the resulting optical confinement strength is investigated, as characterized in terms of minimum bending radii, and, on the other hand, the achievable FSR, for various A$_R$'s for both design families.

FIG. 8a shows the minimum waveguide bending radius allowed to achieve a bending loss lower than 0.001 dB/90'. Plots are shown for TE$_{11}$ and TM$_{11}$, modes of both MC-STE and MC-STM designs, for a range of A$_R$ values. Since the loss Q due to bending loss is not directly related to roundtrip loss alone, but in addition scales with radius and group index, according to eqn. (2), the Q for a given bending loss is shown in FIG. 8b. FIG. 8c shows the FSR achievable in a microring resonator corresponding to each minimum radius in FIG. 8a, using eqn. (1) and the group indices. These plots show that TE$_{11}$ modes in MC-STE designs support small bend radii with low bend loss, and large FSRs (order of 1 THz or more), for approximately 0.5<A$_R$<30. TM$_{11}$, modes in MC-STM designs do so for A$_R$<7 or so, and on the lower end support A$_R$=0.1 and lower aspect ratios. This is because the vertically polarized field is generally well confined in a tall waveguide even at small aspect ratios, and well suited for maintaining low radiation loss in bending in the plane.

For narrowband optical filters based on resonators, including higher order filters based on multiple coupled resonators, the relevant loss parameter for each resonant cavity is typically the loss Q, rather than the roundtrip loss. Fixed roundtrip loss generally gives same performance for a fixed finesse, while fixed loss Q gives same performance for a fixed bandwidth. Since in narrowband filters the bandwidth is typically the predetermined design parameter for an application, whereas the FSR may be adjusted according to design, the Q is of importance. Generally, the loss Q needs to be much higher than the so-called "external Q" due to coupling to waveguides and other structures. In general, the unitless Q factors are defined as, $$Q \equiv \frac{\omega_o W}{P} = \frac{\omega_o \tau}{2} = \frac{\omega_R}{2\omega_I} \quad (4)$$

where $\omega_o$ is the angular resonance frequency in rad/s, W is the energy inside the cavity, and P is the power flowing out of the cavity due to a loss mechanism. In the second definition in (4), $\tau$ is the characteristic decay time of the resonant mode, where the energy decays as $\exp(-2t/\tau)$. In the third definition, the resonant frequency of the resonator is treated as a complex number, $\omega_R+j\omega_I$, the real part representing the resonant frequency and the imaginary part representing the decay. For example, for the loss Q associated with bending loss, P represents the temporal rate of energy decay in the cavity due to bending loss. In the case of the external Q associated with coupling to a bus waveguide, P represents power leaving the cavity due to coupling to the waveguide. A "total Q" may be defined for a cavity, where P is the sum of all mechanisms causing energy loss from the cavity. The inverse total Q is the sum of inverses of all Q's associated with the cavity, e.g., $1/Q_{total}=1/Q_{bendloss}+1/Q_{waveguide1}+1/Q_{waveguide2}+\ldots$. In a single-resonant-mode (i.e., first order) drop filter, the total Q is equal to the resonant frequency divided by the 3 dB bandwidth:

$$Q_{total} \equiv \frac{\omega_o}{\Delta\omega_{3\,dB}} = \frac{f_o}{\Delta f_{3\,dB}} \approx \frac{\lambda_o}{\Delta\lambda_{3\,dB}} \quad (5)$$

A higher order filter, formed of a resonator comprising multiple cavities, has multiple resonant modes near the operating frequency. A Q may be defined for each mode. The bandwidth is determined by the wavelength range covered by these resonances. For a low loss filter, then, the loss Q's associated with various loss mechanisms, such as bending loss, scattering loss or material absorption, is preferably higher than the total Q of each resonance contributing the passband. Then the response (and corresponding total Q) of the filter is dominated by the desired coupling to waveguides, not by coupling to loss mechanisms. Preferably, the loss Q of the broadest bandwidth resonant mode contributing to the passband response is at least twice the total Q of that resonant more, and more preferably ten times as high. This ensures that the drop-port loss in the passband is not excessively high. However, in general, flat-top passband filters have broad supermode resonances near the center of the passband, and narrow supermode resonances near the band edges, forming the sharp rolloff of a square passband. In that case, if the loss Q is lower than the much higher Q of the band-edge resonances, the passband shape is rounded by loss and becomes less flat-top. Therefore, even more preferable is that the loss Q of the narrowest-bandwidth resonant mode contributing to the passband response is at least twice the total Q of that resonant mode, and more preferably ten times as high.

Some simple, approximate criteria for acceptable loss Q's required for attaining low loss in the center of the passband are described below. Also described are criteria for acceptable loss Q's required to have low rounding of the passband edges. Both sets of criteria are described for the widely used maximally flat (Butterworth) filter case. For a lossless maximally-flat (Butterworth) filter of order N. i.e., formed using N coupled resonators, the intensity response function is known to be $$|H(\omega)|^2 = \frac{1}{1+\omega^{2N}} \quad (5b)$$

scaled, without loss of generality, to have a center frequency of zero, and a bandwidth of 2 rad/s, i.e., having 3 dB rolloff at $\omega=\pm 1$. The poles of the response function $H(\omega)$ are the N out of 2N roots of the denominator of Eq. (5b) that lie in the stable half plane, giving a passive device. These N poles are the complex resonance frequencies of the supermode resonances of the filter. They are well known to be arranged, for a Butterworth filter, on a semicircle in the complex w plane, as given by $\omega_n=\exp[(\pi+2\pi n)/2N]$ for $n=0$ to $N-1$ for the scaled prototype response described by (5b). The complex resonant frequency $\omega_n$ of each mode defines its external Q (due to coupling to waveguides) in the lossless filter case, as given by Eq. (4). The lowest Q (broadest bandwidth) supermode is near the center of the passband (pole with largest imaginary part), while the highest Q (narrowest bandwidth) supermode is near the edge of the passband (pole with smallest imaginary part, i.e., pole in semi-circular pole pattern that is nearest the real $\omega$ axis). Adding loss changes the pole positions primarily by making their imaginary parts larger. Approximate formulas for loss sensitivity at the center of the passband and at the edge of the passband are provided. The imaginary part $\omega_I$ of the resonant frequency of the highest-Q pole of the filter is $\sin(\pi/2N)$ and that for the lowest Q pole is about 1 (only for N=2 is it substantially smaller, about 0.7). This means that for a filter centered at frequency $\omega_o$, one can define an external Q for the highest and lowest Q pole relative to the effective "total Q" of the higher order filter measured as $Q_{total}=\omega_o/\Delta\omega_{3dB}$, valid for maximally-flat (Butterworth) filters:

$$\frac{Q_{pole,\max}}{Q_{total}} = \frac{1}{\sin\left(\frac{\pi}{2N}\right)} \approx \frac{2N}{\pi} \text{ for } N > 2 \quad (5c)$$

$$\frac{Q_{pole,\min}}{Q_{total}} \approx 1 \quad (5d)$$

Since they are normalized to $Q_{total}$, (5b) and (5c) are valid for any filter bandwidth. Substantial rounding is thus avoided by having loss Q of cavities much higher than $Q_{pole,max}$, the highest Q pole at passband edges. Substantial mid-band drop loss cannot be obtained by (5c) alone, since many poles cluster near the passband. Hence, although (5c) would suggest that loss does not increase as filter order increases with a fixed bandwidth, this is not the case, because a larger number of poles cluster near the passband center. For an estimate of the mid-band loss, one can use the analytic expression for mid-band group delay through the filter, which is directly indicative of the loss, and in effect accounts for the multiple poles. At the center filter frequency, the group delay is for a $N^{th}$-order Butterworth filter of Eq. (4) is:

$$\tau_{group}(\omega_o) \approx \csc\left(\frac{\pi}{2N}\right) \quad (5e)$$

A midband effective external Q, that gives the Q relevant for small loss perturbations may be defined as:

$$Q_{e,midband}(N) \equiv \frac{\omega_o \tau_{group}}{2} = Q_{total} \csc\left(\frac{\pi}{2N}\right) \quad (5f)$$

$$\csc\left(\frac{\pi}{2N}\right) = \begin{cases} 1 & \text{for } N=1 \\ \sqrt{2} & \text{for } N=2 \\ 2 & \text{for } N=3 \\ \approx 2 + \frac{2}{\pi}(N-3) & \text{for } N>3 \, (<5\% \text{ error}) \end{cases} \quad (5g)$$

Eq. (5f) provides a good effective external Q for the center of the passband of a higher order (Nth order) filter. The loss Q of the resonators should be much higher than $Q_{e,midband}(N)$ to avoid substantial losses. Expression (5f) is used to specify the Q relevant to midband loss and (5c) the Q relevant to substantial passband rounding. While these apply strictly to Butterworth filters, they are generally well applicable as estimates to any filter shape that has a roughly square passband as used typically for channel add-drop applications. Thus we have defined two external Q values that the loss Q substantially exceeds in a filter that has low passband midband loss and low passband edge rounding, respectively. The criteria apply generally for arbitrary filter bandwidth and filter order N.

For example, near 1550 nm (about 200 THz), a third-order filter with 40 GHz 1 dB bandwidth has a "total Q" of about $Q_{total} \approx 200000$ GHz/40 GHz=5000. Accounting for filter order, N=3, the equivalent midband $Q_{e,midband}=2Q_{total}=10000$ (from Eq. (5e)), and the equivalent bandedge Q is also in this case $Q_{pole,max}=2Q_{total}=10000$ (from Eq. (5c)). Therefore, the loss Q should be above 100,000 for small loss. Because multiple loss mechanisms contribute, in the present examples the aim is a Q of 250,000, intended for a $3^{rd}$-order filter design that is 40 GHz in bandwidth.

In general, it may be seen that the bend loss Q is exponentially dependent on bend radius, and therefore a wide range of practical loss Q values (due to bending loss), from 10,000 to 10,000,000, are all achieved within a relatively small range of radii (from 1.5 to 3 microns in the example in FIG. 6a). Therefore, a specific design may be pursued without loss of generality, and the resulting designs and design techniques may be applied more generally.

Figure 9A:
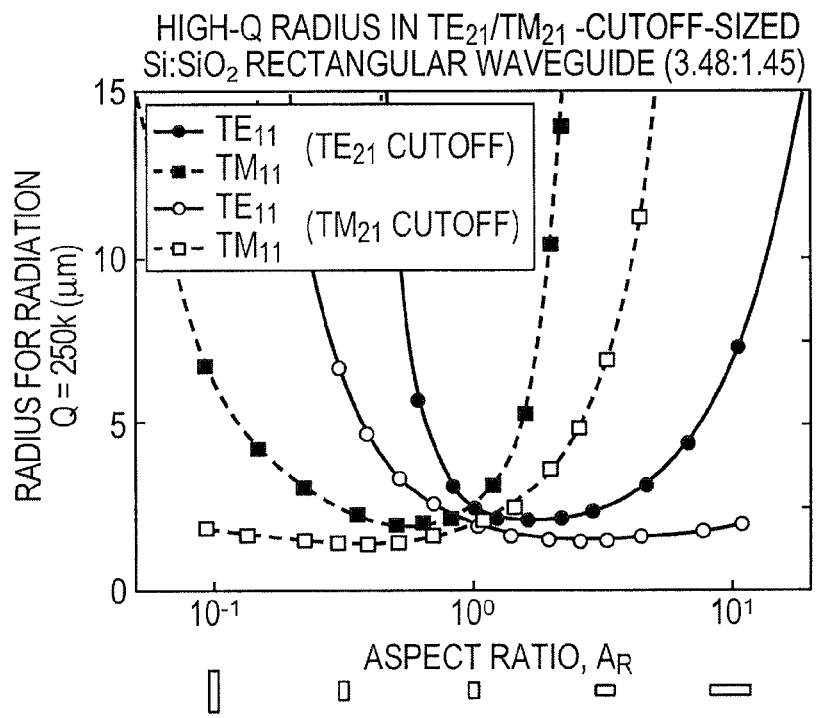
FIG. 9a is a graph illustrating the minimum bending radius that supports a quality factor (Q) due to bending loss of 250,000 in a microring resonator vs. waveguide aspect ratio, for fundamental TE and TM modes of each of the TE and TM waveguide designs shown in FIG. 5.
Figure 9B:
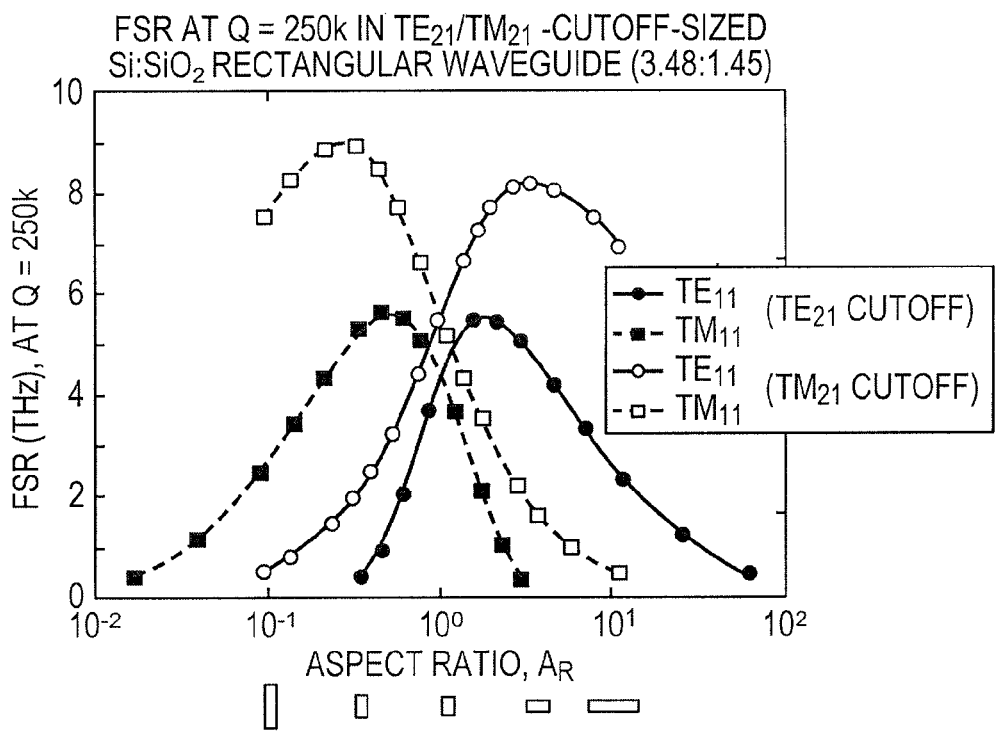
FIG. 9b is a graph illustrating the free spectral range (FSR) of the fundamental TE and TM modes of a microring resonator vs. waveguide aspect ratio, for TE and TM waveguide designs; for each waveguide aspect ratio, the resonator having the cross-section dimensions given in FIG. 5, and a radius that supports a quality factor (Q) due to bending loss of 250,000.

Therefore, a search is conducted for minimum bend radii for the MC-STE and MC-STM designs described in FIG. 5a, such that the bending loss Q is at least 250,000, and then find the corresponding resulting FSR. FIG. 9a shows the minimum bend radius vs. aspect ratio for $TE_{11}$ and $TM_{11}$ modes of MC-STE and MC-STM designs. For a target Q that is 10 times larger or smaller, this plot is not significantly changed. FIG. 9b shows corresponding FSRs. From FIG. 9b, it can be seen that high-Q (i.e., loss Q>250,000) rings can be made with large FSRs (around 1 THz or more) in MC-STE designs with $0.5<A_R<30$ and in MC-STM designs for $A_R<7$. It is relevant to consider a 2 THz FSR, because the silicon-core thermooptic coefficient (dn/dT~2e-4/K near 1550 nm) allows about that much wavelength tuning in a cavity using about 200° C. temperature change. Larger effective tunable FSRs may be created using Vernier techniques in various embodiments. Therefore for a 2 THz FSR, the MC-STE design is constrained to $0.5<A_R<15$, while the MC-STM design is constrained to about $0.05<A_R<3.2$ (and even values below 0.05 are be permissible for MC-STM). Thus for any given minimum FSR, the range of admissible designs may be found from FIG. 9b.

Figure 9C:
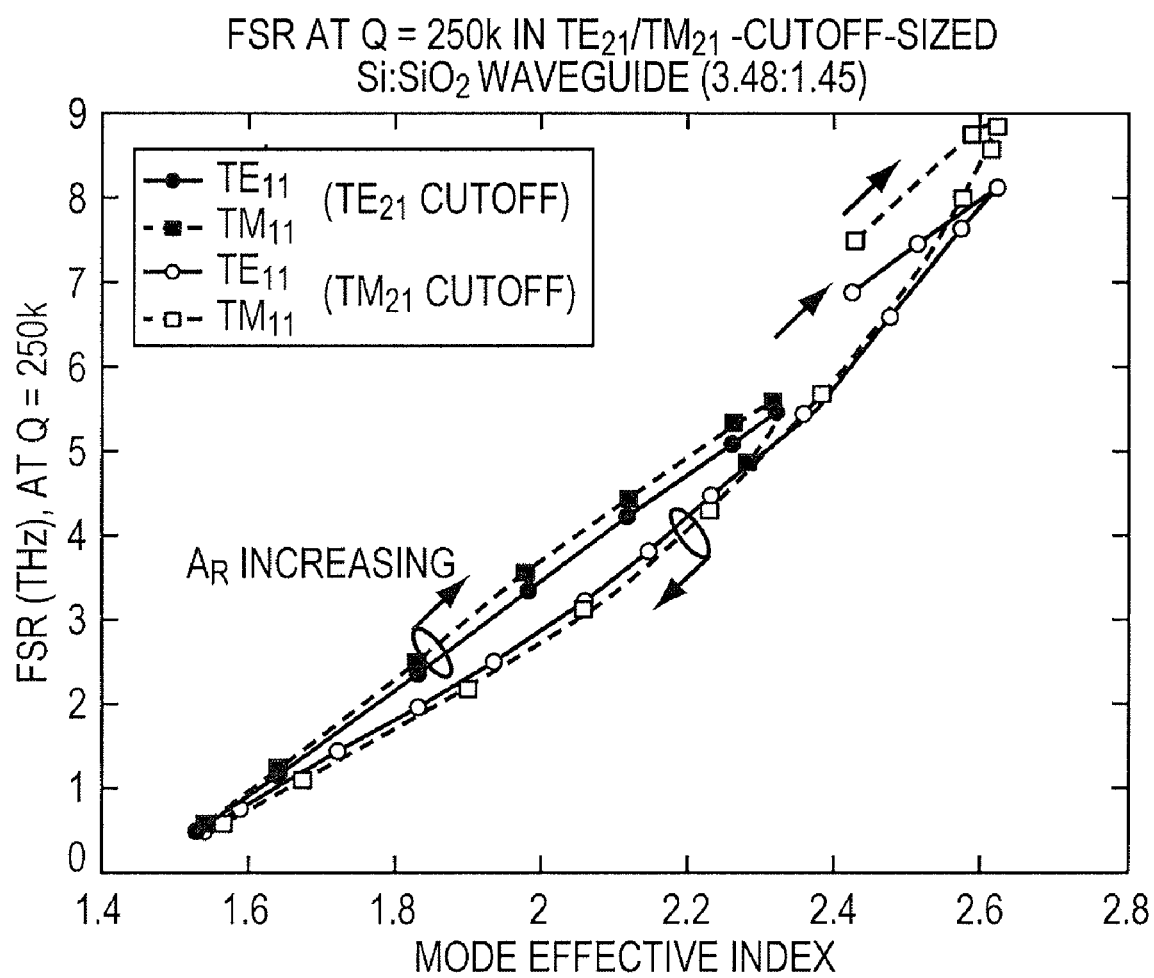
FIG. 9c is a graph illustrating correlation of the FSR for various waveguide aspect ratios from FIG. 9b, with the corresponding mode effective index from FIGS. 7a and 7b.

It may be observed that the FSR is correlated with the mode effective index, by finding for a given FSR and chosen mode ($TE_{11}$ or $TM_{11}$) and design (MC-STE or MC-STM) the aspect ratio, and then finding the corresponding effective index in at that aspect ratio, in FIG. 7a or 7b. It may be noted that the radii and group indices are not necessarily the same. This correlation of FSR and effective index holds primarily for wide flat designs, i.e., waveguides with $A_R>1$, as shown in FIG. 9c.

In FIG. 9a it may be observed that the maximum achievable FSR for bend loss Q≧250,000, using the $TE_{11}$ mode intended in the MC-STE design, is about 5.5 THz, or 44 nm, and occurs for $A_R \approx 1.9$ or a cross-section of width× height=430×225 nm. This cross-section is similar to typically used cross-sections today of 450×200 nm or so, that are usually chosen due to commonly available silicon-on-insulator wafers with 200 nm thick silicon layer, and the width chosen to keep the waveguide single mode. However this is not the highest achievable FSR in a uniformly clad silicon-core waveguide. If the $TM_{11}$ mode is used, and the MC-STM design employed, which may be used when coupling is in the plane, then FSRs up to 9 THz, or 72 nm, may be achieved for $A_R \approx 0.25$ or a cross-section of width×height=200×790 nm. This design corresponds to a bend radius as small as about 1.45 μm. This is the most strongly confined rectangular-core silicon waveguide design with uniform cladding, that does not support higher-order spurious modes that can couple substantially to the main $TM_{11}$, mode when coupling to structures in the same lithographic layer. Achieving a maximum FSR for a given Q is desirable in some applications where either a large FSR is desired, or a large finesse is desired. For example, in nonlinear applications, large finesse means a large field enhancement in the cavity. By looking at FIG. 10a, however, it may be seen that the tall, narrow MC-STM design excited in $TM_{11}$, also has a fairly high sensitivity to width of 200 GHz per nm, but this is still comparable to the "polarization independent" square design. This also translates to relatively high sensitivity of propagation loss to sidewall roughness. However, if the fabrication permits smooth waveguides, this waveguide design provides the highest achievable FSR with a Q of 250,000, or alternatively the lowest bend loss design for single-mode operation in one lithographic layer.

The next important comparison for all waveguide designs considered is the sensitivity of the waveguide to dimensional error. This sensitivity may be measured in terms of change in propagation constant, or alternatively in terms of shift in resonance frequency of a resonator formed of such a waveguide. In general, if a waveguide is turned into a closed loop traveling-wave cavity, or is made into a linear standing-wave cavity with 2-way propagation (such as a Fabry-Perot cavity), then the sensitivity of the resonance frequency to change in the propagation constant does not depend on the cavity length or the longitudinal resonance order, but only on the fractional error in propagation constant:

$$\frac{\delta\omega_o}{\omega_o} \approx -\frac{\delta\lambda_o}{\lambda_o} \approx -\frac{n_{eff}}{n_g}\frac{\delta\beta_o}{\beta_o} \quad (6)$$

consistent with eqn. (3). Therefore, a resonance frequency error $\delta\omega_o$ is a scaled version of a propagation constant error $\delta\beta_o$, and their sensitivities to a perturbation are related in the same way. Next, the propagation constant sensitivity to waveguide width or height error, in a dielectric-core waveguide, depends on the amount of electric field present on the sidewall interfaces or top and bottom wall interfaces, respectively, relative to the guided power. For example, the more field on the sidewalls, the larger the sensitivity to width error. The sensitivity to width, for example may be given by the overlap integral:

$$\frac{\partial \beta_o}{\partial w} = \frac{\int_{\text{along each sidewall}} dy \begin{pmatrix} \Delta\varepsilon |\overline{E}_\parallel(w_{wall}, y)|^2 - \\ \Delta(\varepsilon^{-1})|\overline{D}_\perp(w_{wall}, y)|^2 \end{pmatrix}}{\iint_{\text{cross-section}} \overline{E} \times \overline{H}^* + \overline{E}^* \times \overline{H} \cdot \hat{z} dA}$$ (6b)

where the overlap integral (numerator) is taken as a line integral along the height of each sidewall in the waveguide cross-section, while the normalization (denominator) is the guided power computed as an area integral over the waveguide cross-section. The waveguide width is $\omega$, y indicates the vertical direction coordinate along sidewalls, and $\cdot\hat{z}$ indicates taking only the component of the power flux propagating down the waveguide. In the numerator, $\Delta\varepsilon = \varepsilon_{core} - \varepsilon_{cladding}$, $\Delta(\varepsilon^{-1}) = \varepsilon_{core}^{-1} - \varepsilon_{cladding}^{-1}$, $\overline{D}_\perp$ is the electric displacement normal to the sidewall surface, and $\overline{E}_\parallel$ is the electric field parallel to the sidewall surface. The use of normal and parallel fields in different form in the overlap integral is a special form suitable for step-index discontinuities in high-index-contrast waveguides, as may be seen in literature (see, e.g., S. G. Johnson et al., "Perturbation theory for Maxwell's equations with shifting boundaries," *Phys. Rev. E* 65, 066611 (2002), incorporated by reference herein).

In the context of such perturbations, it may be noted that an additional difference between different cavity designs will result when comparing large-radius and small radius microring resonators, because the waveguide mode shape is altered from the straight waveguide shape in tight bends. That is, in tight bends, the mode field distribution shifts radially outward. In rectangular waveguides, it shifts toward the outer waveguide wall, thus putting more field on the larger radius outer sidewall than on the smaller radius inner sidewall. This is a small correction in most cases, and the general sensitivity behaviour may be observed by using the straight waveguide mode (more accurate for large enough radii), thus making the study independent of bend radius.

Figure 10A:
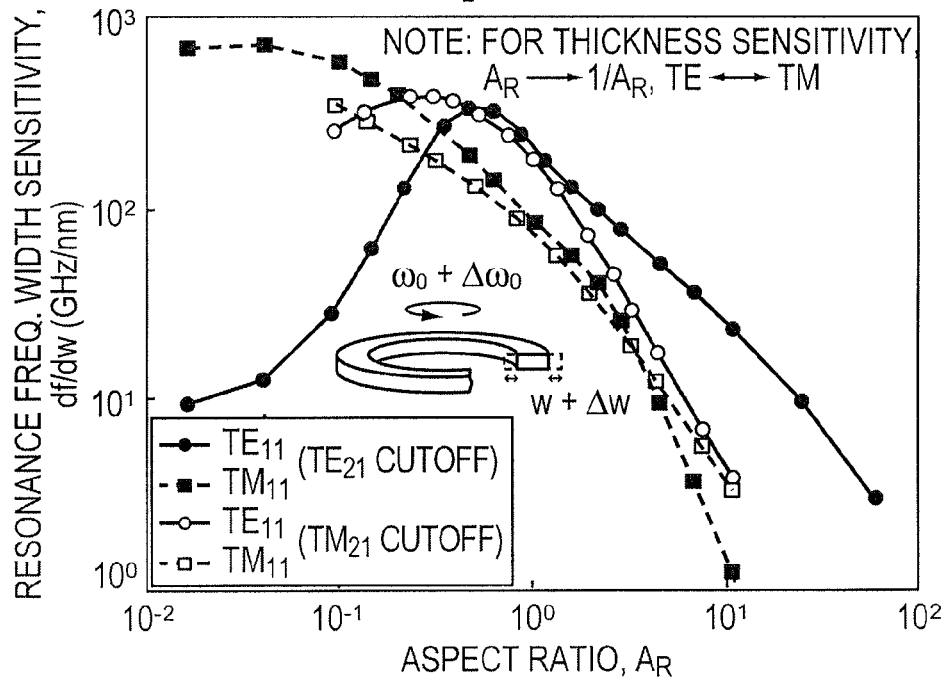
FIG. 10a is a graph illustrating sensitivity of the resonance frequencies of the fundamental TE and TM modes of a microring resonator to the microring waveguide core width for various waveguide aspect ratios, for the TE and TM waveguide design, where for each waveguide aspect ratio, the microring resonator has cross-sectional dimensions given in FIG. 5; the sensitivity to waveguide height may also be obtained by exchanging TE and TM mode labels and setting the aspect ratio to 1 divided by the aspect ratio.

FIG. 10a shows the resonance frequency sensitivity to waveguide width error, vs. the aspect ratio, of a resonator using the $TE_{11}$ and $TM_{11}$ modes of the MC-STE and MC-STM waveguide designs. The sensitivity is based on straight waveguide modes so that it is independent of bend radius of the waveguide, and is given in GHz frequency shift per nm error in waveguide width. One may also read the sensitivity to error in height from the same plot, by interchanging the TE and TM labels, and by letting $A_R \rightarrow 1/A_R$ (which amounts to reflecting the plot horizontally about the $A_R=1$ point). Therefore the black solid line with solid dots gives the sensitivity of mode $TE_{11}$ of design MC-STE to width for aspect ratios $A_R$, as well as the sensitivity of mode $TM_{11}$ of design MC-STE to height for aspect ratios $1/A_R$. FIG. 10a is one of the key figures in the design study, and several important conclusions may be drawn from it, specifically in relation to the silicon-core and uniformly clad waveguide example under consideration, as well as applied more generally.

First, consider polarization insensitive operation. The $TE_{11}$ and $TM_{11}$ modes of the MC-STE design correspond to the ideally degenerate design discussed above. The plot in FIG. 10a shows that the resonance frequency sensitivities of the TE and TM mode to width error differ by 125 GHz/nm, as described above. Therefore, an error in width not only shifts the resonance frequency of each resonator but misaligns the TE and TM resonance destroying the ideally polarization independent operation as already described. Atomic scale dimensional control would be required to align resonances in a single device, and therefore single polarization designs as pursued here, to be used with a diversity scheme for polarization independent operation, are justified.

Next, consider the typical 450×200 nm waveguide used with TE polarization only, with an aspect ratio of 2:1. It may be seen from the $TE_1$, mode on the MC-STE curve that its width sensitivity is about 100 GHz/nm. Even if operating the device in a single polarization, this may still be a problem. This sensitivity may make strict requirements on relative dimensional control between multiple ring resonators in the same device. Rings are preferably made with the same average width to a tolerance that provides less frequency mismatch than the filter bandwidth.

In practice, the waveguide width is controlled by lithography and etching while the waveguide height is controlled by either material deposition or polishing. As the thickness of thin films may generally be measured and adjusted more accurately than lateral dimensions introduced via lithography, waveguide height dimensions are considered much better controlled than lateral (e.g., width) dimensions. Therefore, in illustrating optimum designs, the assumption is made herein that the height may be well controlled, or accurately mapped prior to fabrication, and thus the sensitivity to width is to be reduced at the expense of sensitivity to height. Variations of height across a wafer may still need to be kept in bounds, or the sensitivity to height may need to be constrained for this not to impact device yield. This trade-off may be done by choosing a design from the provided plots.

The plot FIG. 10a reveals that this width sensitivity of the standard 450×200 nm waveguide can be reduced in three ways. First, if the aspect ratio is increased, then the sensitivity is reduced (by about an order of magnitude, for an order of magnitude increase in aspect ratio, $A_R$). Secondly, by moving to the TM polarization in a wide and flat waveguide design (i.e., $A_R > 1$), the sensitivity is reduced. The solid-dot $TE_{11}$ and $TM_{11}$ curves show that the $TM_{11}$ mode has half the width sensitivity of the $TE_{11}$ mode. Finally, using TM polarization in an in-plane circuit permits the use of a larger waveguide core while maintaining a single TM mode, thus preventing any spurious mode coupling. This means one may move to the MC-STM design (hollow dots in FIG. 10a). The $TM_{11}$ mode sensitivity is further reduced, while allowing a much higher achievable high-Q FSR at each aspect ratio, due to stronger confinement and less field on the sidewalls. These three ways may be combined, and in general for reduced width sensitivity, the highest usable aspect ratio is desired.

Figure 10B:
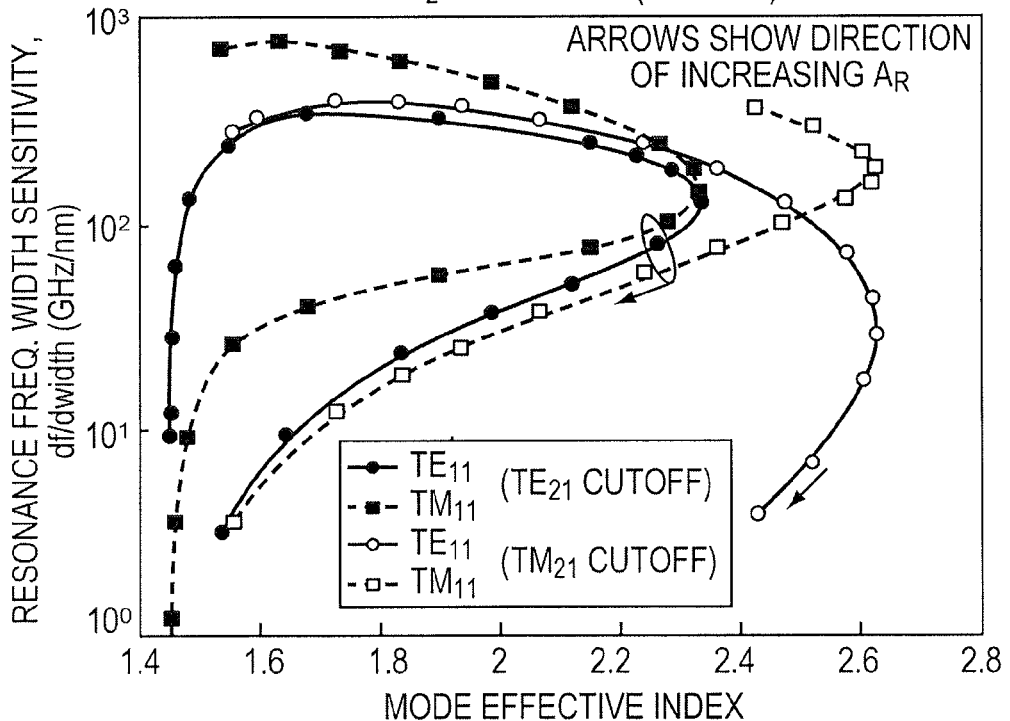
FIG. 10b is a graph illustrating the correlation of the sensitivity of the resonance frequencies of TE and TM modes of a microring resonator of various aspect ratios, given in FIG. 10a, with the corresponding mode effective index given in FIGS. 7a and 7b.

It may be noted that, for $A_R > 1$, for the same width sensitivity the $TE_{11}$ mode of the MC-STE design and the $TM_{11}$, mode of the MC-STM design have the same FSR and the same effective index. This is shown in FIG. 10b. This correspondence is not true for the unused modes $TM_{11}$, in MC-STE and $TE_{11}$ in MC-STM.

Therefore, it is interesting that there are thus far MC-STE designs and MC-STM designs with approximately equivalent performance in the aspect-ratio region $A_R > 1$. Their performance is equivalent in the sense that there is an $A_R$ for the MC-STE design using the $TE_{11}$ mode, and an $A_R$ for the MC-STM design using the $TM_{11}$, mode, where the maximum FSR and the sensitivity are identical. The $A_R$'s and the microring bend radii are not the same for the matching MC-STE and MC-STM designs, but for each frequency sensitivity, there is such a pair of $A_R$'s in the region $A_R>1$. Which of the MC-STE and MC-STM designs is optimal will then need to be decided based upon other additional criteria.

Another important aspect of HIC resonator design is wavelength tunability. This may be done using thermooptic means if the waveguide materials (core or cladding) have a high thermooptic coefficient; using carrier injection; using mechanical means by displacing metallic or dielectric structures, e.g., using microelectromechanical systems (MEMS); or by electro-optic means, e.g., by the linear electro-optic effect in strained silicon, to name a few. In each case, the effective index of the employed mode is changed by the tuning mechanism, thus changing the optical length of the resonator and shifting the resonant frequency as a result. Thermooptic tuning is one of the most common methods, where typically a heating element, such as a metallic or semiconducting strip, heats up when current is passed through it and increases the temperature in the proximate optical waveguide.

Figure 11A:
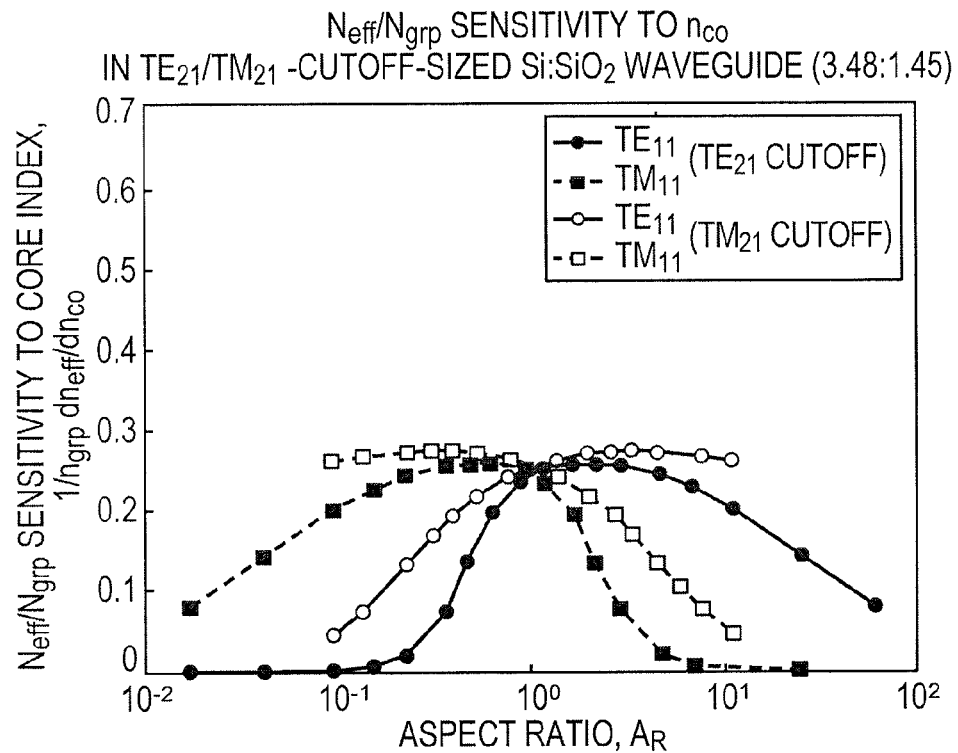
FIG. 11a is a graph illustrating the sensitivity of the mode effective index to changes in the core index, normalized by the mode group index, for all aspect ratios of TE and TM waveguide designs in FIG. 5.
Figure 11B:
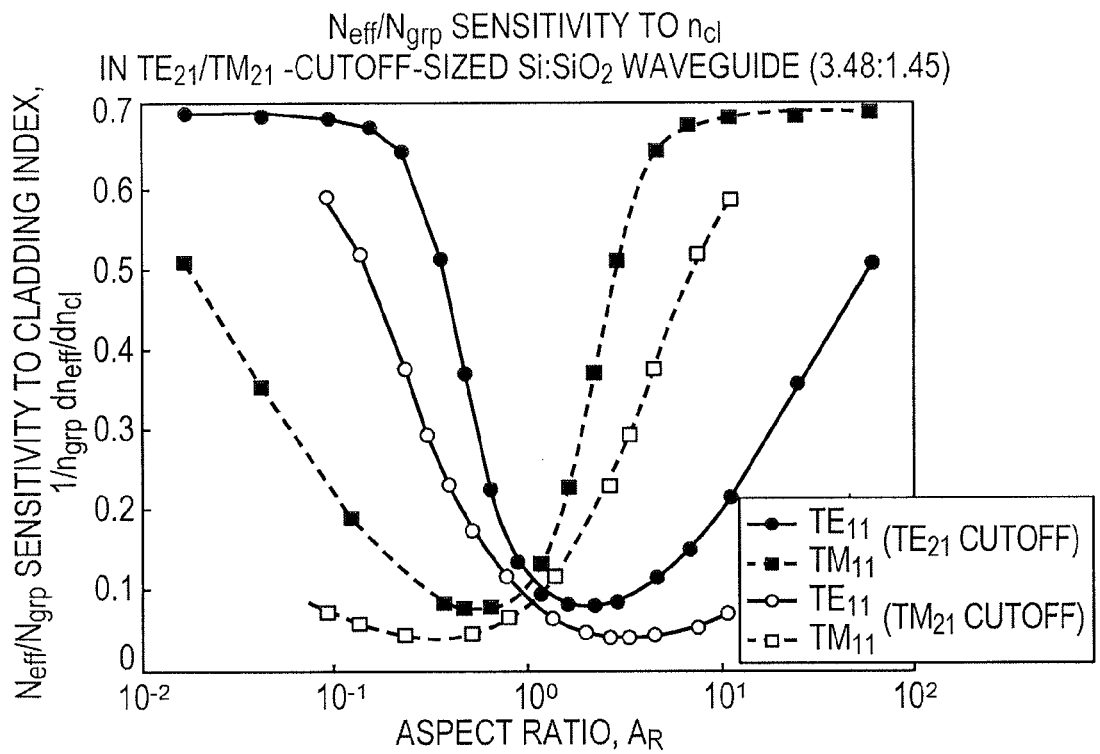
FIG. 11b is a graph illustrating the sensitivity of the mode effective index to changes in the cladding index, normalized by the mode group index, for all aspect ratios of TE and TM waveguide designs in FIG. 5.

Next, the thermooptic tunability of the family of waveguide designs of FIG. 5a is examined. FIG. 11a shows a normalized tunability of a guided mode due to change in the core index, $$\frac{1}{n_g} \frac{\partial n_{eff}}{\partial n_{co}} \quad (7)$$

while FIG. 11b shows a normalized tunability of a guided mode due to change in the cladding index, $$\frac{1}{n_g} \frac{\partial n_{eff}}{\partial n_{cl}}. \quad (8)$$

For total tuning due to a particular tuning mechanism using eqn. (3), factors (7) and (8) need to be multiplied by the core and cladding index changes caused by the tuning mechanisms, respectively, and summed. For temperature tuning, this amounts to multiplying each by the thermooptic coefficient, and by the temperature change as:

$$\frac{\Delta \lambda_o}{\lambda_o} \approx \frac{1}{n_g} \frac{\partial n_{eff}}{\partial n_{co}} \cdot \frac{\partial n_{co}}{\partial T} \cdot \Delta T + \frac{1}{n_g} \frac{\partial n_{eff}}{\partial n_{cl}} \cdot \frac{\partial n_{cl}}{\partial T} \cdot \Delta T \quad (9)$$

FIG. 11a shows factor (7) for $TE_{11}$ and $TM_{11}$, modes of MC-STE and MC-STM designs of FIG. 5a, for a range of $A_R$ values. The temperature tunability for the primary modes ($TE_{11}$ in MC-STE designs, and $TM_{11}$, in MC-STM designs) is roughly similar over the range of $A_R$ values that support a high FSR in each case ($0.5<A_R<15$ and $0.05<A_R<3.2$, respectively). The variation of the factor (7) is only up to about 50% within these ranges. Strongly confined designs will primarily have tuning due to this contribution, from the core index.

FIG. 11b shows factor (8), which is the sensitivity to the cladding index perturbation. Because a small amount of field is in the cladding in the strongly confined designs, this factor spans a larger range of values. Generally the more weakly confined designs at the edges of the plot, with a large fraction of guided power immersed in the cladding material, and with small FSRs, are strongly influenced by cladding index perturbation. However there are regions within the large FSR range of $A_R$ values that have significant sensitivity to cladding perturbation, such as the MC-STM design's TM11 mode at high $A_R$ values (about 2 and up). This may be desirable where it is of interest to use a cladding material with a large thermooptic coefficient for tuning, such as a polymer which may have thermooptic coefficients as large as silicon and larger. Since the thermooptic coefficient of polymers is typically negative, while that of semiconductors such as silicon is positive, designs may also be chosen to make a thermal resonators that are insensitive to temperature, by balancing the thermooptic tuning effect of a silicon core and a polymer cladding. For example, FIGS. 11a and 11b show that larger aspect ratios have a higher sensitivity to cladding index and lower sensitivity to core index, while maintaining maximally-mode-confining (MC-STE or MC-STM) cross-sectional dimensions. This means that for a given positive core material thermooptic coefficient, and a given negative cladding thermooptic coefficient, an aspect ratio can be found that provides an a thermal waveguide design that is maximally confining (MC-STE or MC-STM). This may be useful for resonant filters operating in environments with large temperature fluctuations such as outdoor field environments, or densely integrated electronic environments such as microprocessors or graphics chips that generate a lot of heat, and where optical components may be incorporated to increase speed and memory bandwidth and reduce power consumption of communication links.

Figure 12:
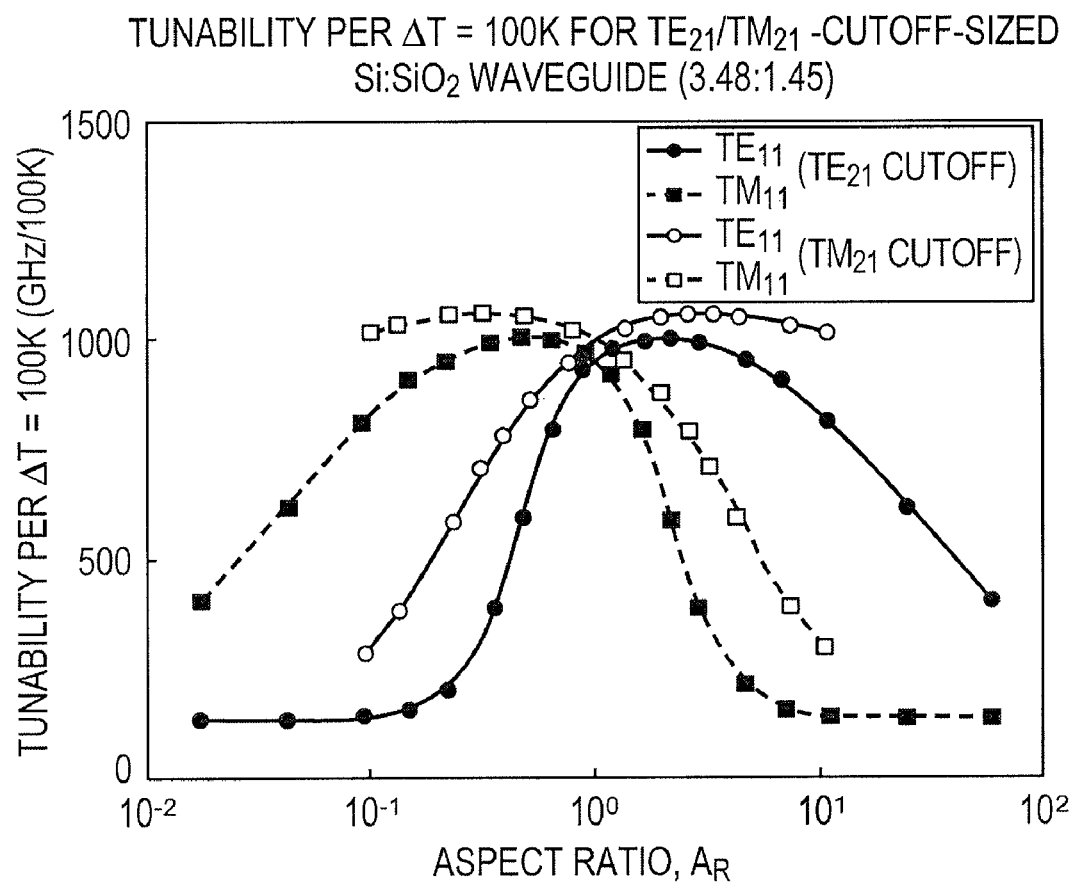
FIG. 12 is a graph illustrating the thermal tunability (in GHz shift per 100 degrees Kelvin temperature change) of the resonance frequency of TE and TM mode resonances of a silica-clad, silicon-core microring resonator with cross-sections of various aspect ratios given in FIG. 5, for TE and TM waveguide designs.

For the particular choice of the example of FIG. 5a, with silicon core and silica cladding, the results of eqn. (7) and (8), i.e., FIGS. 11a and 11b, are combined with the thermooptic coefficients of silicon (core) and silica (cladding), about $+2 \cdot 10^{-4}/°$ C. and $+1 \sim 10^{-5}/°$ C., respectively. The result, equivalent to eqn. (9), is shown in FIG. 12, showing the total thermal resonance-frequency tunability of a resonator in GHz per $+100°$ C. change in temperature. The plot shows that the MC-STE design with $TE_1$, mode excited has about 1 THz/$100°$ C. tunability or nearly so for a fairly large range of $A_R$ values, about $0.8<A_R<7$. The MC-STM design with $TM_{11}$, mode excited about ⅔ the tunability at the highest usable $A_R$ of about 3.2—about 700 GHz/$100°$ C., and larger tunability for smaller $A_R$ values. Therefore, the tunability is reasonably similar and the tunability consideration does not narrow the usable range of $A_R$'s from the ranges obtained using the FSR requirement of 2 THz as the example.

Several other important factors in the waveguide design depend on the level of optical confinement, including optical absorption by a heating element that may serve as a resistive heater for thermooptic tuning, and optical mode leakage into a wafer substrate material. In the first case, a metallic or a semiconductor heating element is preferably placed close enough to the optical resonator to efficiently heat the dielectric materials where optical intensity is substantial, but far enough away in order to avoid significant overlap of the optical field with the heating element that may lead to significant optical absorption losses in the resonator. This distance is preferably at least 2 evanescent-mode decay lengths, and no more than 5 evanescent-mode decay lengths. The heating element may include or consist essentially of a metal, such as chromium, or a semiconductor such as silicon. An example of such a structure may be a layer of about 100-200 nm thick; it may further be patterned in the planar direction to widths of the order of 1-2 μm, forming a wire-like pattern.

The same issues apply to sections of waveguide used for interferometer arms. In the second case, a low index undercladding may have a limited thickness separating the high index core region(s) from a potentially high index substrate. For example, an SOI wafer may have 2-3 microns of silica undercladding separating the silicon device layer and the silicon substrate. If the optical mode in the waveguide has a lower effective index than the core index of the substrate (for silicon n=3.48 at 1550 nm), then the mode becomes leaky and some optical power is lost by tunneling leakage into the substrate. Since the leakage loss is through an optical tunneling process via the evanescent mode field which has an exponential decay with distance from the core region, increasing the undercladding thickness decreases leakage loss exponentially. Next, constraints on the designs of FIG. 5a in the context of heating element absorption and substrate leakage are considered.

Figure 13A:
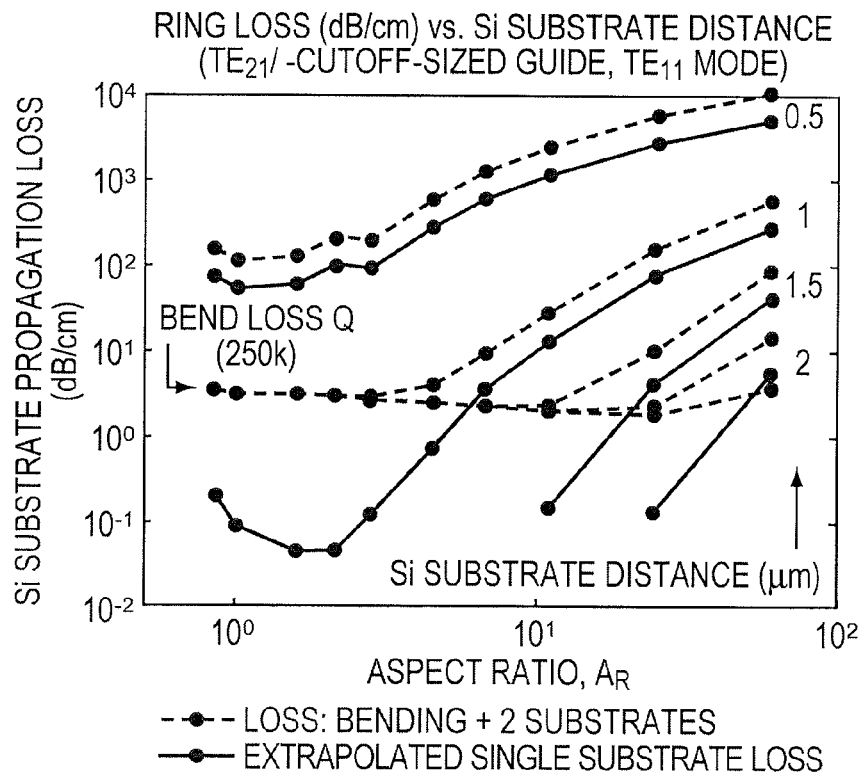
Figure 13B:
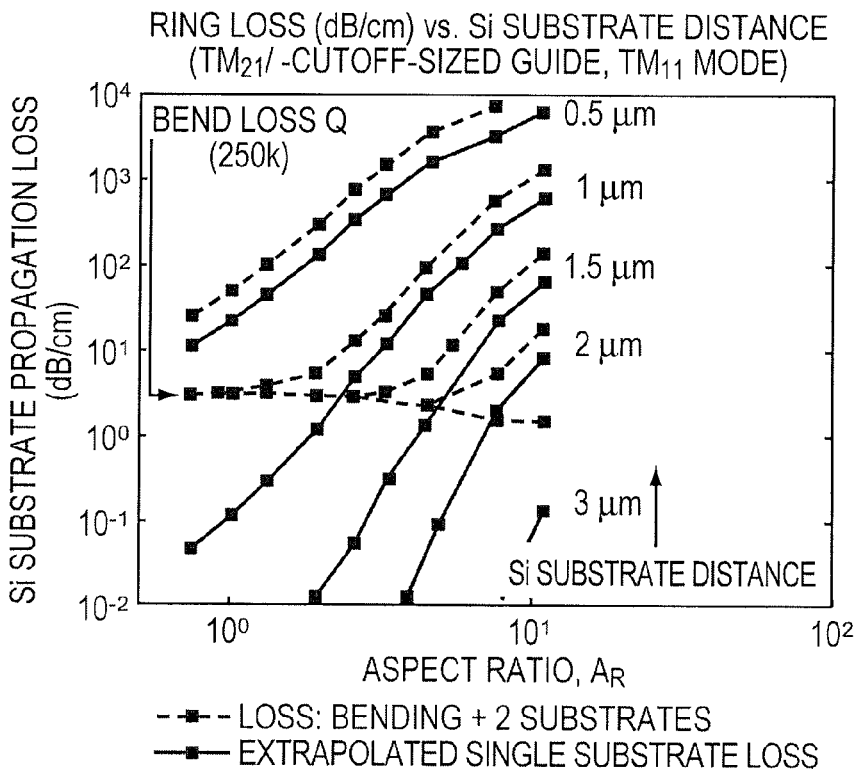
FIG. 13b is a graph illustrating the waveguide propagation loss of a TM waveguide mode of a microring or equivalent waveguide bend section, in dB/cm, corresponding to the Q and configuration in FIG. 14b.

FIG. 13a shows computed substrate leakage loss (in gray dotted curves) for a symmetric, bent waveguide, having two high index "substrate" regions, symmetrically placed above and below the waveguide core at a distance from the core indicated next to each plot curve. The bend radius used is the radius giving 2 THz FSR with a bend loss Q of 250,000, consistent with the example case used thus far. The case of the bent waveguide is used because the waveguide mode in a bent waveguide is pushed radially outward and becomes less well confined in the vertical (out of the chip-plane) direction in comparison to its straight counterpart waveguide. Therefore, the bent-waveguide case gives a worst case scenario for coupling to a substrate or conductive absorber (heating element) above or below the waveguide. The propagation loss is plotted in FIG. 13a in gray dotted line for various displacements of two semi-infinite half-spaces of index 3.48 (modeling silicon). This curve includes bending loss as well as substrate leakage loss to each of the two halfspaces. By removing the effect of bending loss, and dividing by two, the substrate loss due to a single substrate is extrapolated. This is shown in the black solid line. It may be seen that the total propagation loss (gray dotted line) is limited to stay above about 3 dB/cm, which corresponds to a bend loss Q of 250,000. The extrapolated single-substrate loss (red solid line) is the figure of interest. In integrated optical circuits it is preferable that waveguide propagation losses be kept below 10 dB/cm, more preferably below 3 dB/cm, and ideally well below 1 dB/cm. It is therefore preferable to keep the loss due to substrate leakage in general waveguiding circuits (straight waveguides, bends, etc.) to below 1 dB/cm, and more preferably below 0.1 dB/cm. As seen from the plot, for all MC-STE design ($TE_{11}$ mode) aspect ratios with usable FSRs, $0.5<A_R<15$, an undercladding thickness of about 2 μm or larger ensures below 0.1 dB/cm leakage loss. FIG. 13b shows the same calculation for the MC-STM design employing the $TM_{11}$ mode. Here, also, a silica undercladding of thickness 1.8 μm or larger is sufficient to guarantee less than 0.1 dB/cm substrate leakage in the relevant MC-STM design range of aspect ratios, $0.05<A_R<3.2$.

Figure 14A:
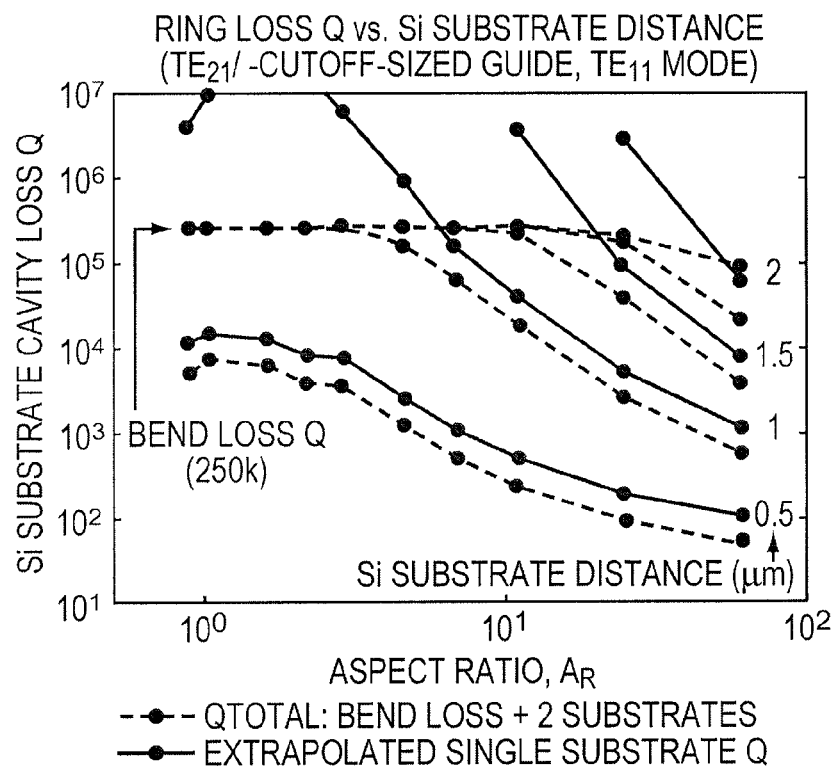
FIG. 14a is a graph illustrating the loss quality factor (Q) of a microring resonator TE mode, due to radiation leakage loss by coupling to the silicon wafer substrate beneath a silica undercladding of various thicknesses, for TE designs of FIG. 5 of various aspect ratios, with bend radii given in FIG. 9a; as well as the total Q due to three loss sources—leakage to two Si substrates symmetrically above and below the microring and the bending loss.
Figure 14B:
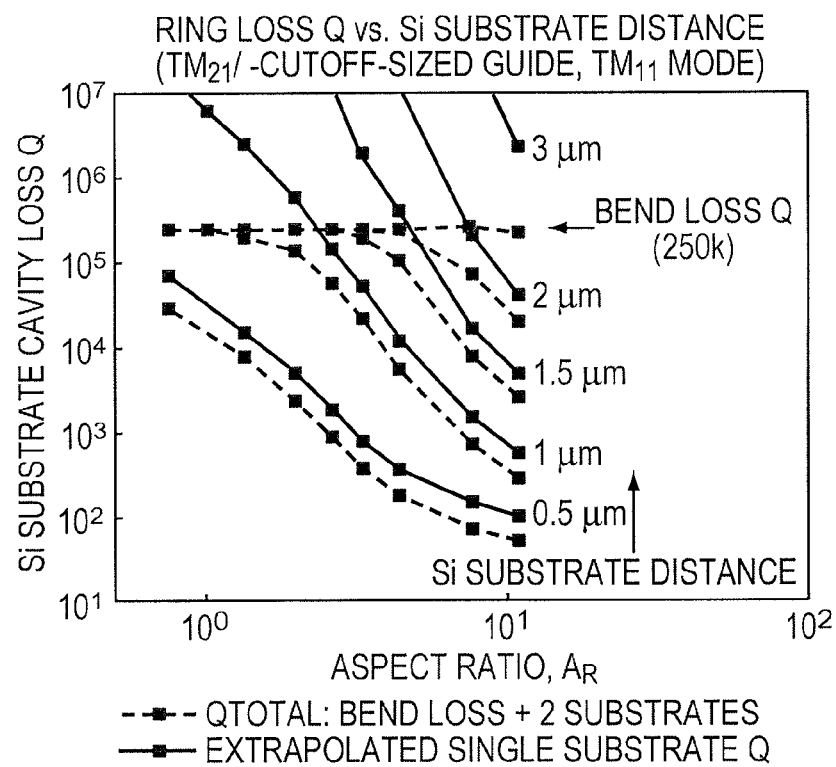
FIG. 14b is a graph illustrating the loss quality factor (Q) of a microring resonator TM mode, due to radiation leakage loss by coupling to the silicon wafer substrate beneath a silica undercladding of various thicknesses, for TM designs of FIG. 5 of various aspect ratios, with bend radii given in FIG. 9a; as well as the total Q due to three loss sources—leakage to two Si substrates symmetrically above and below the microring and the bending loss.

Because the cavity Q is not directly related to propagation loss, but scales with group index, for resonator design, the results of FIGS. 13a and 13b are shown again in FIGS. 14a and 14b, with loss expressed in terms of resonator loss Q due to substrate leakage. Again, dotted lines in both cases show the total cavity loss Q due to bending loss and two symmetrically placed substrates (above and below) at various displacements from the core, and solid lines in both cases show the extrapolated loss Q due to a single substrate half-space, which is the value of interest. Since Q's due to various loss mechanisms combine to yield a lower total Q, it is desirable to select substrate displacements large enough that the total Q is not significantly reduced from the bending loss Q of 250,000. For MC-STE designs ($TE_{11}$), for aspect ratios $0.5<A_R<15$, an undercladding thickness of 1.2 μm or larger is sufficient to ensure that the substrate loss has negligible effect on the cavity Q. i.e., does not reduce it substantially below 250,000. From FIG. 14b, it can be seen that for MC-STM ($TM_{11}$) designs, the same undercladding thickness requirement ensures that the Q is unaffected in the relevant range of aspect ratios $0.05<A_R<3.2$.

Figure 4A:
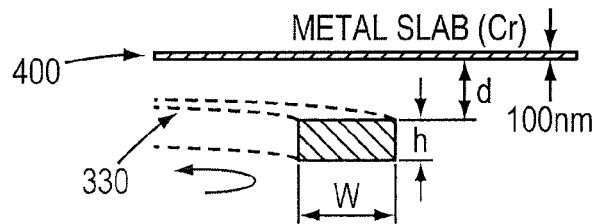
FIG. 4a is an illustration of the cross-section of a thin heating element placed above a microring resonator or waveguide in order to resistively heat and by proximity increase the temperature of the waveguide to permit thermal tuning.
Figure 4B:
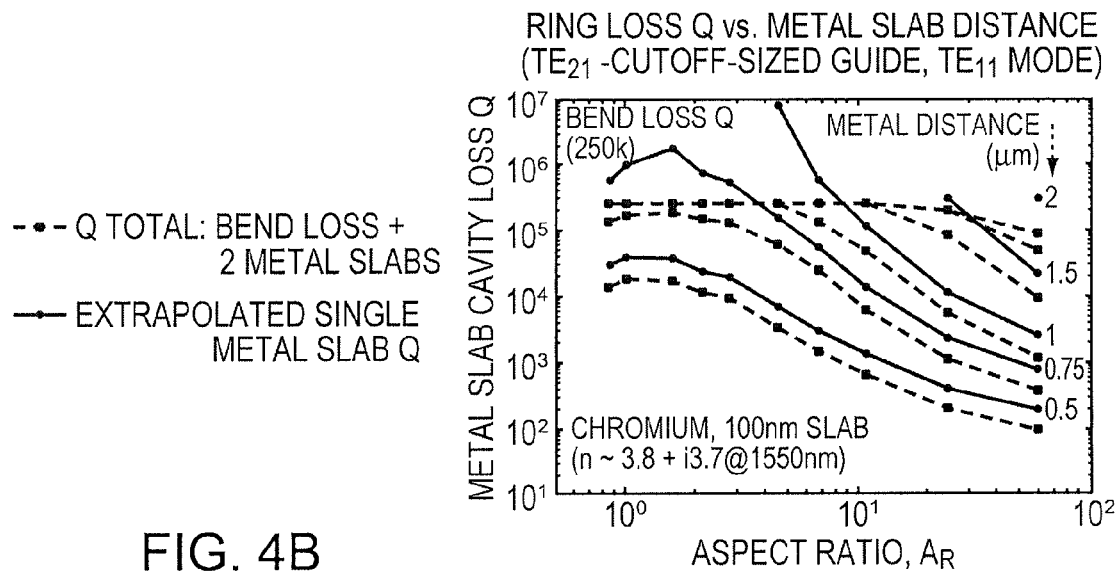
FIG. 4b is a graph illustrating the loss quality factor (Q) of a microring resonator TE mode, due to overlap of the optical field with (and resulting absorption by) a heating element as in FIG. 4a, for the TE design of various aspect ratios from FIG. 5, corresponding ring radii from FIG. 9a, and exemplary chromium heating elements, for various displacements of the heating element above the microring.
Figure 4C:
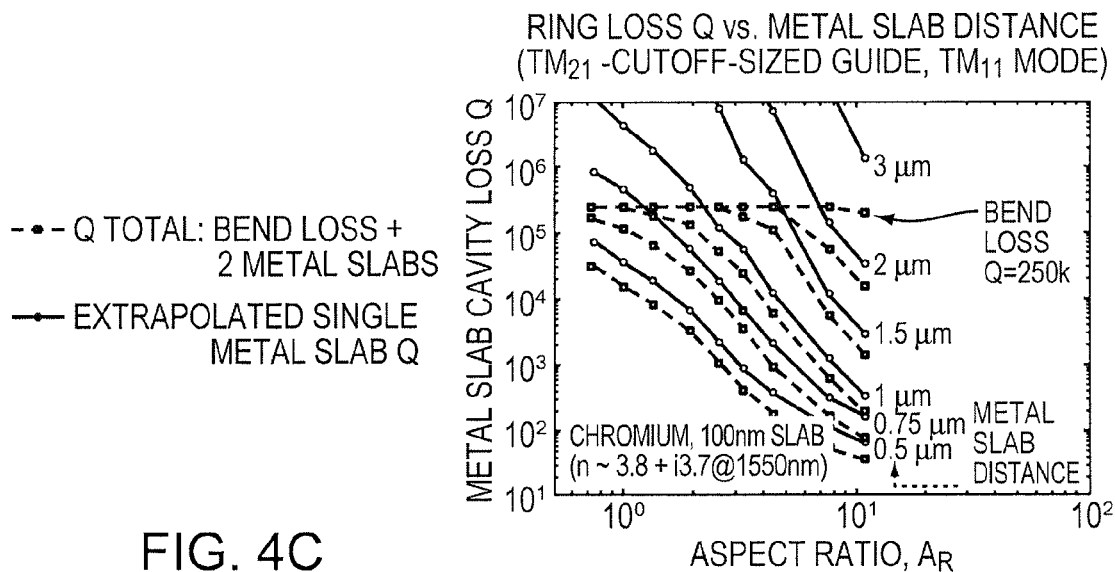
FIG. 4c is a graph illustrating the loss quality factor (Q) of a microring resonator TM mode, due to overlap of the optical field with (and resulting absorption by) a heating element as in FIG. 4, for the TM design of various aspect ratios from FIG. 5, corresponding ring radii from FIG. 9a, and exemplary chromium metal heating elements, for various displacements of the heating element above the microring.

Next, absorption due to a metallic membrane is considered. Metals tend to be absorptive at optical frequencies (wavelengths) of excitation. Although the level of absorption varies in general among different metals, the behaviour is similar and generally within the same order of magnitude in absorption. Chromium is used as an example for illustrative purposes, but the conclusions apply more generally to gold, titanium, nickel, molybdenum, palladium, vanadium, tungsten, and other metals that may be used. FIG. 4a shows a cross-section of the exemplary microring resonator configuration in accordance with an embodiment of this invention, showing a 100 nm thick chromium heating element 400. FIG. 4b shows the total loss Q due to absorption in two symmetrically placed heating elements above and below the waveguide 330, together with the bending loss at the radius required for a bend loss Q of 250,000 and FSR of 2 THz, for the MC-STE design. The symmetrical configuration is computed for simplification of computer modeling. The bent waveguide is modeled again because it gives an upper bound for loss for the bent and straight waveguides of same cross-section. The total Q is given in black dotted line (which typically does not exceeds 250,000, limited by the bending loss Q set by the design), while the black solid line gives the extrapolated loss Q due only to absorption in a single heating element, e.g., a metallic or semiconducting slab. The latter is the loss Q of interest. Because it is of interest to place the heating element as close to a resonator as possible without spoiling the resonator Q by the heating element optical absorption, the displacement of the heating element is an important consideration in the design, and is directly related to the chosen aspect ratio. It favors choosing as small an aspect ratio as possible, in the region of $A_R$ values plotted, so that the heating element may be placed closer to the resonator waveguide without inducing absorption losses sufficient to spoil the Q. This means seeking as high an optical confinement as possible. On the other hand, FIG. 10a showed that high aspect ratios are favored for low sensitivity to dimensional error, and as can be seen from FIG. 15b, also for low propagation loss due to sidewall roughness. Therefore, for thermally tuned resonators heated by a resistive heating element, the optimum design will need to trade off these two requirements according to their importance in the particular case. FIG. 4c shows that the same constraint on the undercladding thickness for the MC-STM designs using the $TM_{11}$, mode. For example, in the MC-STE, $TE_{11}$ case with $A_R\approx 6$, undercladdings of about 0.9 μm thickness and up are sufficient; while in the MC-STM, TM11 case the same undercladding thickness is sufficient for up to about $A_R\approx 2$. Since MC-STE ($TE_1$) with $A_R\approx 6$ and MC-STM ($TM_{11}$) with $A_R\approx 2$ are approximately "equivalent designs" as already described, in terms of sensitivity, achievable high-Q FSR, etc., the substrate requirement does not point strongly in favor of one design or the other. This is despite the intuition one may have that TM modes are more extended in the vertical direction and thus may have higher substrate losses—this is compensated by the lower width sensitivity of TM at lower aspect ratios and larger allowable cross-section area.

In the context of design of isolated resonators, it has been determined that a set of equivalent MC-STE and MC-STM designs exists, with different aspect ratios, but largely matching performance in terms of achievable high-Q FSR, sensitivity, tunability, substrate leakage and heating element absorption losses. In general, in the construction of resonator-based devices, excitation of a resonant cavity entails direct or evanescent coupling to other resonators or waveguides. Next, minimum coupling gaps for in-plane evanescent coupling and coupling coefficient sensitivity to error in waveguide width and height are examined.

Continuing with designs in FIG. 5a, consider ring-to-straight-bus-waveguide coupling gaps, for various aspect ratios, that provide 12.8% ring-bus power coupling coefficient that is necessary to realize a 40 GHz-wide, $3^{rd}$-order passband (3-ring) filter with a 2 THz FSR. FIG. 16a shows the ring-bus waveguide coupling geometry considered. A section through a directional coupling region shows a microring resonator 1600 and bus waveguide 1610, the ring and bus waveguide modes interacting via evanescent field coupling mostly where the gap is narrowest. For each aspect ratio, one may take the $TE_{11}$ mode of the MC-STE design and the $TM_{11}$, mode of the MC-STM design. For each, one takes the bend radius for a 2 THz FSR and bend loss Q of 250,000, and then finds the coupling gap that gives 12.8% single pass power coupling. Here, for the computation of each data point an optimization problem may be solved to find that coupling gap that provides the desired power coupling coefficient. Therefore, the computation has been done using a semi-analytical approximation, using accurate, numerically solved mode distributions, and accounting for the bent coupling region in an analytical way, using coupled mode theory, to allow the estimate to be computed in reasonable time for a large number of coupling gap values. This means that the values may be inaccurate on the order of 50%, but the dependence, relative comparison and scaling are trustworthy, and therefore useful information may be extracted from these computations.

Figure 16B:
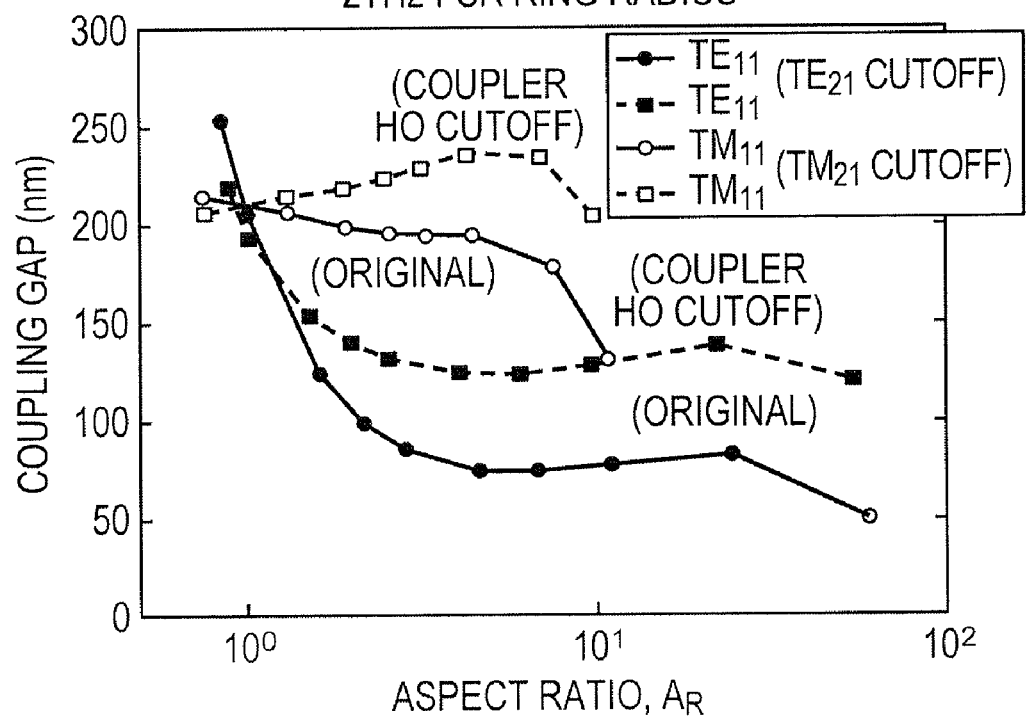
FIG. 16b is a graph illustrating the coupling gap between a microring resonator and straight bus waveguide that is required for a 12.8% total power coupling in one pass of the coupling region, for TE and TM waveguide designs of various aspect ratios from FIG. 5 (using ring radii needed to achieve a 2 THz FSR, based on mode group indices from FIG. 7b) as well as for TE and TM waveguide designs modified by reducing lateral dimensions to cut off a higher-order, parasitic mode that occurs in directional couplers with small gaps.

FIG. 16b (solid lines) shows the estimated coupling gap vs. aspect ratio that is needed. This is the first significant difference found between otherwise equivalent MC-STE and MC-STM designs. For $A_R>1$, the coupling gap does not change strongly with aspect ratio for either design, but the MC-STM gaps (on the order of 200 nm) are twice as wide as the MC-STE gaps (on the order of 100 nm). In terms of lithography, wider coupling gaps are easier to realize, and therefore MC-STM designs may be better suited to low-resolution lithography, such as conventional photolithography and deep-UV lithography. In terms of etching, the aspect ratio of the gaps, measured as the waveguide height to gap width ratio, is more relevant. This is a measure relevant for the ability to create such gaps by etching, as well as for the ability to fill these gaps with an overcladding material, such as a spin-on glass, where an overcladding is to be used. In this second category, the MC-STE and MC-STM designs are again approximately on par, since the gap in the MC-STM cases is about twice as large, but at the same time equivalent MC-STM designs are generally about twice as tall as the corresponding MC-STE designs, as will be shown by example more specifically below.

For efficient filter designs, a correction is preferably made in the waveguide cross-sections that is specific to high-index-contrast directional coupler regions. If one designs an HIC waveguide cross-section to support only one TE and one TM mode, as in the MC-STE designs of FIG. 5a, this ensures no spurious higher-order modes are present to couple to and cause crosstalk and loss. When two such waveguide are placed in close proximity side-by-side, in addition to two supermodes that emerge from coupling (a symmetric and an antisymmetric mode, if the coupler is symmetrical), a third mode may become guided. For example, if the waveguides are placed immediately next to each other to form a single waveguide that is twice as wide (i.e., zero gap), the lateral dimension may be more strongly confined at the expense of slightly weaker confinement in the vertical dimension, such that a third mode, that is near cutoff, may become guided.

This is counter to intuition one might take from the behaviour of slab waveguides, which have an analytical solution, and do not show this effect. Namely, the number of modes in a slab waveguide is given by the V-number divided by $\pi/2$, where the slab V-number is defined as $$V = \frac{1}{2}k_o w \sqrt{n_{co}^2 - n_{cl}^2},$$

w is the slab width, $k_o$ is the free-space wavenumber, and $n_{co}$ and $n_{cl}$ are the core and cladding indices. Thus the number of guided modes in a slab waveguide is $$N = \left\lfloor \frac{V}{\pi/2} \right\rfloor = \left\lfloor \frac{w}{\lambda_o/2} \sqrt{n_{co}^2 - n_{cl}^2} \right\rfloor,$$

where $\lfloor \cdot \rfloor$ indicates rounding down to the nearest integer. Now if one takes a slab waveguide with one guided mode, such that its second mode is at cutoff, it's V number equals $\pi/2$. If two such waveguides are placed adjacent each other with small gaps, they will have strong coupling and at least two modes (one for each waveguide) with propagation constant splitting of these supermodes representing the coupling. If the gap is zero, the two slab waveguides touch, and one obtains a single waveguide of twice the width. This wider waveguide, according to the above expression, has twice the V number. Since the V number of the original waveguide was $\pi/2$ (having only one mode), the V number of the new waveguide is $\pi$ and it has exactly and no more than 2 modes. This is independent of polarization. Thus appearance of the additional modes seen in 3D HIC waveguides requires the additional vertical degree of freedom for confinement available in 3D waveguides.

This existence of the higher-order, spurious modes is undesirable, and the ring, the bus waveguide or both may be made narrower to cut off such modes even in the coupled configuration (at the design coupling gap). In the present discussion, the ring and bus waveguide are symmetrically narrowed (i.e., both equally narrowed) to ensure the absence of the higher order mode. The dotted lines in FIG. 16b show the modified coupling gap curves. Since the waveguides are narrower, the field is slightly more expelled from the core and the coupling is stronger for a given coupling gap, hence the gaps increase. The sensitivities also slightly increase, since these do not represent the maximally confined (MC) waveguide designs. These designs are rather below and to the left of the corresponding (MC-STE or MC-STM) curve in FIG. 5a, and they are shown in FIG. 5c for the particular coupling strength chosen in FIG. 16b. FIG. 5c shows a directional coupler designed using each waveguide aspect ratio, with width adjusted to ensure the absence of a third (parasitic) mode, the first and second modes being the usual symmetric and antisymmetric modes of interest in the coupler. The increase in coupling gap as a result of modifying the waveguide cross-section is limited, but the TM designs still have about twice the coupling gap for most aspect ratios in the range $A_R>1$.

In the case of the corrected designs shown in FIG. 5c, the width is narrowed by between 0 and 10% (in both the MC-STE and MC-STM designs) in order to cut off the relevant coupler mode, in the case of aspect ratios $A_R>1$ (aspect ratios $A_R<1$ are not strongly susceptible to gaining extra parasitic modes under lateral coupling, so no substantial correction is needed). For example, for MC-STE design of around 6:1 aspect ratio in Si—SiO$_2$ rectangular waveguide (FIG. 5a) has about 675 nm width and 110 nm height. In order to produce a 12.8% coupler used in the example of a 40 GHz bandwidth filter with 2 THz FSR, the width is narrowed to about 605 nm, consistent with FIG. 5c. Similarly, in the case of an MC-STM design of aspect ratio 1.8:1 the cross-section is 480×265 nm, but is narrowed to about 455×265. These examples illustrate the correction applied to width for couplers, as shown in FIG. 5c.

Since all TE waveguide designs have similar coupling gaps and all TM designs have similar coupling gaps, all being realizable using scanning-electron-beam lithography (SEBL) and the TM also suitable for photolithography in this example, the coupling gap does not select among the aspect ratios and mark a set of designs to be excluded.

In the substrate loss, heating element absorption and coupling gap analysis, only the range $A_R>1$ is considered where the width sensitivities are small.

Figure 17A:
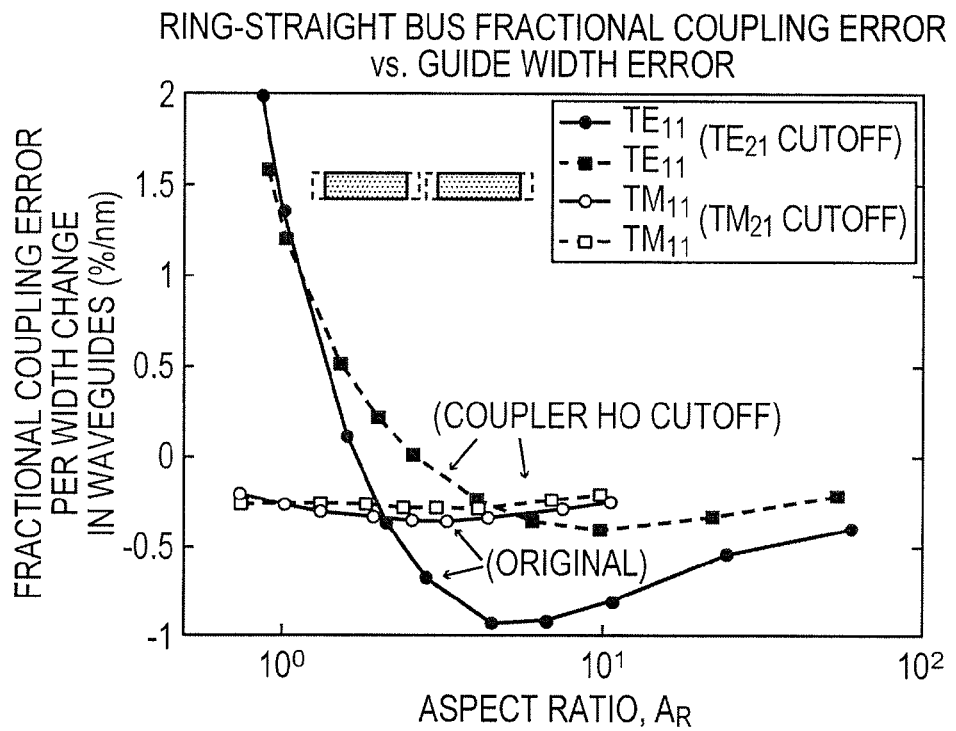
FIG. 17a is a graph illustrating the sensitivity of the coupling ratio of the directional coupler region of FIG. 16b to symmetric errors in waveguide widths, for TE and TM designs of various aspect ratios from FIG. 5, and radii chosen to give a 2 THz FSR, as well as for the TE and TM designs modified to cut off a higher-order, parasitic mode that occurs in directional couplers with small gaps, as described in FIG. 16b.

Next, the coupling coefficient sensitivity to waveguide width and height error is considered, for the coupling gaps in FIG. 16b. FIG. 17a shows the width sensitivity of the power coupling coefficient corresponding to the four coupling gap cases shown in FIG. 16b. Plotted is the fractional error in the power coupling coefficient (nominally 12.8%) per nm width error. The zero point of sensitivity is attractive because the coupling coefficient there is insensitive to first order to errors in waveguide width. This occurs only for the MC-STE design for the plotted aspect ratios, around $A_R\approx2.5$ for the higher-order-cutoff-corrected MC-STE case. In both corrected designs (i.e., dotted lines), for a typical width uncertainty of about 10 nm achievable in SEBL, the coupling coefficient may be in error by about 4% of its value, which is generally an acceptable variation. The waveguide-width sensitivity of the coupling coefficient does not select strongly over the field of remaining MC-STE or MC-STM designs.

Figure 17B:
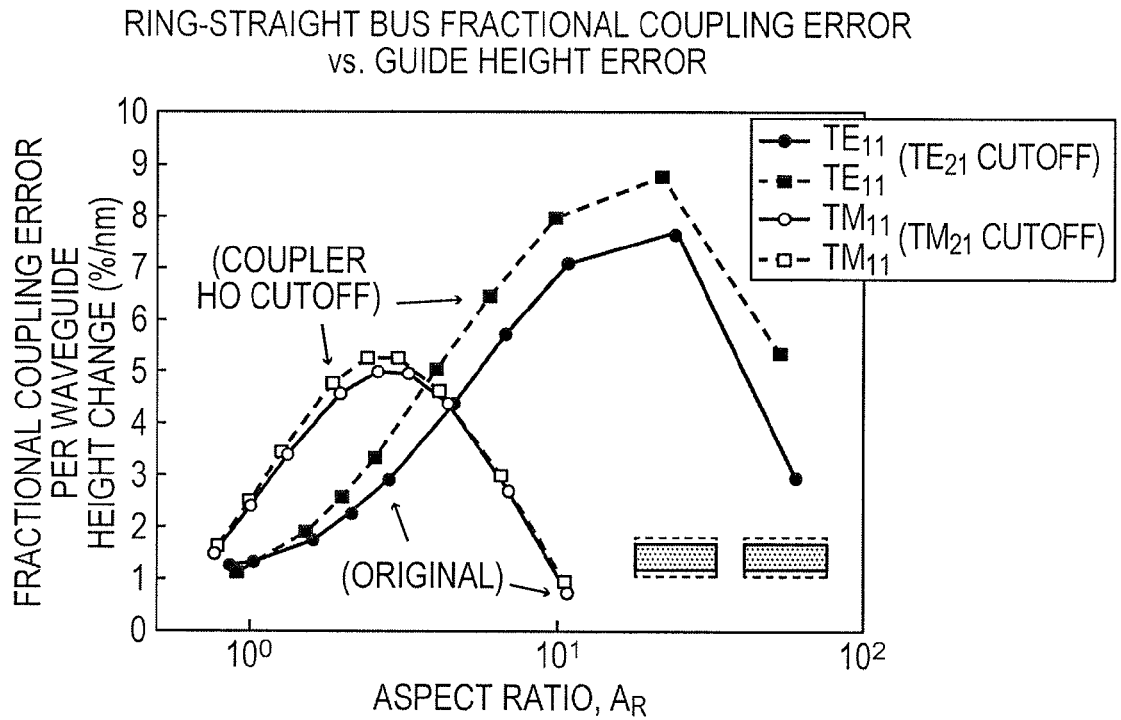
FIG. 17b is a graph illustrating the sensitivity of the coupling ratio of the directional coupler region of FIG. 16b to symmetric errors in waveguide heights, for TE and TM designs of various aspect ratios from FIG. 5, and radii chosen to give a 2 THz FSR, as well as for the TE and TM designs modified to cut off a higher-order, parasitic mode that occurs in directional couplers with small gaps, as described in FIG. 16b.

The height sensitivity is more of a concern, as shown in FIG. 17b. There, the fractional error in the coupling coefficient per nm error in waveguide height is plotted corresponding to the four cases shown in FIG. 16b. The MC-STE and MC-STM designs are corrected for the higher-order-mode cutoff in couplers (i.e., dotted lines). The TM design has larger sensitivity at a given $A_R$, but if equivalent designs are selected, then the sensitivity of the TM and TE design is about the same for the $A_R$ up to about 3 in the TM case, and the corresponding $A_R$ for TE up to about 6-7. Above $A_R\approx3$, the TM design is less sensitive than TE, but the TM design at high aspect ratios also has small FSRs, as described. The height sensitivity of the coupling coefficient is considerable for both the TE and TM designs, reaching on the order of 50% change in the power coupling coefficient per 10 nm error in thickness. However, thickness is well controlled, and may be measured to high precision. For this reason, in the presented designs, sensitivities to height are sacrificed in favor of optimizing sensitivities to width. Any designs will only need to be tolerant enough to height (i.e., core layer thickness) error to work properly within tolerances set by stochastic errors in measurement and on the wafer surface, and by slow variations of the height across the wafer. Typical values for thickness variation across a usable part of an SOI wafer may be on the order of 1-2 nm. Hence reasonably large sensitivity to height may be tolerable, in comparison to width sensitivities.

All of the design considerations illustrated thus far using the SOI uniformly cladded waveguide as an example may be summarized to draw conclusions regarding important design parameters and optimal designs for HIC waveguides. FIG. 18 is a table summarizing the results obtained in the context of a specific example using the general results in FIGS. 4, 5, 7-14, 16, and 17. The first column describes the design parameter under consideration, the second column gives a brief description of the requirements for the particular example chosen for illustration (of a 40 GHz-bandwidth, 2 THz FSR filter), and the third and fourth column provide the range of aspect ratios for each of the MC-STE and MC-STM designs, respectively, that meet each criterion. The criteria that are decisive in setting the minimum and maximum usable aspect ratio for the chosen example are highlighted in gray.

Several (both specific to the example and general) conclusions may be drawn from the summary in FIG. 18. The resonance-frequency sensitivity to width is, by a sizeable margin, the deciding factor on the minimum usable aspect ratio. In the case of 40 GHz wide filters, where it is desired to have less than about 40 GHz/nm sensitivity to width error, this limits MC-STE designs to $A_R>6$ and MC-STM designs to $A_R>1.8$. In general, for strongly confined waveguides where aligning multiple resonant modes, sensitivity to propagation loss due to sidewall roughness, or absolute resonance frequency control are of concern, the width sensitivity is likely to be the factor setting the minimum aspect ratio. When tunability is disregarded (no heating element losses), the maximum usable aspect ratio, in general, is set in each case by the FSR requirements. Generally FSRs above 2 THz require MC-STE designs with $A_R<15$ or MC-STM designs with $A_R<3.2$. When tunable resonators are to be made, and the design is such that it is desirable to place heating elements as close to the resonator as possible, such as for thermooptic tuning, then the proximity of the heating element favors smaller aspect ratios. In the case chosen as an example, relevant for SOI microring resonator filters, where a Cr heating element is to be placed 1 μm above the resonator, this criterion limits the maximum usable aspect ratio to $A_R<7$ for the MC-STE designs, and $A_R<2.5$ for the MC-STM designs. Simply the consideration of these constraints narrows the usable waveguide design range down to a small range of aspect ratios in each case, pointing to an optimal design. The choice within the remaining range of aspect ratios will come down to whether sensitivity, or FSR or proximity of the tuning heating element, is the more important design factor. The MC-STE designs and MC-STM designs have approximately equal performance, so one example of "equivalent" MC-STE and MC-STM designs is provided here in $A_R=6$ MC-STE and $A_R=1.8$ MC-STM designs, for example.

More generally it can be seen that the optimal designs are substantially different from the conventionally used 2:1 aspect ratio TE designs with about 450×200 nm cross-section. The optimal TE design obtained has an aspect ratio of about at least 5:1, e.g., 6:1, or a core size of about 605×10 nm (narrowed from about 675×110 nm to cut off higher order modes in couplers). More generally high aspect ratio TE waveguides near cutoff of the second order TE mode are well suited for fabrication-error tolerant resonators.

A second novel design (MC-STM) that performs equally well is a lower aspect ratio waveguide, oversized with respect to the MC-STE "single-mode" designs in that it supports up to two TE and only one TM guided mode. The $TM_{11}$ polarized mode is used. This overmoded design still maintains effectively single mode performance for the TM mode, which also provides the low sensitivity to fabrication width errors and sidewall roughness and large high-Q FSRs.

Figure 19:
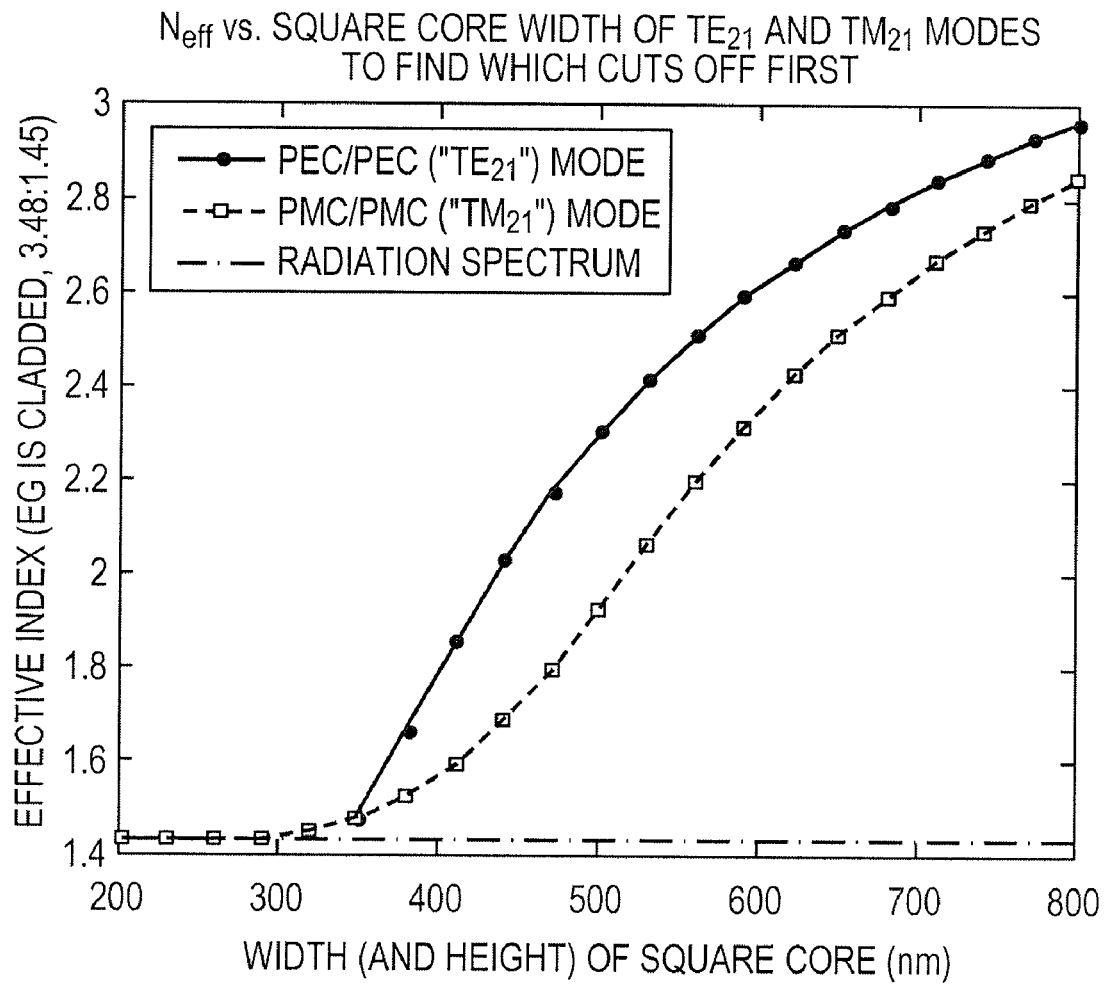
FIG. 19 is a graph illustrating the effective index of the TE and TM second order mode vs. waveguide width for waveguides having square-cross-section; using several combinations of perfect electric conductor (PEC) and perfect magnetic conductor (PMC) boundary conditions at top/bottom and left/right computational domain boundaries.

When considering the MC-STE designs and MC-STM designs, an interesting finding is that for square waveguides the MC-STE design is smaller than the MC-STM design. Namely, the MC-STM design has two "TE" modes and one TM mode. In the square geometry, as illustrated in FIG. 5b, what is labeled the "$TE_{21}$" mode throughout this document actually has radially outward electric field lines and corresponds to what is named the $TM_{10}$ mode in a circular optical fiber, while the "$TM_{21}$" mode in this document actually has azimuthally directed (curling) electric field lines and corresponds to the $TE_{10}$ mode in a circular optical fiber. Since the TM $TM_{10}$ mode (i.e., $TE_{21}$ herein) is less well confined, one may assume that it is the first to be cut off. But, on the contrary, the MC-STM square waveguide has a guided $TE_{21}$ mode, and a cut off $TM_{21}$ mode. FIG. 19 confirms this, by plotting the effective index of the $TE_{21}$ and $TM_{21}$ modes as a function of the width (and height) of the cross-section (while keeping the cross-section square). It shows that the TE $TM_{21}$ mode has the higher effective index at large core sizes, but when the core shrinks, there is a crossing of effective indices and this mode is cut off first.

Figure 15A:
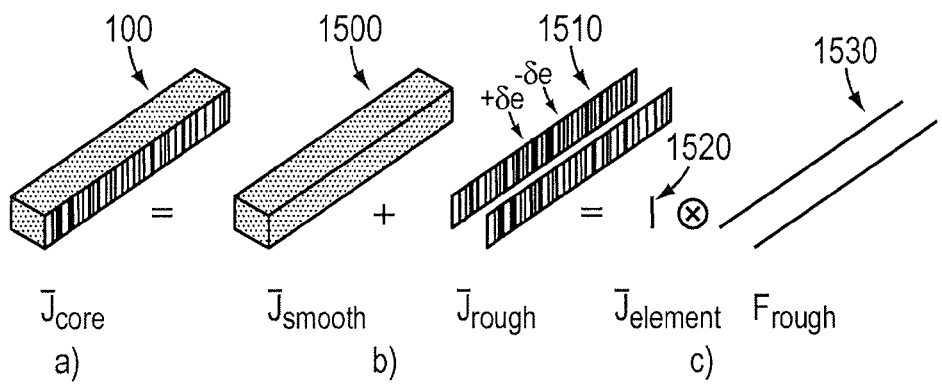
FIG. 15a is a schematic diagram illustrating a theoretical treatment of waveguide sidewall roughness by assuming that the total dielectric constant distribution of a waveguide is the sum of the dielectric constant distribution of an ideal smooth waveguide and a perturbation on each sidewall that creates the roughness; and assuming that the roughness is one-dimensional, i.e., invariant with height, which models well roughness created by planar lithography.

Low sensitivity to width or height error implies to a certain degree also propagation loss due to sidewall or top/bottom-wall roughness, respectively. This can be shown using a theoretical model of the effect of sidewall roughness on propagation loss, predicting propagation losses for various aspect ratio waveguides. FIG. 15a is an illustration of the model, which is based on antenna theory. A rough waveguide 100 (FIG. 15a(a)) is decomposed into a sum of a smooth guiding waveguide 1500 (FIG. 15a(b)) and a perturbation 1510 (FIG. 15a(c)). The smooth waveguide does not radiate so the radiated power from the entire waveguide is equal to the radiated power from the perturbation. The perturbation is in turn modeled by antenna theory as an element factor 1520 representing the height of the waveguide and polarization, and an array factor 1530 representing the stochastic lengthwise perturbation distribution, which may be modeled using stochastic methods.

Figure 15B:
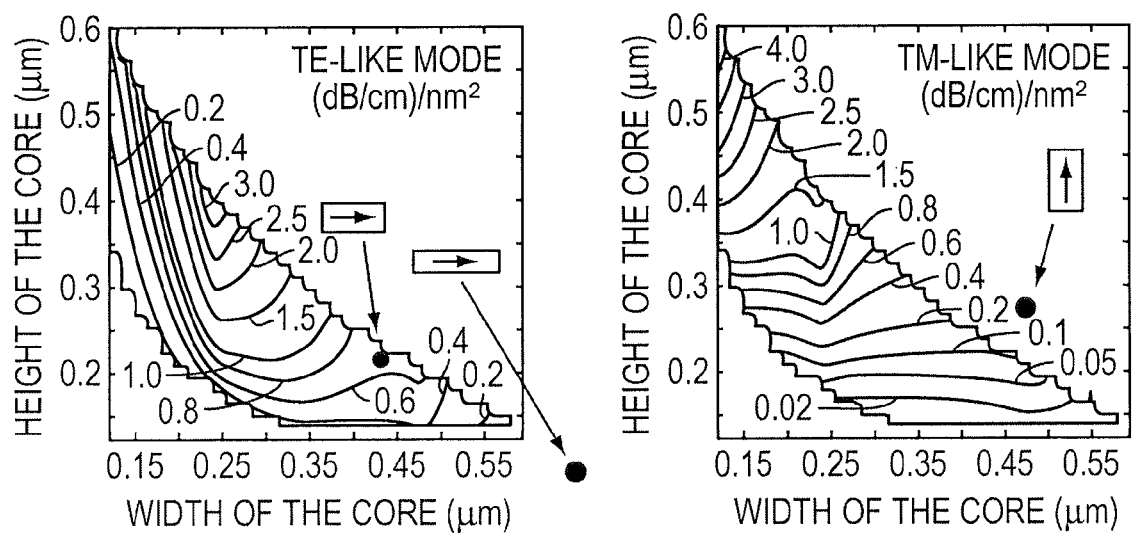
FIG. 15b is a pair of graphs illustrating theoretically predicted waveguide propagation loss due to sidewall roughness of the TE-like (horizontally polarized) and TM-like (vertically polarized) modes of waveguides of various heights and widths; and where the top/bottom-wall roughness loss can be found by interchanging the TE and TM mode labels and interchanging the width and height axes.

FIG. 15b shows the results of such a propagation loss analysis for a silicon-core, uniformly silica-clad waveguide. The propagation loss is given per square nm of mean-square (MS) roughness, i.e., lateral distance at any point from the average smooth ideal waveguide, taking into account a roughness distribution model.

FIG. 15b (left side) shows the propagation loss, versus waveguide width and height, for the fundamental TE-polarized mode, per square nm of roughness. FIG. 15b (right side) shows the propagation loss, versus waveguide width and height, for the fundamental TM-polarized mode, per square nm of roughness. Several observations can be made. First, at high aspect ratios (large width, small height) the TM mode is considerably less sensitive than the TE mode to roughness. However, if "equivalent designs" are compared that provide the same high-Q FSR, sensitivity, etc., it can be seen that they also arrive at approximately the same propagation loss due to roughness. For the specific example chosen for illustration throughout, and taking the concluding aspect ratios for MC-STE and MC-STM designs from FIG. 18, i.e., A 6 and $A_R \approx 1.8$, respectively, one may see that the propagation loss in both cases is about 0.1 (dB/cm)/nm². These plots show the sensitivity to roughness on the sidewalls. Similarly to the case with FIG. 10a, the sensitivity to roughness on the top/bottom walls may be obtained by swapping the TE and TM labels, and by exchanging the width and height, i.e., letting $A_R \rightarrow 1/A_R$. The conventional 2:1 aspect-ratio TE (about 450× 200 nm) design and the optimal designs from the case in FIG. 18 are indicated on the plots in FIG. 15b. The conventional design is about 6-7 times more sensitive to sidewall roughness.

Figures 20A, 20B:
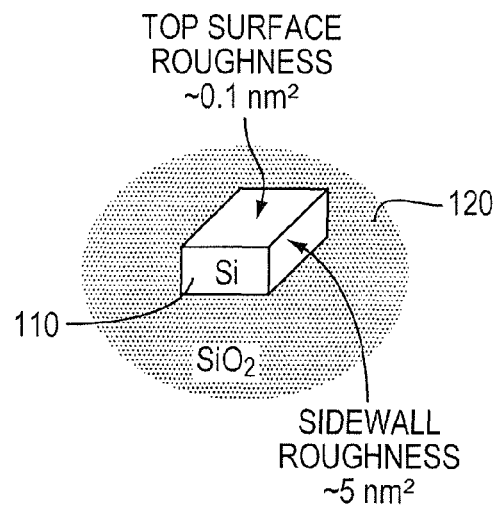
FIG. 20a is a schematic diagram illustrating typical topwall and sidewall roughness variance on a single mode silicon waveguide of micrometer-scale dimensions.
FIG. 20b is a table illustrating expected propagation loss due to scattering from sidewall and topwall roughness of a standard silicon waveguide design, and of exemplary, typical optimized TE and TM designs according to the criteria in FIG. 18; as well as corresponding radiation loss Q's due to surface roughness of corresponding resonances near 1550 nm wavelength of microring resonators constructed from said waveguide designs; and also the corresponding radiation Q due to bending loss of said microring resonators for comparison.

One may estimate, using typical values attainable in SOI wafers and using SEBL lithography and standard processing for sidewall and top/bottom wall roughness, approximate expected propagation loss due to roughness in these examples. FIG. 20a illustrates typical roughness of a core 110. Top- and bottom-wall roughness may be reduced by polishing and show a variance as small as about 0.1 nm. On the other hand, the sidewall roughness achievable with state-of-the-art lithography has a variance of about 5 nm². Using these estimates and the sidewall and top/bottom-wall roughness loss sensitivities in FIG. 15b, one may estimate the propagation losses of the three waveguide designs marked in FIG. 15b, in the table in FIG. 20b. The conventional design expected propagation loss is about 3.5 dB/cm which is the correct order of magnitude for observed losses in such waveguides. Both the MC-STE and MC-STM designs from FIG. 18 offer 3 times smaller expected losses at about 1 dB/cm, with sidewall and top/bottom-wall roughness taken into account. The corresponding Q's due to the scattering loss due to roughness, and for comparison that due to bending loss, are also given. Whereas expected Q's for conventional waveguides are limited to the order of 200,000, the new designs provide more than twice the Q. Bending loss is not the limiting factor in any of the designs. It should be noted that the Q and propagation loss estimates depend directly on the estimates of achievable top/bottom-wall and sidewall roughness. In absolute value, the loss prediction is expected to be within the order of magnitude. However, the relative comparison of designs is deemed to be much more accurate, because the same roughness estimate is used for all designs.

An important point to note next is the behavior of the secondary polarization mode in each design. In the MC-STE design, $TE_{11}$ is the primary (used) mode, and the $TM_{11}$, mode is the undesired secondary mode (which is still guided). The second and third columns in the table in FIG. 20b show that although the propagation loss due to surface roughness of the TM mode is low, leading to a high Q, the bending loss is prohibitive and limits to Q to below 10. Since the primary mode loss Q is above 150,000, the TM mode may be considered unguided and will contribute little to loss in the filter. In the MC-STM design, however, there are two TE modes and one, primary, TM mode. The secondary TE mode, TE21, is suppressed by excessive bending loss and may be considered unguided in microrings of bend radii that achieve THz FSRs. However, the first parasitic TE mode, $TE_{11}$, is more strongly confined than the primary (used) $TM_{11}$ mode. As a result, bending loss does not lead to significant losses in either of these two modes. Furthermore, columns 4 and 5 in FIG. 20b show that the modes attain comparable losses due to sidewall and top/bottom-wall roughness, the unwanted TE mode having only slightly higher loss. In principle, this is not a problem because coupling between the used TM and undesired TE modes is prevented by symmetry. In practice, fabrication errors that lead to perturbations away from vertical symmetry of the core layer will lead to small parasitic crosstalk between the TM and TE modes. This may also happen in any HIC waveguide designs that have even a slight vertical asymmetry, such as deeply etched ridge waveguides (FIG. 1). This is one potentially serious drawback of the MC-STM design with respect to the MC-STE design. Therefore it is evaluated in further detail.

In principle, failing to fabricate perfectly vertical sidewalls is one likely way in practice that the TE-TM symmetry may be broken. It is of interest to consider the magnitude of the effect. In principle, symmetrically slanted sidewalls on a single waveguide do not couple TE and TM modes because the couplings at the left and right wall are equal in magnitude and opposite in sign, thus canceling. However, if, in a coupling region, i.e., a directional coupler, sidewalls are slanted, then the symmetry is broken and TM and TE modes will couple.

Figure 21A:
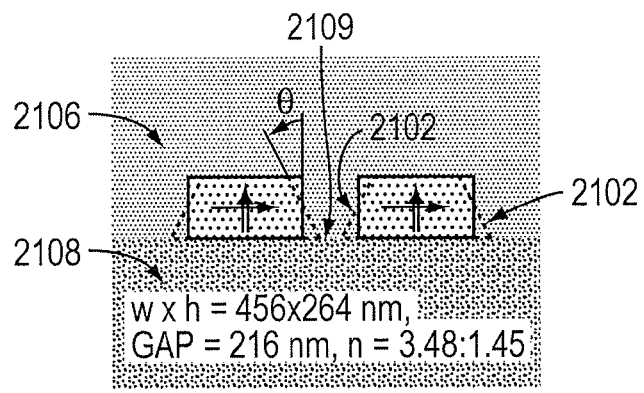
FIG. 21a is a schematic diagram illustrating the cross-section of a directional coupler of two waveguides, a microring and a waveguide, or two microring resonators, for a TM filter design corresponding to the criteria in FIG. 18, using waveguide widths and a coupling gap further corrected to cut off the higher-order, parasitic coupler mode as shown in FIG. 16b; and where the waveguide sidewalls have an unintended slant, thereby causing coupling of TE and TM modes in the coupling region.

FIG. 21a illustrates a directional coupler formed of waveguides according to the MC-STM design at $A_R \approx 1.8$, i.e., width×height=465×264 nm (narrowed from original MC-STM design of 480×265 nm in FIG. 5a, to cut off higher order coupler modes). The cladding is uniform on all sides, with index 1.45, the $TE_{11}$ and $TM_{11}$, polarized modes are indicated in single and double arrows, respectively, and the sidewall slant angle θ is indicated.

The shown structure includes a cross-section of a directional coupler that may be formed of the interacting region (region of closest proximity) of: (a) two waveguides (220 or 220'), (b) a microring resonator 330 and a waveguide (which forms part of the first optical path 380), or (c) two microring resonators 330 and 350, for a TM filter design corresponding to the criteria in FIG. 18, using waveguide widths and a coupling gap further corrected to cut off the higher-order, parasitic coupler mode as shown in FIG. 16b; and where the waveguide sidewalls have an unintended slant, thereby causing coupling of TE and TM modes in the coupling region.

The effect of TE-TM crosstalk will be most enhanced at resonances. Therefore, to estimate the deleterious effect of slanted sidewalls through crosstalk, one may consider the filter considered thus far, 40 GHz-wide with 2 THz FSR. The coupling gaps are chosen to provide a flat, Chebyshev-shaped passband and 20 dB extinction in the ideal case in the through-port.

The TE and TM crosstalk coupling is computed using numerically computed modes of the ideal (vertical walled) directional coupler, and the effect of wall slant is computed by coupled mode theory, formulated in a suitable way for HIC waveguides. This is necessary because the relevant wall slants in practice are small (a slanted sidewall defines a sidewall angle θ of, typically, <5 degrees, e.g., 1-5 degrees, with respect to a top portion of the optical waveguide, i.e., an angle θ between the sidewall and a plane normal to the top portion of the optical waveguide), and the Cartesian discretization of the computational domain would lead to excessive errors when trying to compare waveguides with small differences in wall slant. This model is later justified in FIGS. 24a and 24b.

For illustration, it is assumed that the filter of interest operates in TM mode ideally, as intended in the MC-STM design. It is also assumed that the microring cavities have TE resonances, as they are likely to have, at a different but nearby frequency. First, operation is considered when TM input excites the TM resonances (FIG. 21b) and when TE input excites the TE resonances (FIG. 22a), before considering crosstalk (TM input exciting TE resonances) illustrated in FIG. 23a.

Figure 21B:
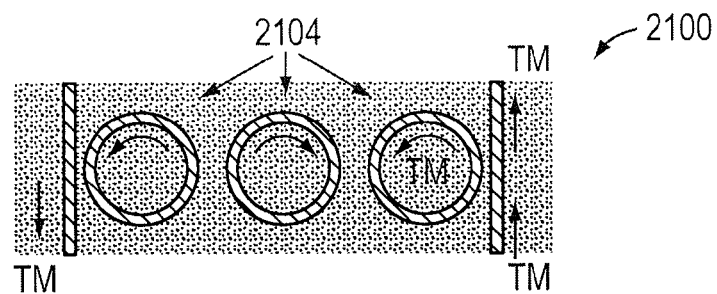
FIG. 21b is a schematic diagram illustrating the top view of an exemplary third-order microring-resonator add-drop filter, with slanted walls as in FIG. 21a; and illustrating the ring and waveguide mode excitations at the primary filter response wavelengths, resulting from coupling of the TM bus waveguide mode to the TM resonant modes in the microrings.
Figure 21C:
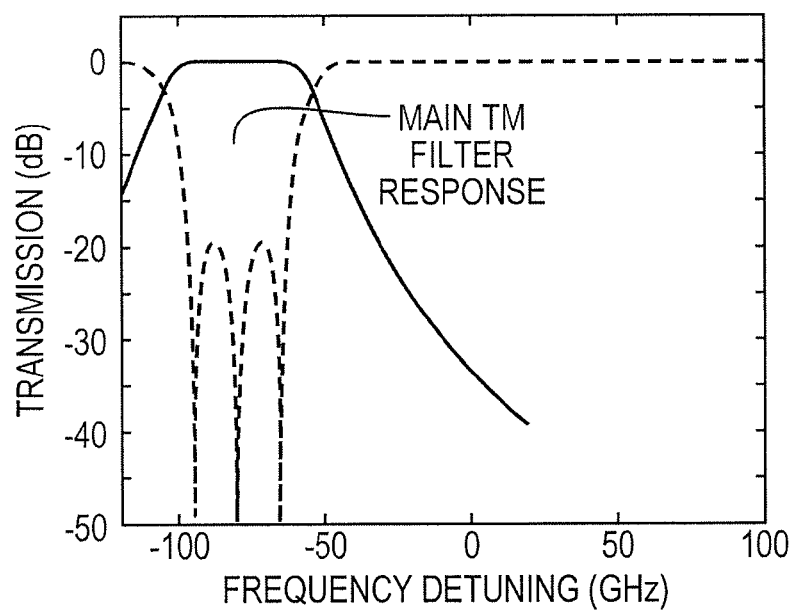
FIG. 21c is a graph illustrating the primary TM filter response of the filter in FIGS. 21a and 21b designed to show a 40 GHz passband.

In a top view of an exemplary third-order microring-resonator add-drop filter 2100 with slanted walls 2102, FIG. 21b illustrates monochromatic TM input at a wavelength near the resonant TM passband of the filter, showing excitation of the TM microring resonances, and TM through and drop port outputs. In other words, the ring and waveguide mode excitations at the primary filter response wavelength result from coupling of the TM waveguide mode to the TM resonant modes in the microring resonators 2104. FIG. 21c shows an exemplary drop and through port response of this filter, for various TM input wavelengths near the passband, using TM input and measuring the TM polarized light in the through and drop port outputs.

Figure 22A:
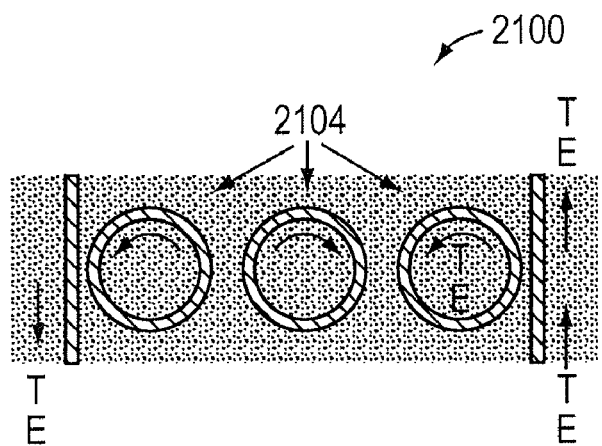
FIG. 22a is a schematic diagram illustrating the top view of the microring resonator add-drop filter of FIGS. 21a-21c; and illustrating the ring and waveguide mode excitations when the TM filter design that gives the response in FIG. 21c is excited with a TE mode in the input waveguide, i.e., resulting from coupling of the TE bus waveguide mode to the TE resonant modes in the microrings.

FIG. 22a illustrates the top view of the filter of FIGS. 21a-21c, showing the ring and waveguide mode excitations when the TM filter design that gives the response in FIG. 21c is excited with a TE mode in the input waveguide, i.e., resulting from coupling of the TE bus waveguide mode to the TE resonant modes in the microring resonators 2104.

Figure 22B:
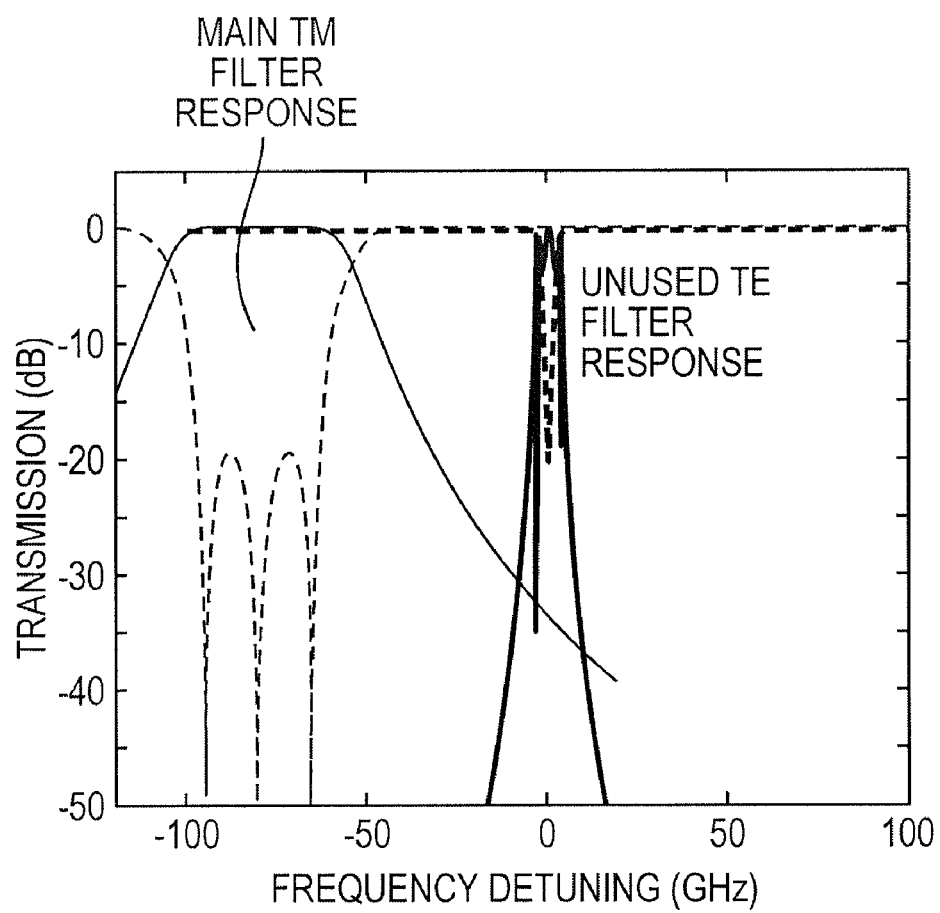

FIG. 22a illustrates monochromatic TE input at a wavelength near the TE resonances of the microring cavities 2104 comprising the filter 2100, showing the excited TE resonances of the microring resonators 2104. These resonances are formed of the unwanted secondary $TE_{11}$ waveguide modes in the MC-STM design. It is assumed for the moment that both the TE and TM resonances are lossless—the worst case scenario for crosstalk. The filter response is shown in FIG. 22b. It is narrower bandwidth and has high ripple, unusable as a filter. This is because the coupling gaps were designed to provide a flat-top passband for the TM polarization. Since the TE polarization is more strongly confined, the coupling is weaker and therefore the bandwidth is narrower. However, the transmission to the drop port, when on resonance with each of the supermodes, is still nearly 100%, because zero loss was assumed. This response is not of particular concern, because the filter is intended to have only TM input. However, it illustrates that if excited by TE light, the filter drops 100% of it at certain wavelengths.

Figure 23A:
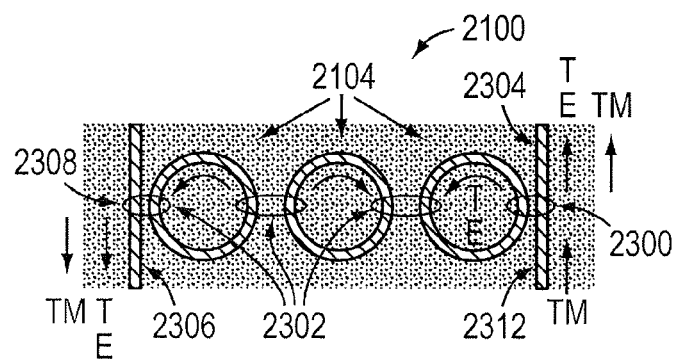
FIG. 23a is a schematic diagram illustrating the top view of the filter of FIGS. 21a-21c, 22a, and 22b; and illustrating the ring and waveguide mode excitations when the TM filter design is excited with a TM mode in the input waveguide (as in FIGS. 21a-21c), but observed at the wavelength of the TE resonance seen in FIG. 22b; the excitations resulting from wall-slant-induced coupling of the TM bus waveguide mode to the TE resonant modes in the microrings.

Next, one may finally consider the polarization crosstalk situation. FIG. 23a illustrates monochromatic TM input at a wavelength near the TE resonances of the microring cavities 2104 of the filter 2100 of FIGS. 21a-21c, showing excited TE resonances due to the crosstalk from TM to TE in the input directional coupler 2300. A 5° sidewall slant is assumed; 2-3° or smaller wall slant may be achieved with present-day fabrication techniques. Polarization crosstalk in the other couplers 2302 may be ignored as it contributes second order effects (once TM excites TE in the compound resonator 2104, most of the light stays TE rather than converting back to TM).

The amount of TE and TM light transferred to the through port 2304 and to the drop port 2306 are preferably considered. If there is significant TM light dropped into the drop port 2306, unwanted crosstalk at the TE resonant frequency results. If there is significantly less than 100% of TM light passing to the through port 2304, it means a significant amount of conversion to TE is acting as a loss mechanism and extracting TM power—thus potentially attenuating and distorting a through-port channel. TE light leaving the through 2304 and drop 2306 ports is undesired but is of less concern because it may be cleaned up by passing through a polarizer (bulk or waveguide integrated); since the used polarization is TM, TE will be filtered by the polarizer. Integrated waveguide polarizers are well known and designs exist in literature for HIC waveguides.

Figure 23B:
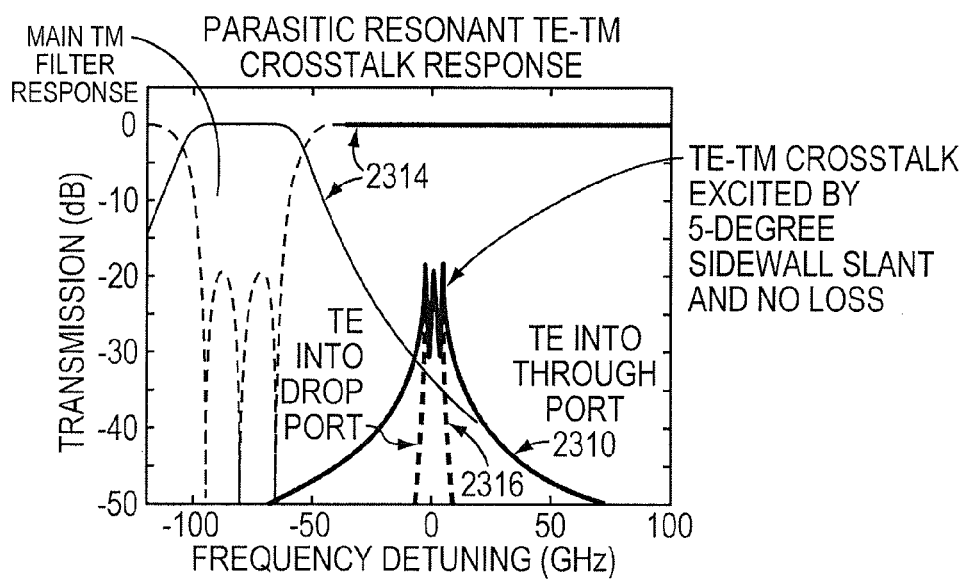
FIG. 23b is a graph illustrating the resonant filter responses of the TM filter design in FIGS. 21a-21c, 22a, 22b, and 23a, when excited by a TM mode in the input port, as illustrated in FIGS. 21b and 23a, and observing the TE-polarized mode outputs in the drop port and the through port, as well as the TM polarized output in the through port.
Figure 23C:
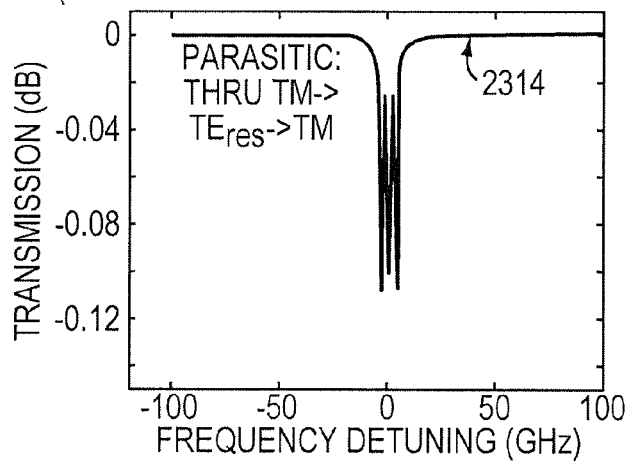
FIG. 23c is a graph illustrating a zoom-in view of FIG. 23b near the 0 dB transmission point in the through port, showing only the TM-polarized response function into the through-port, and the apparent loss incurred in the TM signal due to power extracted by the parasitic TE resonance as excited by the waveguide wall-slant in the directional coupling region.

FIG. 23b shows the drop and through port responses when TE and TM polarized output light is observed, near the TE resonant frequency of the resonant cavities 2304 of the filter. In this case, the through-port transmission 2310 of the TE light excited by the TM input is of a similar passband shape to the TE resonance, but is considerably attenuated. The reason follows. The TE-TM coupling is much smaller than the also small TE-TE coupling, because in the former near polarization orthogonality weakens the coupling. However, the TE light resonating in the rings due to cross-polarization excitation from the TM input is primarily exiting the rings through the much stronger TE-TE ring-waveguide coupling, to the drop 2306 and through waveguide 2304 TE modes. Therefore the Q (bandwidth) of the filter is determined by TE-TE couplings, and is thus the filter drop-port response shape 2312 is similar to the TE-excited response in FIG. 22*b*. The amplitude of the response 2312 is proportional to the input coupling at the directional coupler 2300, i.e., the fraction of light coupled in from the input port 2312. Since the TM-TE crosstalk coupling is much weaker than TE-TE coupling, the response is attenuated by 20 dB. Since the input side ring-bus coupling 2310 and the output side ring-bus coupling 2308 are equal, the intensity and shape of resonant response 2310 dropped into the TE polarization in each port is about the same (i.e., at about −20 dB). Since 1% of power is converted to each of a TE signal in the through port 2304 and TE signal in the drop port 2306 on resonance, it is of interest to evaluate the loss to the TM input. The through port 2304 shows a flat TM transmission 2314, indicating that little power is lost. FIG. 23*c* shows a zoom-in view of only the TM through-port transmission 2314, showing up to about 0.1 dB loss at TE resonant wavelengths, which amounts to about 98% transmission, accounting for all input power. There is no significant power dropped into the TM polarization in the drop port 2306, which would constitute crosstalk. This is because the TE-TM coupling of the output is much weaker than TE-TE coupling, thus the TM response is at least 20 dB below the TE response 2310, i.e., around −40 dB.

The above analysis considered 5° wall slant. It is of interest to consider how the crosstalk scales with wall slant 2102. The spurious crosstalk, i.e., TE output due to TM input, approximately scales as $$|H_{spurious}|^2 \sim \frac{k_{TE,TM}^2}{k_{TE,TE}^2} = \frac{Q_{TE,TE(loss)}}{Q_{TE,TM(external)}} \quad (10)$$

where $k_{TE,TM}^2$ and $k_{TE,TE}^2$ are respectively the polarization crosstalk and the TE-TE power coupling coefficients in a directional coupler 2300, and $Q_{TE,TM(external)}$ and $Q_{TE,TE(loss)}$ are the respective associated ring external Q's (for the closest-to-input ring of the set of ring resonators 2104). Therefore if the ratio of TE-TM polarization crosstalk coupling to TE-TE coupling is increased by a factor of 2, the total crosstalk simply increases by a factor of 2, i.e., by 3 dB.

Next, it is important to see how TE-TM crosstalk depends on the wall-slant 2102 angle. A second way that in practice an asymmetry may be introduced is due to an unequal refractive index in top 2106 and bottom 2108 cladding. The polarization crosstalk coupling depends on them as follows:

$$k_{TE,TM}^2 \propto \theta^2, \Delta\epsilon_{clad(top-bottom)}^2 \quad (11)$$

where θ is the wall-slant angle, or where $\Delta\epsilon_{clad(top\ bottom)} \equiv n_{topclad}^2 - n_{bottomclad}^2$ is the difference between the relative dielectric constants (i.e., square indices) of the overcladding (top) and undercladding (bottom). Therefore, if the wall-slant angle is reduced by half, crosstalk drops by a factor of 4, and the spurious crosstalk response (e.g., 2310, 2316) is reduced by a factor of 4, or 6 dB. With respect to top and bottom cladding index matching, it can be calculated that the square indices have to differ by about 4.5 to contribute the same level of crosstalk coupling as a 5° wall slant. This is a large square index difference (between the top and bottom cladding) and it may be concluded that asymmetry between the overcladding and undercladding refractive indices is unlikely to play a significant role in polarization crosstalk, unless the index difference is purposefully made substantial.

Figure 24A:
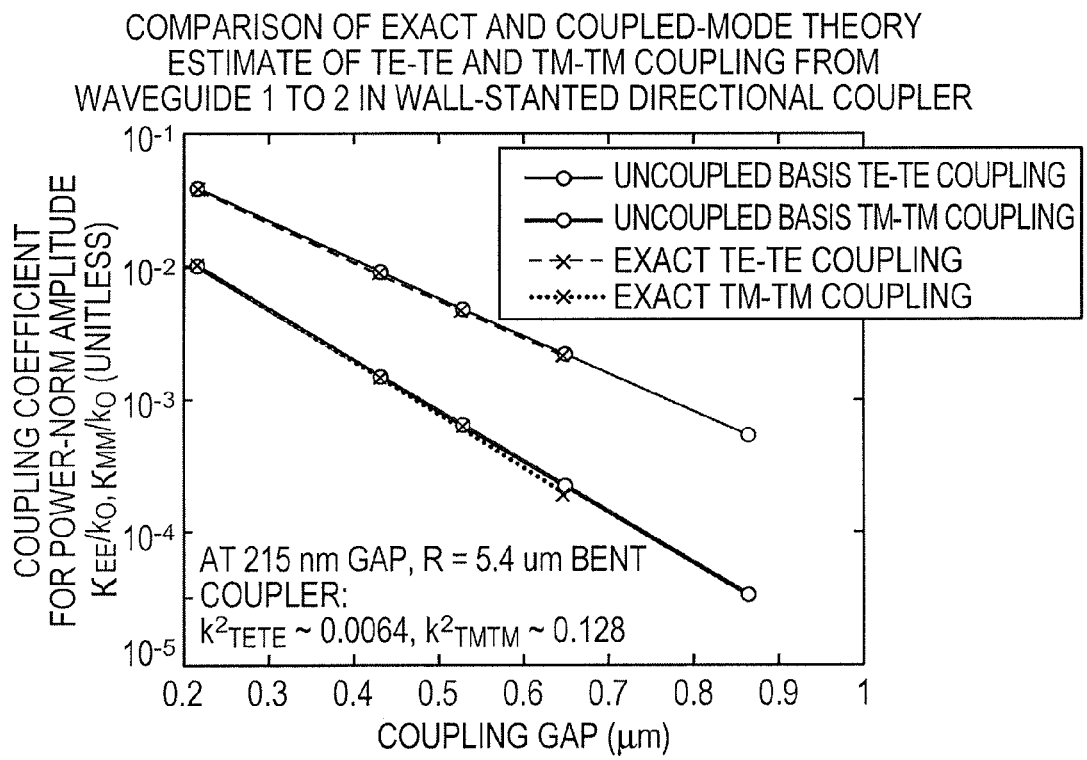
FIG. 24a is a graph illustrating approximate coupled-mode theory, and exact mode-solver-based calculations of the mode amplitude coupling coefficient in the directional coupler of FIG. 21a between a TM bus waveguide excitation and TM ring mode, and a TE bus waveguide excitation and TE ring mode; and inset data indicating the resulting approximate integrated power coupling ratio for a particular microring radius, straight bus waveguide and coupling gap.
Figure 24B:
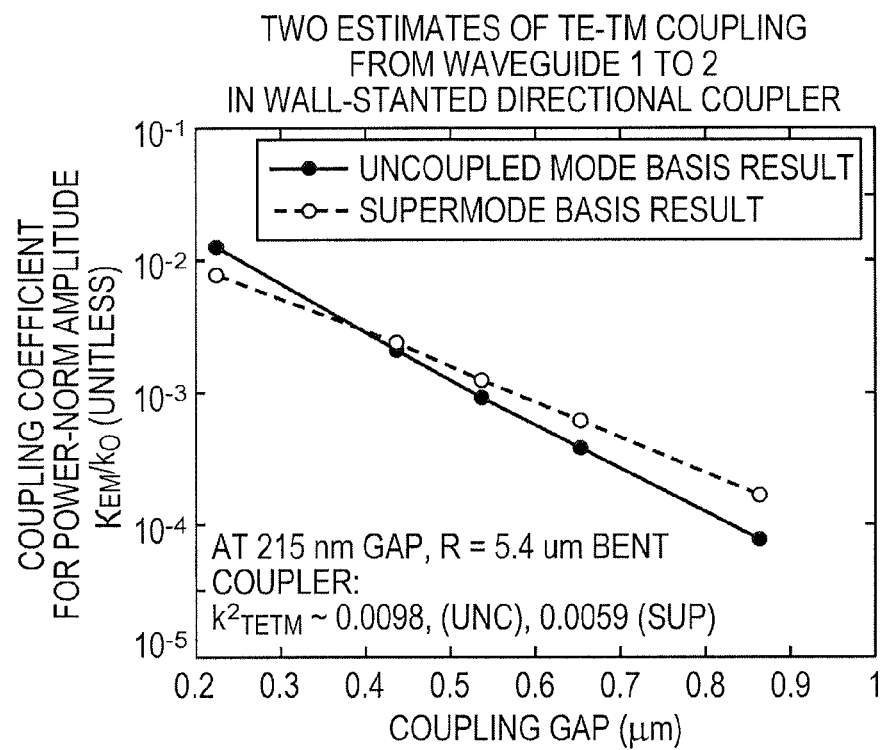
FIG. 24b is a graph illustrating approximate coupled-mode theory calculations of the mode amplitude coupling coefficient in the directional coupler of FIG. 21a between a TM bus waveguide excitation and TE ring mode, per 1 radian of wall slant from normal; using a method based on an uncoupled mode basis, and using a method based on a supermode basis; and inset data indicating the resulting approximate integrated power coupling ratio for a particular microring radius, straight bus waveguide and coupling gap.

TM-TE polarization crosstalk is much smaller than the TE-TE coupling in this analysis. FIGS. 24*a* and 24*b* illustrate this by a coupled mode theory analysis. FIG. 24*a* shows the TE-TE and TM-TM power coupling coefficients in a directional coupler with symmetric waveguide cross-sections, one being a curved ring and the other a straight bus waveguide. Power coupling is plotted vs. wall-to-wall coupling gap, arrived at as follows. First, the coupling coefficient at the narrowest point is computed in two ways: exactly, by computing the supermodes of the coupler, and second, approximately by coupled mode theory. This result is then extrapolated to a total coupling through a curved coupling region by an analytical approximation in both cases. For each of the TM-TM and TE-TE couplings, the both results are plotted, showing good agreement between coupled mode theory and exact modesolver results.

FIG. 24*b* shows the TM-TE crosstalk computed using coupled mode theory, and the analytical extrapolation, in two different ways. An exact modesolver result cannot be obtained for this geometry. However, the agreement between coupled mode theory and the modesolver result in FIG. 24*a* gives one confidence that this computation may be trusted for the purposes of crosstalk, where high accuracy is not required. The polarization-crosstalk power coupling, per 1 radian wall slant (θ=1 rad=57°), is plotted vs. coupling gap as obtained from the two different coupled mode theory computations. Agreement is reasonable. The coupling for any wall slant angle may be obtained by scaling according to eqn. (11).

The 40 GHz filter design used as an example throughout requires a 215 nm ring-bus coupling gap 2109 in the MC-STM design, shown in FIGS. 21-23. At that coupling gap, FIGS. 24*a* and 24*b* show that the TE-TM power coupling per 1 rad of wall slant is about 0.006 to 0.01, whereas TE-TE coupling is 0.006, about the same value. However, 1 rad (57°) is a large wall slant. For a realistic 5° wall slant used so far, the TE-TM coupling is seen to be about 100-150 times smaller than the TE-TE coupling. Thus the crosstalk TM resonant response at the TE resonance is about 20-25 dB lower than the TE crosstalk response (in the drop port 2306).

This analysis shows that polarization crosstalk is large enough to be a concern in the MC-STM design, but small enough that it can be tolerated with proper engineering, depending on the particular design. Therefore, on the one hand the MC-STM (TM polarized, overmoded) design has the advantage of larger coupling gaps with all other performance metric similar (high-Q FSR, sensitivities, tunability, etc.) to the MC-STE design, but the MC-STM design also has the drawback that the unwanted, well-confined fundamental TE mode is preferably addressed in engineering to avoid excessive crosstalk and resonant losses.

Two other issues may be addressed in this context. First, if the TE and TM resonances of the resonators are co-resonant (i.e., at the same wavelength), crosstalk may be significantly enhanced, and may prevent a successful TM design. Therefore, the TE and TM resonances are preferably adequately misaligned in the TM design, where resonance placement sensitivity, i.e., resonance frequency sensitivity to perturbations will be important.

Second, the polarization crosstalk study in FIGS. 21 to 23 used lossless resonances. However, introducing losses to reduce the polarization-crosstalk-induced loss in the TM through port, seen in FIG. 23*c*, does not pay off greatly. The loss Q of the resonators may need to be reduced to about 15,000 to cut the through-port loss seen in FIG. 23c in half, i.e., to about 0.05 dB minimum and about 0.025 dB in average. This would be a large reduction in Q, and would cause significant losses and primary (TM) filter shape distortion in the 40 GHz filter. Therefore introduction of loss does not greatly help to quench the polarization crosstalk. The reason for this is that the TE-TE coupling, which is the loss mechanism determining the bandwidth of the spurious TE resonance, is already reasonably strong, and large intracavity loss may be introduced to make an impact on the filter shape further by dominating over the TE-TE coupling as the primary loss mechanism.

In the series of studies presented, a family of waveguide designs is shown for high-index-contrast waveguide integrated optics, including resonators and interferometers. In particular attention has been paid to sensitivity of resonance frequencies and coupling coefficients to fabrication variability and imperfections, scattering loss due to roughness, achieving high Q and large FSR, resonance frequency tunability, minimum coupling gap sizes, and other factors as described. Novel overmoded TM designs which achieve effectively single-mode operation were described along with their advantages and disadvantages. In particular, polarization crosstalk was shown to be a potential problem but within bounds where it can be controlled by design. In addition to optimal designs for low sensitivity, large FSR and tunable resonators, designs were found that give the maximum achievable FSR in a uniformly clad, rectangular core waveguide, showing that a tall and narrow cross-section with vertical polarization is optimal in this context, achieving about twice the FSR (9 THz) of the conventional TE, 450×200 nm cross-section waveguide design (FSR=5 THz).

Although the analysis presented herein has idealized the waveguide geometry as having a rectangular cross-section core, and a uniform cladding, the results apply more generally to other realistic waveguide designs, where the sidewalls may be slanted, and where there are intermediate materials between the highest index region and the lowest index region that carry substantial guided optical intensity. Furthermore, the material refractive index distribution on the cross-section may, instead of a discrete set of indices, comprise a gradation between a maximum and a minimum index over the cross-sectional region that carries substantial guided optical intensity, where the maximum and minimum index differ preferably by about 20%, more preferably by about 50%, and even more preferably by more than 100% of the minimum index. The waveguide cross-section may comprise more complex arrangements, including various other materials such as high index slab layers, mechanically movable or not, in the vicinity of the high index core, or different high-index core shapes, including deep-etched ridge waveguides, where the core layer is not completely etched through. The results described herein apply generally to waveguides where optical confinement is strong in both the lateral and vertical cross-sectional direction.

In addition to insensitive designs, waveguides designs have been demonstrated that are highly sensitive to dimensional change, e.g., in FIG. 10a. Such designs may be used to purposefully monitor dimensional changes, by measuring resonance frequency, where the other parameters are well controlled. Or they may be used as sensors to sense deformation of the resonator in the sensitive dimension, by combining the index change (due to strain-induced bandgap change) with the sensitive geometrical effect described in FIG. 10a. For example the MC-STE design's TE11 mode is most sensitive to height dimension at $A_R \approx 1.8$, while its TM11 mode is most sensitive at $A_R \approx 20$–30 to height giving as much as 700-800 GHz/nm frequency shift per unit height change in the core. These designs may be exploited for various sensing applications.

Although the present invention has been shown and described with respect to several preferred embodiments thereof, various changes, omissions and additions to the form and detail thereof, may be made therein, without departing from the spirit and scope of the invention.

What is claimed is:

1. A device comprising:
    a strongly confining optical waveguide including:
    a first core region disposed over a substrate, the first core region having a first substantially rectangular cross-section and comprising a first core material, the first core material comprising a semiconductor and being substantially transparent within an operating wavelength range having a first free-space center wavelength selected from the range of 500 nm to 3000 nm; and
    a first cladding region surrounding the first core region, the first cladding region (i) comprising at least one cladding material having a refractive index, and (ii) having a first maximum cladding refractive index equal to the largest refractive index of the at least one cladding material,
    wherein a core refractive index of the first core material is at least 1.5 times the first maximum cladding refractive index,
    wherein the first rectangular cross-section has a first aspect ratio $A_R$ defined by a ratio of a width of the first rectangular cross-section to a height of the first rectangular cross-section, the first aspect ratio is at least 5:1 and at most 20:1, and a height of the first core region is between $\frac{1}{150}$ and $\frac{1}{10}$ of the first free-space center wavelength, and
    wherein the waveguide comprises a section having a bending radius between twice and ten times the first free-space center wavelength.

2. The device of claim 1, wherein a core refractive index of the first core material is at least 2.0 times as large as the first maximum cladding refractive index.

3. The device of claim 1, wherein a core refractive index of the core material is approximately equal to a refractive index of crystalline silicon.

4. The optical waveguide of claim 3, wherein the first maximum cladding refractive index is approximately equal to a refractive index of silica.

5. The device of claim 1, wherein the height is selected from a range of 10 nm to 150 nm.

6. The device of claim 5, wherein the height is about 10 nm.

7. The device of claim 1, wherein an area of the rectangular first cross-section is less than or equal to $0.047+0.057\times[\text{sech}(3\times\log_{10} A_R)]^{0.44}$ square micrometers.

8. The device of claim 1, further comprising:
    a second optical waveguide coupled to the first optical waveguide, the second optical waveguide including:
    a second core region having a second substantially rectangular cross-section and comprising a second core material, the second core material comprising a semiconductor and being substantially transparent within an operating wavelength range having a second free-space center wavelength, and
    a second cladding region surrounding the second core region, the second cladding region (i) comprising at least one cladding material having a second cladding refractive index, and (ii) having a second maximum cladding refractive index equal to the largest refractive index of the at least one cladding material,
    wherein (i) the rectangular second cross-section has a second aspect ratio defined by a ratio of a width of the rectangular second cross-section to a height of the rectangular second cross-section, (ii) the second aspect ratio is at least 5:1, and (iii) a height of the second core region is between 1/150 and 1/10 of the second free-space center wavelength.

9. The device of claim 8, wherein the device comprises an optical interferometer, the optical interferometer further comprising:
a first optical path associated with a first propagating optical mode and comprising the first optical waveguide;
a second optical path associated with a second propagating optical mode and comprising the second optical waveguide;
a first optical coupler configured to couple optical power from at least one of (i) the first optical path to the second optical path or (ii) from the second optical path to the first optical path; and
a second optical coupler configured to couple optical power from at least one of the first optical path to the second optical path or (ii) from the second optical path to the first optical path,
wherein a portion of the first optical waveguide disposed between the first and second optical couplers defines a first waveguide length, a portion of the second optical waveguide disposed between the first and second optical couplers defines a second waveguide length, and a difference between the first and second waveguide lengths induces an optical response.

10. The device of claim 8, wherein the device comprises a ring filter, the ring filter further comprising:
a first ring resonator, the first ring resonator comprising the first optical waveguide, and the first optical waveguide being closed in a loop; and
an optical port;
wherein the optical port and the second optical waveguide are each optically coupled to the first ring resonator.

11. The device of claim 10, wherein the ring filter is tunable, further comprising:
a heating element associated with the ring resonator, the heating element being disposed in proximity to the ring resonator at a distance to the optical waveguides of the ring resonator (i) sufficiently small to facilitate substantial transfer of heat from the heating element to the optical waveguides, and (ii) sufficiently great to avoid substantial absorbance by the heating element of optical radiation propagating through the optical waveguides.

12. The device of claim 10, wherein the first ring resonator has a quality factor due to bending loss of at least 250,000.

13. The device of claim 10, wherein the first ring resonator has a free spectral range of about 40 nm.

14. The device of claim 10, wherein the first ring resonator has a bending loss of no more than 0.001 dB/90°.

15. The optical waveguide of claim 1, wherein the semiconductor is single crystalline.

16. The optical waveguide of claim 1, wherein the free-space center wavelength is about 1.5 µm.

17. The optical waveguide of claim 1, wherein the aspect ratio, the height, and the width of the first substantially rectangular cross-section cooperate to support a single TE mode.

18. The optical waveguide of claim 1, further comprising:
a slanted sidewall defining a sidewall angle with respect to a top portion of the optical waveguide,
wherein the sidewall angle is less than 5 degrees.

19. The device of claim 1, wherein an area of the rectangular first cross-section is about $0.047+0.057\times[\text{sech}(3\times\log_{10} A_R)]^{0.44}$ square micrometers.

20. The device of claim 1, wherein a modal effective index of the waveguide exceeds the first maximum cladding refractive index by at least 0.25.

* * * * *